US012777148B2

(12) United States Patent
Yin et al.

(10) Patent No.: US 12,777,148 B2
(45) Date of Patent: Oct. 27, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Wenbin Yin, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 18/620,827

(22) Filed: Mar. 28, 2024

(65) Prior Publication Data

US 2024/0244201 A1 Jul. 18, 2024

Related U.S. Application Data

(63) Continuation of application No. PCT/CN2022/121928, filed on Sep. 27, 2022.

(30) Foreign Application Priority Data

Sep. 29, 2021 (WO) ................ PCT/CN2021/121976

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/176* (2014.11); *H04N 19/80* (2014.11)

(58) Field of Classification Search
None
See application file for complete search history.

(56) References Cited

U.S. PATENT DOCUMENTS 11,711,512 B2 7/2023 Bordes et al.
2005/0265452 A1 12/2005 Miao et al.
(Continued)

FOREIGN PATENT DOCUMENTS

CN 103081467 A 5/2013
CN 106464879 A 2/2017
(Continued)

OTHER PUBLICATIONS

International Search Report issued in International Application No. PCT/CN2022/121928 on Nov. 29, 2022, 5 pages.
(Continued)

*Primary Examiner* — Zhihan Zhou
(74) *Attorney, Agent, or Firm* — Astute IP Law Group

(57) ABSTRACT

Embodiments of the present disclosure provide a solution for video processing. A method for video processing comprises: determining, during a conversion between a current video block of a video and a bitstream of the video, a first filter shape from a plurality of filter shapes; determining, based on the first filter shape, a first filter for coding a first sample of the current video block, a value of a clip parameter of the first filter being dependent on the first filter shape; and performing the conversion based on the first filter. Compared with the conventional solution, the proposed method can advantageously improve the performance of the filtering tool.

15 Claims, 62 Drawing Sheets

(51) Int. Cl.
*H04N 19/176* (2014.01)
*H04N 19/80* (2014.01)

(56) References Cited

U.S. PATENT DOCUMENTS

2011/0274158 A1 11/2011 Fu et al.
2012/0051438 A1* 3/2012 Chong .................. H04N 19/42 375/E7.027
2012/0082244 A1* 4/2012 Chen ...................... H04N 19/82 375/E7.189
2012/0183050 A1* 7/2012 Liu ...................... H04N 19/196 375/240.03
2014/0328414 A1 11/2014 Puri et al.
2015/0365703 A1* 12/2015 Puri ....................... H04N 19/91 375/240.24
2017/0237981 A1* 8/2017 Karczewicz ......... H04N 19/136 375/240.12
2017/0339432 A1 11/2017 Chao et al.
2018/0041778 A1* 2/2018 Zhang .................. H04N 19/136
2020/0236355 A1 7/2020 Zhao et al.
2020/0374518 A1* 11/2020 Hu ......................... H04N 19/82
2021/0067774 A1* 3/2021 Yasugi ................. H04N 19/117
2021/0076032 A1 3/2021 Hu et al.
2021/0084340 A1 3/2021 Li et al.
2021/0152841 A1* 5/2021 Hu ......................... H04N 19/44
2021/0306673 A1* 9/2021 Sarwer ................. H04N 19/182
2021/0385446 A1* 12/2021 Liu ...................... H04N 19/132
2022/0078415 A1* 3/2022 Taquet ................. H04N 19/132
2022/0159249 A1* 5/2022 Taquet ................... H04N 19/70
2022/0182680 A1 6/2022 Du et al.

FOREIGN PATENT DOCUMENTS

CN 109479130 A 3/2019
GB 2591446 A 8/2021
JP 2021505074 A 2/2021
WO 2020063552 A1 4/2020
WO 2020211809 A1 10/2020
WO 2021101345 A1 5/2021
WO 2021155778 A1 8/2021

OTHER PUBLICATIONS

International Search Report issued in International Application No. PCT/CN2022/121925 on Nov. 30, 2022, 3 pages.
Faouzi Kossentini. “CE8 Subtest 4: Adaptive Loop Filtering Using Two Filter Shapes” Joint Collaborative Team on Video Coding (JCT-VC) of ITU-T SG16 WP3 and ISO/IEC JTC1/SC29/WG11 6th Meeting: Torino, Italy, Jul. 22, 2011.
Non-Final Office Action for U.S. Appl. No. 18/620,780, mailed on May 20, 2025, 21 pages.
Notice of Allowance for U.S. Appl. No. 18/620,780, mailed on Dec. 23, 2025, 10 pages.

* cited by examiner

METHOD, APPARATUS, AND MEDIUM FOR VIDEO PROCESSING

CROSS REFERENCE

This application is a continuation of International Application No. PCT/CN2022/121928, filed on Sep. 27, 2022, which claims the benefit of International Application No. PCT/CN2021/121976 filed on Sep. 29, 2021. The entire contents of these applications are hereby incorporated by reference in their entireties.

FIELD

Embodiments of the present disclosure relates generally to video coding techniques, and more particularly, to filter shape selection for adaptive loop filter in video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, performance of conventional video coding techniques is generally expected to be further improved.

SUMMARY

Embodiments of the present disclosure provide a solution for video processing.

In a first aspect, a method for video processing is proposed. The method comprises: determining, during a conversion between a current video block of a video and a bitstream of the video, a first filter shape from a plurality of filter shapes; determining, based on the first filter shape, a first filter for coding a first sample of the current video block, a value of a clip parameter of the first filter being dependent on the first filter shape; and performing the conversion based on the first filter.

According to the proposed method, a sample of a video block is coded with a filter determined based on a filter shape selected from a plurality of filter shapes, and a value of a clip parameter of the first filter is dependent on the first filter shape. Compared with the conventional solution where a fixed filter shape is used, the proposed method can advantageously improve the performance of the filtering tool, and thus the coding performance can be improved.

In a second aspect, another method for video processing is proposed. The method comprises: determining, during a conversion between a current video block of a video and a bitstream of the video, a first filter shape from a plurality of filter shapes; determining, based on the first filter shape, a first filter for coding a first sample of the current video block, an order of a set of parameters of the first filter being dependent on the first filter shape; and performing the conversion based on the first filter.

According to the proposed method, a sample of a video block is coded with a filter determined based on a filter shape selected from a plurality of filter shapes, and an order of a set of parameters of the first filter is dependent on the first filter shape. Compared with the conventional solution where a fixed filter shape is used, the proposed method can advantageously improve the performance of the filtering tool, and thus the coding performance can be improved.

In a third aspect, an apparatus for processing video data is proposed. The apparatus for processing video data comprises a processor and a non-transitory memory with instructions thereon. The instructions upon execution by the processor cause the processor to perform a method in accordance with the first or second aspect of the present disclosure.

In a fourth aspect, a non-transitory computer-readable storage medium is proposed. The non-transitory computer-readable storage medium stores instructions that cause a processor to perform a method in accordance with the first or second aspect of the present disclosure.

In a fifth aspect, a non-transitory computer-readable recording medium is proposed. The non-transitory computer-readable recording medium stores a bitstream of a video which is generated by a method performed by a video processing apparatus. The method comprises: determining a first filter shape from a plurality of filter shapes; determining, based on the first filter shape, a first filter for coding a first sample of a current video block of the video, a value of a clip parameter of the first filter being dependent on the first filter shape; and generating the bitstream based on the first filter.

In a sixth aspect, a method for storing a bitstream of a video is proposed. The method comprises: determining a first filter shape from a plurality of filter shapes; determining, based on the first filter shape, a first filter for coding a first sample of a current video block of the video, a value of a clip parameter of the first filter being dependent on the first filter shape; generating the bitstream based on the first filter; and storing the bitstream in a non-transitory computer-readable recording medium.

In a seventh aspect, another non-transitory computer-readable recording medium is proposed. The non-transitory computer-readable recording medium stores a bitstream of a video which is generated by a method performed by a video processing apparatus. The method comprises: determining a first filter shape from a plurality of filter shapes; determining, based on the first filter shape, a first filter for coding a first sample of a current video block of the video, an order of a set of parameters of the first filter being de-pendent on the first filter shape; and generating the bitstream based on the first filter.

In an eighth aspect, another method for storing a bitstream of a video is proposed. The method comprises: determining a first filter shape from a plurality of filter shapes; determining, based on the first filter shape, a first filter for coding a first sample of a current video block of the video, an order of a set of parameters of the first filter being de-pendent on the first filter shape; generating the bitstream based on the first filter; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
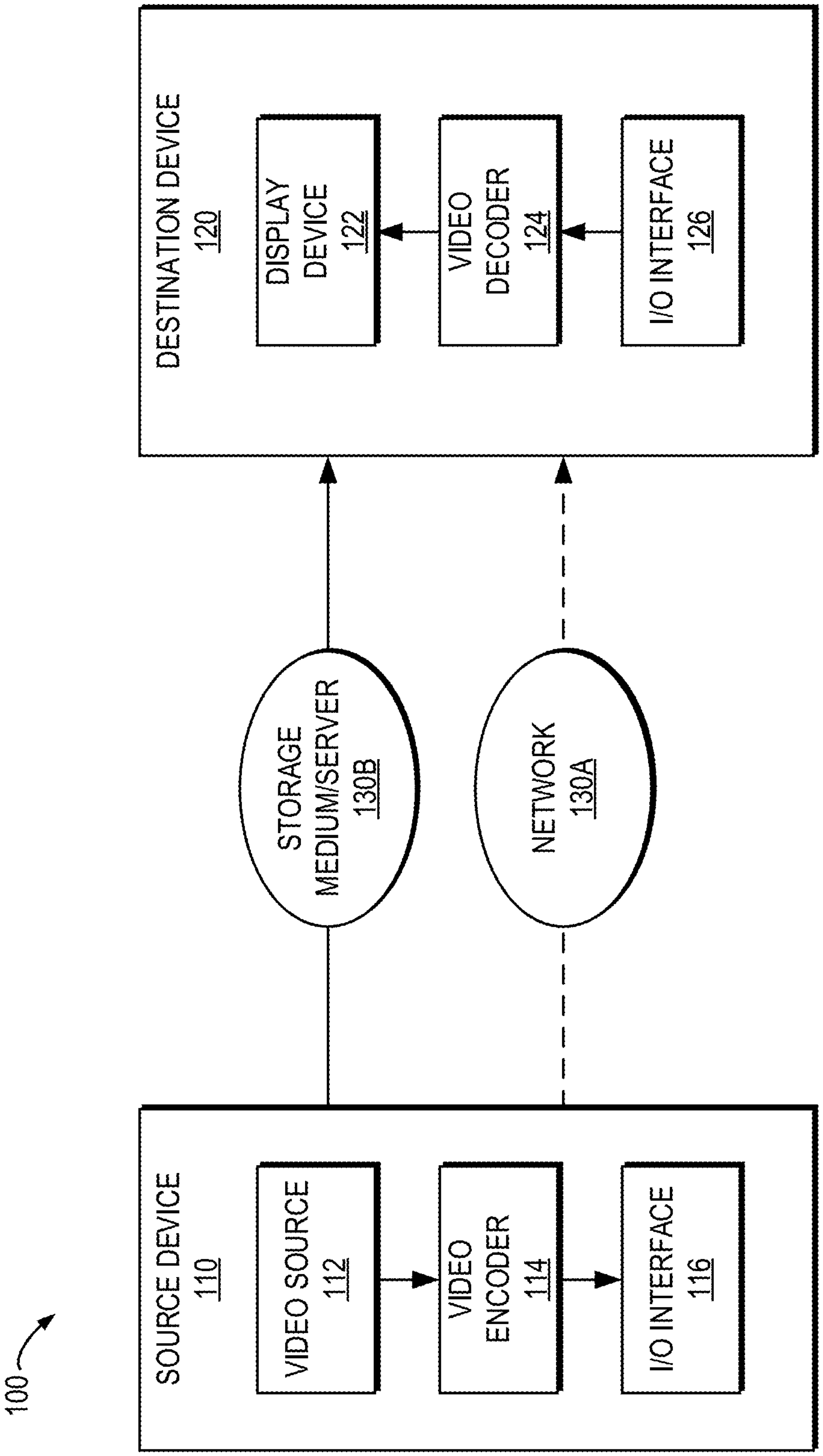
FIG. 1 illustrates a block diagram of an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
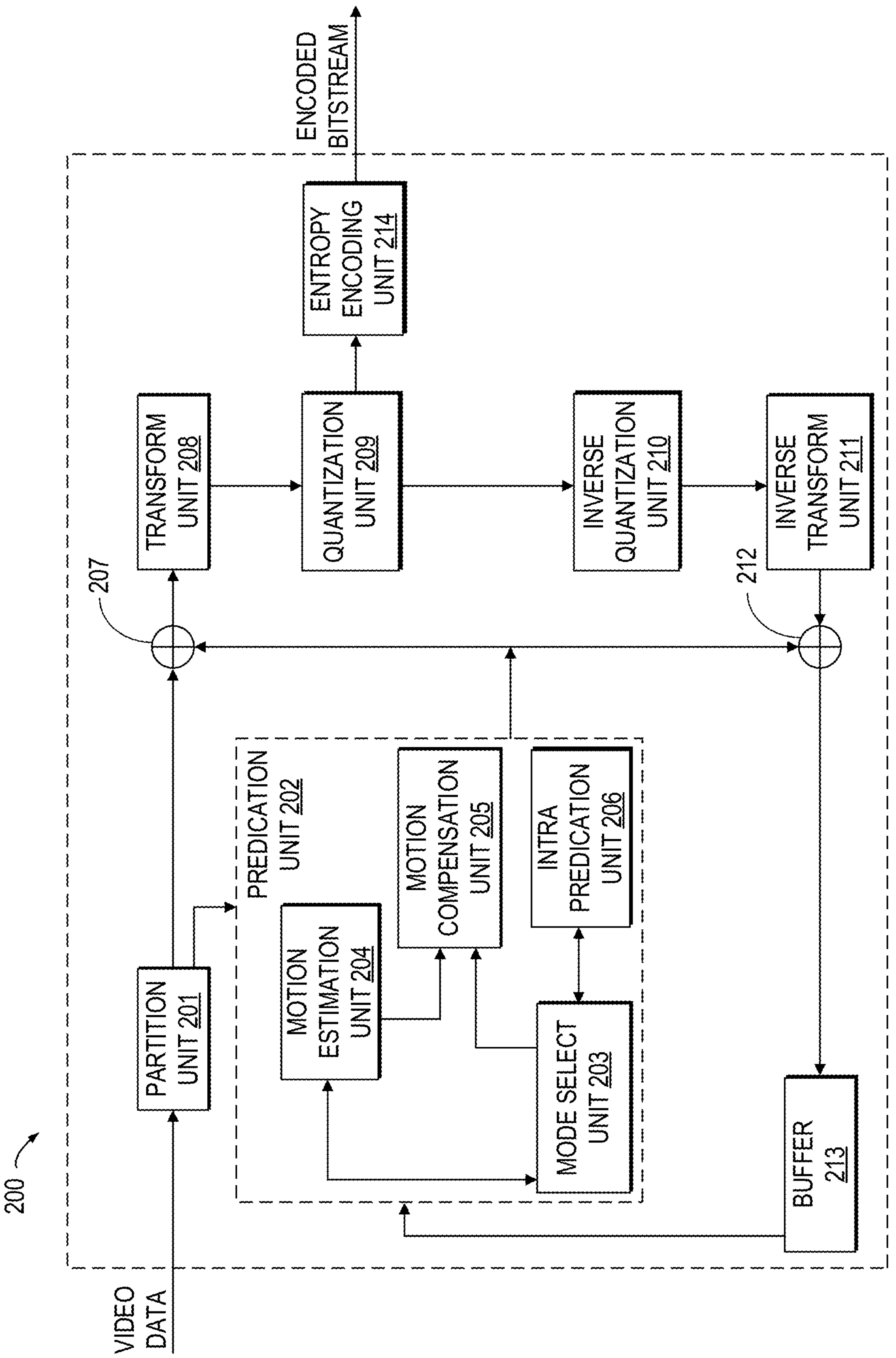
FIG. 2 illustrates a block diagram of an example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the other video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
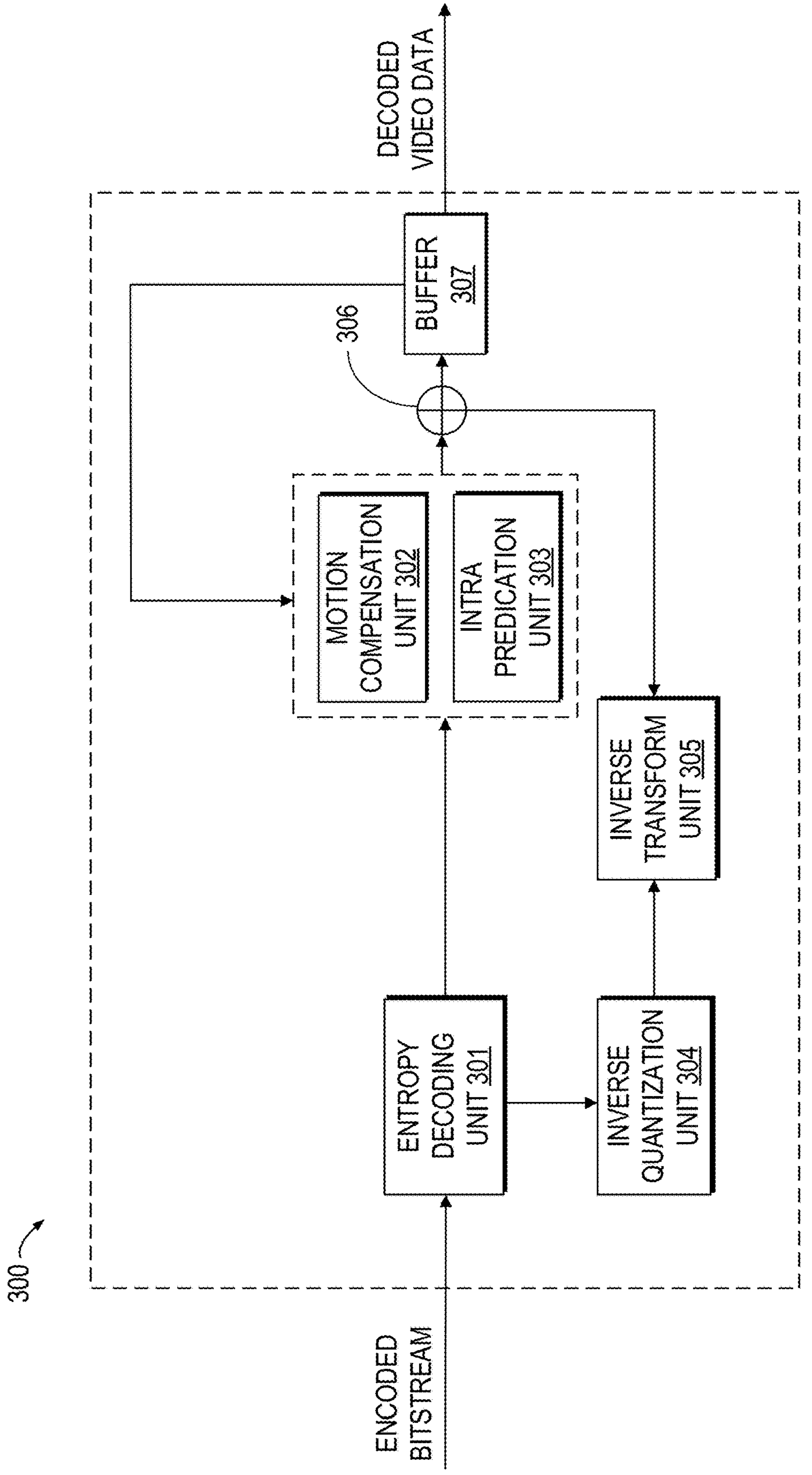
FIG. 3 illustrates a block diagram of an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to video coding technologies. Specifically, it is related to in-loop filter and other coding tools in image/video coding. The ideas may be applied individually or in various combination, to any existing video coding standard or non-standard video codec like High Efficiency Video Coding (HEVC) and Versatile Video Coding (VVC). The proposed ideas may be also applicable to future video coding standards or video codec.

2. ABBREVIATIONS

AVC Advanced Video Coding
CPB Coded Picture Buffer
CRA Clean Random Access
CTU Coding Tree Unit
CVS Coded Video Sequence
DPB Decoded Picture Buffer
DPS Decoding Parameter Set
GCI General Constraints Information
HEVC High Efficiency Video Coding
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RRP Reference Picture Resampling
RBSP Raw Byte Sequence Payload
SEI Supplemental Enhancement Information
SH Slice Header
SPS Sequence Parameter Set
VCL Video Coding Layer
VPS Video Parameter Set
VTM VVC Test Model
VUI Video Usability Information
VVC Versatile Video Coding
TU Transform Unit
CU Coding Unit
DF Deblocking Filter
SAO Sample Adaptive Offset
ALF Adaptive Loop Filter
CBF Coding Block Flag
QP Quantization Parameter
RDO Rate Distortion Optimization
BF Bilateral Filter

3. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC (J. Strom, P. Wennersten, J. Enhorn, D. Liu, K. Andersson and R. Sjoberg, "Bilateral Loop Filter in Combination with SAO," in proceeding of IEEE Picture Coding Symposium (PCS), November 2019.) standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting.

ITU-T VCEG (Q6/16) and ISO/IEC MPEG (JTC 1/SC 29/WG 11) are studying the potential need for standardization of future video coding technology with a compression capability that significantly exceeds that of the current VVC standard. Such future standardization action could either take the form of additional extension(s) of VVC or an entirely new standard. The groups are working together on this exploration activity in a joint-collaboration effort known as the Joint Video Exploration Team (JVET) to evaluate compression technology designs proposed by their experts in this area. The first Exploration Experiments (EE) were established in JVET meeting during 6-15 Jan. 2021 and the reference software named as Enhanced Compression Model (ECM). The test model ECM is updated after every JVET meeting.

3.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB. YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries. Chroma subsampling is the practice of encoding images by implementing less resolution for chroma information than for luma information, taking advantage of the human visual system's lower acuity for color differences than for luminance.

3.1.1 4:4:4

Each of the three Y'CbCr components have the same sample rate, thus there is no chroma subsampling. This scheme is sometimes used in high-end film scanners and cinematic postproduction.

3.1.2 4:2:2

Figure 4:
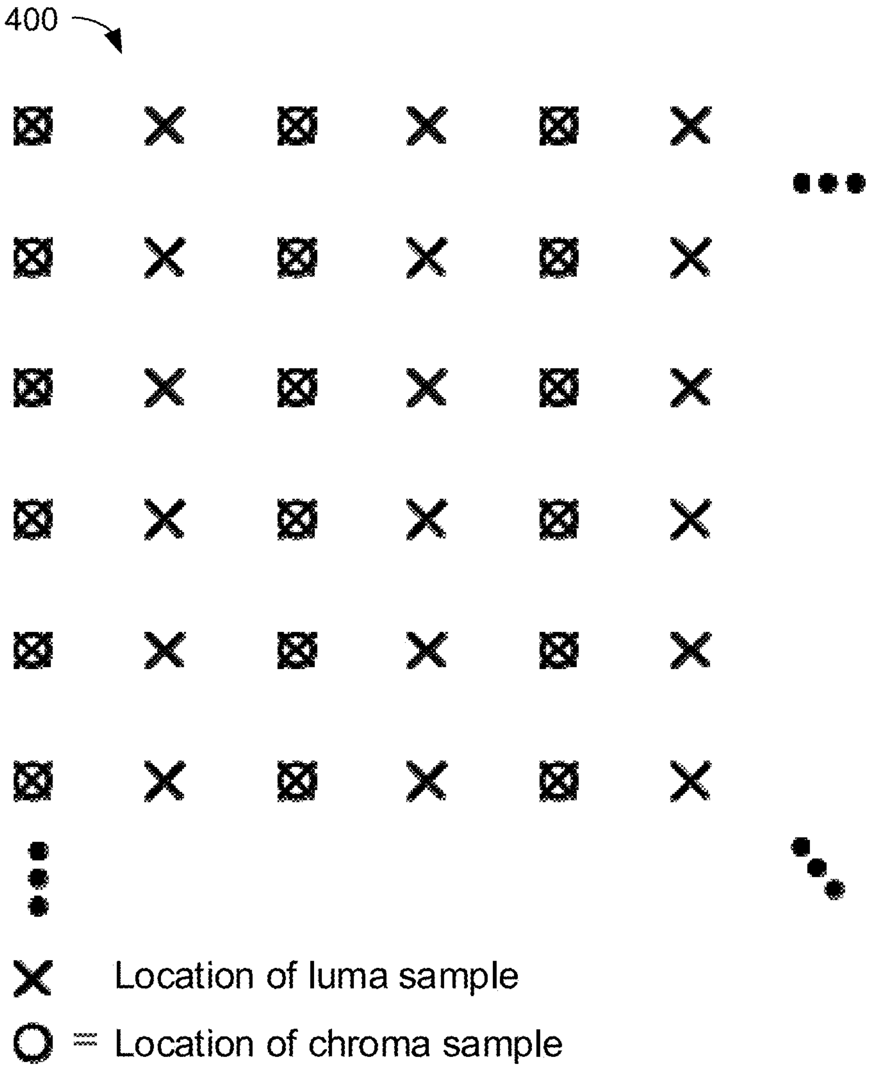
FIG. 4 illustrates nominal vertical and horizontal locations of 4:2:2 luma and chroma samples in a picture.

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 4 in VVC working draft.

3.1.3 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In JPEG/JFIF, H.261, and MPEG-1, Cb and Cr are sited interstitially, halfway between alternate luma samples.
- In 4:2:0 DV, Cb and Cr are co-sited in the horizontal direction. In the vertical direction, they are co-sited on alternating lines.

TABLE 3-1

SubWidthC and SubHeightC values derived from chroma_format_idc and separate_colour_plane_flag

| chroma_ format_idc | separate_colour_ plane_flag | Chroma format | SubWidth C | SubHeight C |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

3.2. Coding Flow of a Typical Video Codec

Figure 5:
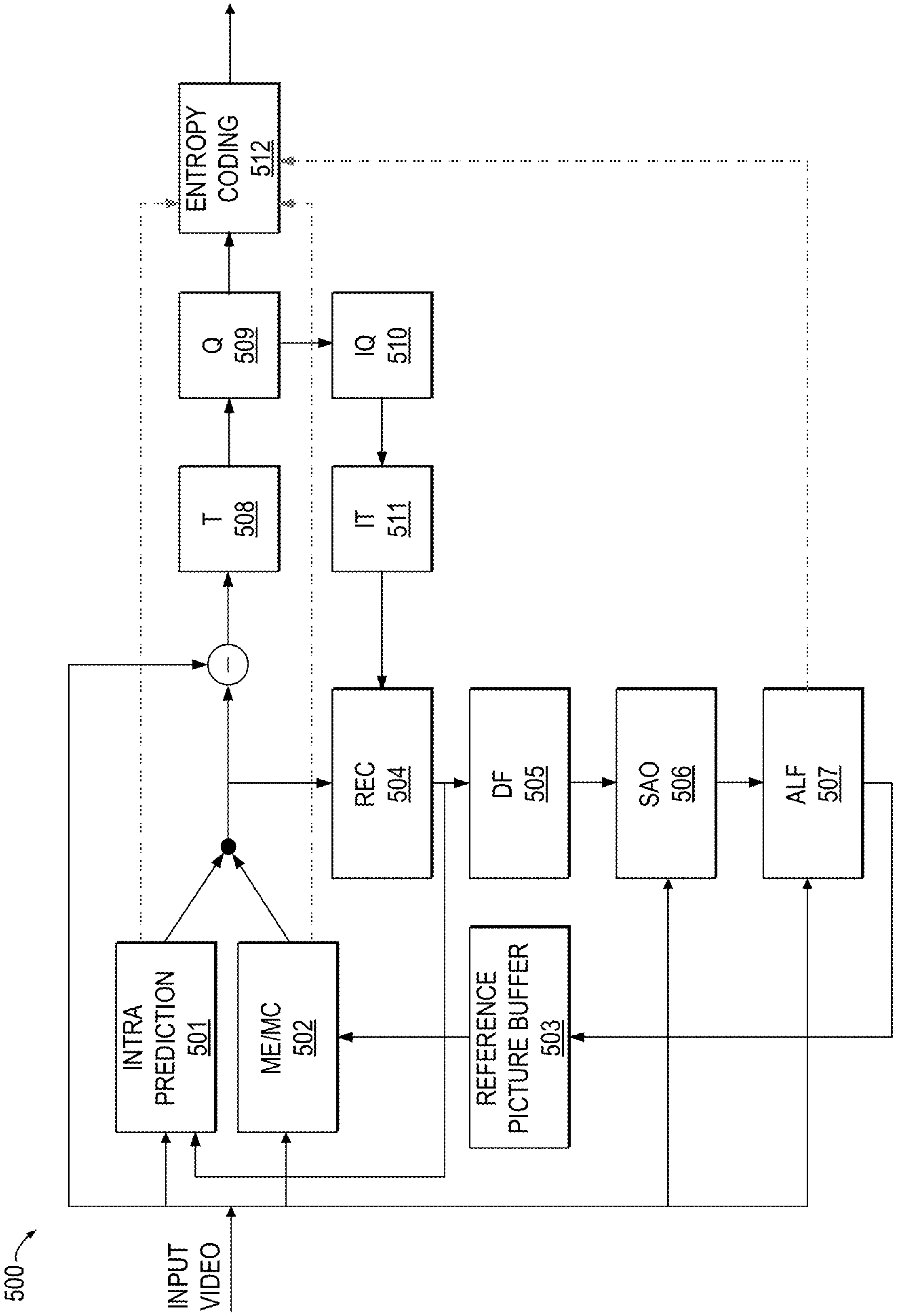
FIG. 5 illustrates a schematic diagram of example of encoder block diagram.

FIG. 5 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

3.3. Intra Prediction

To capture the arbitrary edge directions presented in natural video, the number of directional intra modes is extended from 33, as used in HEVC, to 65. The additional directional modes are depicted as red dotted arrows in FIG. 5, and the planar and DC modes remain the same. These denser directional intra prediction modes apply for all block sizes and for both luma and chroma intra predictions.

Figure 6:
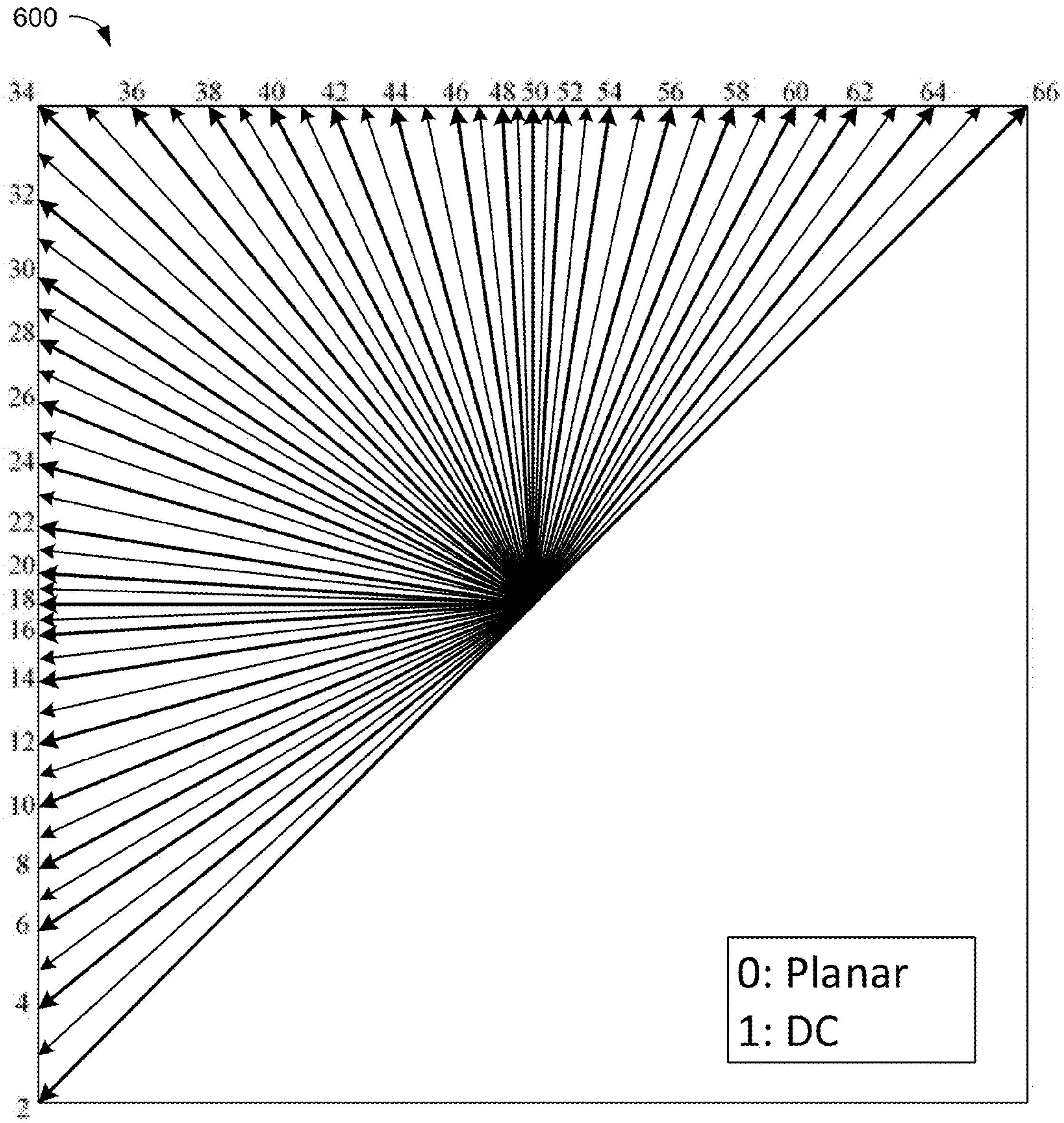
FIG. 6 illustrates a schematic diagram of 67 intra prediction modes.

Conventional angular intra prediction directions are defined from 45 degrees to −135 degrees in clockwise direction as shown in FIG. 6. In VTM, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

3.4. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signaled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signaled explicitly per each CU.

3.5. Deblocking Filter

Deblocking filtering typical in-loop filter in video codec. In VVC, the deblocking filtering process is applied on CU boundaries, transform subblock boundaries and prediction subblock boundaries. The prediction subblock boundaries include the prediction unit boundaries introduced by the SbTMVP (Subblock based Temporal Motion Vector prediction) and affine modes, and the transform subblock boundaries include the transform unit boundaries introduced by SBT(Subblock transform) and ISP(Intra Sub-Partitions) modes and transforms due to implicit split of large CUs. As done in HEVC, the processing order of the deblocking filter is defined as horizontal filtering for vertical edges for the entire picture first, followed by vertical filtering for horizontal edges. This specific order enables either multiple horizontal filtering or vertical filtering processes to be applied in parallel threads or can still be implemented on a CTB-by-CTB basis with only a small processing latency.

3.6. Sample Adaptive Offset

Sample adaptive offset (SAO) is applied to the reconstructed signal after the deblocking filter by using offsets specified for each CTB by the encoder. The video encoder first makes the decision on whether or not the SAO process is to be applied for current slice. If SAO is applied for the slice, each CTB is classified as one of five SAO types as shown in Table. 3-1. The concept of SAO is to classify pixels into categories and reduces the distortion by adding an offset to pixels of each category. SAO operation includes edge offset (EO) which uses edge properties for pixel classification in SAO type 1 to 4 and band offset (BO) which uses pixel intensity for pixel classification in SAO type 5. Each applicable CTB has SAO parameters including sao_merge_left_flag, sao_merge_up_flag, SAO type and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

TABLE 3-2

Specification of SAO type

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |

TABLE 3-2-continued

Specification of SAO type

| SAO type | sample adaptive offset type to be used | Number of categories |
|---|---|---|
| 3 | 1-D 135-degree pattern edge offset | 4 |
| 4 | 1-D 45-degree pattern edge offset | 4 |
| 5 | band offset | 4 |

3.7. Adaptive Loop Filter

Adaptive loop filtering for video coding is to minimize the mean square error between original samples and decoded samples by using Wiener-based adaptive filter. The ALF is located at the last processing stage for each picture and can be regarded as a tool to catch and fix artifacts from previous stages. The suitable filter coefficients are determined by the encoder and explicitly signaled to the decoder. To achieve better coding efficiency, especially for high resolution videos, local adaptation is used for luma signals by applying different filters to different regions or blocks in a picture. In addition to filter adaptation, filter on/off control at coding tree unit (CTU) level is also helpful for improving coding efficiency. Syntax-wise, filter coefficients are sent in a picture level header called adaptation parameter set, and filter on/off flags of CTUs are interleaved at CTU level in the slice data. This syntax design not only supports picture level optimization but also achieves a low encoding latency.

According to ALF design in VTM, filter coefficients and clipping indices are carried in ALF APSs. An ALF APS can include up to 8 chroma filters and one luma filter set with up to 25 filters. An index is also included for each of the 25 luma classes. Classes having the same index share the same filter. By merging different classes, the num of bits required to represent the filter coefficients is reduced. The absolute value of a filter coefficient is represented using a $0^{th}$ order Exp-Golomb code followed by a sign bit for a non-zero coefficient. When clipping is enabled, a clipping index is also signaled for each filter coefficient using a two-bit fixed-length code. Up to 8 ALF APSs can be used by the decoder at the same time.

Filter control syntax elements of ALF in VTM include two types of information. First, ALF on/off flags are signaled at sequence, picture, slice and CTB levels. Chroma ALF can be enabled at picture and slice level only if luma ALF is enabled at the corresponding level. Second, filter usage information is signaled at picture, slice and CTB level, if ALF is enabled at that level. Referenced ALF APSs IDs are coded at a slice level or at a picture level if all the slices within the picture use the same APSs. Luma component can reference up to 7 ALF APSs and chroma components can reference 1 ALF APS. For a luma CTB, an index is signaled indicating which ALF APS or offline trained luma filter set is used. For a chroma CTB, the index indicates which filter in the referenced APS is used.

The data syntax elements of ALF associated to LUMA component in VTM are listed as follows:

| | Descriptor |
|---|---|
| alf_data( ) { | |
| **alf_luma_filter_signal_flag** | u(1) |
| if( alf_luma_filter_signal_flag ) { | |
|   **alf_luma_clip_flag** | u(1) |
|   **alf_luma_num_filters_signalled_minus1** | ue(v) |
|   if( alf_luma_num_filters_signalled_minus1 > 0 ) | |
|     for( filtIdx = 0; filtIdx < NumAlfFilters; filtIdx++ ) | |

-continued

| | Descriptor |
|---|---|
| **alf_luma_coeff_delta_idx**[ filtIdx ] | u(v) |
| for( sfIdx = 0; sfIdx <= alf_luma_num_filters_signalled_minus1; sfIdx++ ) | |
| for( j = 0; j < 12; j++ ) { | |
| **alf_luma_coeff_abs**[ sfIdx ][ j ] | ue(v) |
| if( alf_luma_coeff_abs[ sfIdx ][ j ] ) | |
| **alf_luma_coeff_sign**[ sfIdx ][ j ] | u(1) |
| } | |
| if( alf_luma_clip_flag ) | |
| for( sfIdx = 0; sfIdx <= alf_luma_num_filters_signalled_minus1; sfIdx++ ) | |
| for( j= 0; j < 12; j++ ) | |
| **alf_luma_clip_idx**[ sfIdx ][ j ] | u(2) |
| } | |

alf_luma_filter_signal_flag equal to 1 specifies that a luma filter set is signaled. alf_luma_filter_signal_flag equal to 0 specifies that a luma filter set is not signaled.

alf_luma_clip_flag equal to 0 specifies that linear adaptive loop filtering is applied to the luma component. alf_luma_clip_flag equal to 1 specifies that non-linear adaptive loop filtering could be applied to the luma component.

alf_luma_num_filters_signaled_minus1 plus 1 specifies the number of adaptive loop filter classes for which luma coefficients can be signaled. The value of alf_luma_num_filters_signaled_minus1 shall be in the range of 0 to NumAlfFilters−1, inclusive.

alf_luma_coeff_delta_idx[filtIdx] specifies the indices of the signaled adaptive loop filter luma coefficient deltas for the filter class indicated by filtIdx ranging from 0 to NumAlfFilters−1. When alf_luma_coeff_delta_idx [filtIdx] is not present, it is inferred to be equal to 0. The length of alf_luma_coeff_delta_idx[filtIdx] is Ceil(Log 2(alf_luma_num_filters_signaled_minus1+1)) bits. The value of alf_luma_coeff_delta_idx[filtIdx] shall be in the range of 0 to alf_luma_num_filters_signaled_minus1, inclusive.

alf_luma_coeff_abs[sfIdx][j] specifies the absolute value of the j-th coefficient of the signaled luma filter indicated by sfIdx. When alf_luma_coeff_abs[sfIdx][j] is not present, it is inferred to be equal 0. The value of alf_luma_coeff_abs[sfIdx][j] shall be in the range of 0 to 128, inclusive.

alf_luma_coeff_sign[sfIdx][j] specifies the sign of the j-th luma coefficient of the filter indicated by sfIdx as follows:

If alf_luma_coeff_sign[sfIdx][j] is equal to 0, the corresponding luma filter coefficient has a positive value.

Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

alf_luma_clip_idx[sfIdx][j] specifies the clipping index of the clipping value to use before multiplying by the j-th coefficient of the signaled luma filter indicated by sfIdx. When alf_luma_clip_idx[sfIdx][j] is not present, it is inferred to be equal to 0.

The coding tree unit syntax elements of ALF associated to LUMA component in VTM are listed as follows:

| | Descriptor |
|---|---|
| coding_tree_unit( ) { | |
| xCtb = CtbAddrX << CtbLog2Size Y | |
| yCtb = CtbAddrY << CtbLog2Size Y | |
| if( sh_alf_enabled_flag ){ | |
| **alf_ctb_flag**[ 0 ][ CtbAddrX ][ CtbAddrY ] | ae(v) |
| if( alf_ctb_flag[ 0 ][ CtbAddrX ][ CtbAddrY ] ) { | |
| if( sh_num_alf_aps_ids_luma > 0 ) | |
| **alf_use_aps_flag** | ae(v) |
| if( alf_use_aps_flag ) { | |
| if( sh_num_alf_aps_ids_luma > 1 ) | |
| **alf_luma_prev_filter_idx** | ae(v) |
| } else | |
| **alf_luma_fixed_filter_idx** | ae(v) |
| } | |
| } | |

alf_ctb_flag[cIdx][xCtb>>CtbLog 2SizeY] [yCtb>>CtbLog 2SizeY] equal to 1 specifies that the adaptive loop filter is applied to the coding tree block of the colour component indicated by cIdx of the coding tree unit at luma location (xCtb, yCtb). alf_ctb_flag[cIdx][xCtb>>CtbLog 2SizeY][yCtb>>CtbLog 2SizeY] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>CtbLog 2SizeY] [yCtb>>CtbLog 2SizeY] is not present, it is inferred to be equal to 0.

alf_use_aps_flag equal to 0 specifies that one of the fixed filter sets is applied to the luma CTB. alf_use_aps_flag equal to 1 specifies that a filter set from an APS is applied to the luma CTB. When alf_use_aps_flag is not present, it is inferred to be equal to 0.

alf_luma_prev_filter_idx specifies the previous filter that is applied to the luma CTB. The value of alf_luma_prev_filter_idx shall be in a range of 0 to sh_num_alf_aps_ids_luma−1, inclusive. When alf_luma_prev_filter_idx is not present, it is inferred to be equal to 0.

The variable AlfCtbFiltSetIdx Y[xCtb>>CtbLog 2SizeY] [yCtb>>CtbLog 2SizeY] specifying the filter set index for the luma CTB at location (xCtb, yCtb) is derived as follows:

If alf_use_aps_flag is equal to 0, AlfCtbFiltSetIdx Y[xCtb>>CtbLog 2SizeY][yCtb>>CtbLog 2SizeY] is set equal to alf_luma_fixed_filter_idx.

Otherwise, AlfCtbFiltSetIdxY[xCtb>>CtbLog 2Size Y][yCtb>>CtbLog 2SizeY] is set equal to 16+alf_luma_prev_filter_idx.

alf_luma_fixed_filter_idx specifies the fixed filter that is applied to the luma CTB. The value of alf_luma_fixed_filter_idx shall be in a range of 0 to 15, inclusive.

Based on the ALF design of VTM, the ALF design of ECM further introduces the concept of alternative filter sets into luma filters. The luma filters are be trained multiple alternatives/rounds based on the updated luma CTU ALF on/off decisions of each alternative/round. In such way, there will be multiple filter-sets that associated to each training alternative and the class merging results of each filter set may be different. Each CTU could select the best filter set by RDO and the related alternative information will be signaled.

The data syntax elements of ALF associated to LUMA component in ECM are listed as follows:

| | Descriptor |
|---|---|
| alf_data( ) { | |
| **alf_luma_filter_signal_flag** | u(1) |
| if( alf_luma_filter_signal_flag ) { | |
|   **alf_luma_num_alts_minus1** | ue(v) |
|   for(altIdx = 0; altIdx < alf_luma_num_alts_minus1 +1; altIdx++){ | |
|     **alf_luma_clip_flag**[altIdx] | u(1) |
|     **alf_luma_num_filters_signalled_minus1**[altIdx] | ue(v) |
|     if(alf_luma_num_filters_signalled_minus1[altIdx] > 0){ | |
|       for( filtIdx = 0; filtIdx < NumAlfFilters; filtIdx++ ) | |
|         **alf_luma_coeff_delta_idx**[altIdx][filtIdx] | u(v) |
|     } | |
|     for(sfIdx = 0; sfIdx <= alf_luma_num_filters_signalled_minus1[altIdx]; sfIdx++){ | |
|       for(j = 0; j < 19; j++){ | |
|         **alf_luma_coeff_abs**[altIdx][ sfIdx ][ j ] | ue(v) |
|         if( alf_luma_coeff_abs[altIdx][ sfIdx ][ j ] ) | |
|           **alf_luma_coeff_sign**[altIdx][ sfIdx ][ j ] | u(1) |
|       } | |
|     } | |
|     if( alf_luma_clip_flag [altIdx]) | |
|       for( sfIdx = 0; sfIdx <= alf_luma_num_filters_signalled_minus1[altIdx]; sfIdx++ ) | |
|         for( j = 0; j <19; j++ ) | |
|           **alf_luma_clip_idx**[altIdx][ sfIdx ][ j ] | u(2) |
|   } | |
| } | |

alf_luma_coeff_abs[altIdx][sfIdx][j] specifies the absolute value of the j-th coefficient of the signaled luma filter indicated by sfIdx of the alternative luma filter set with index altIdx.

When alf_luma_coeff_abs[altIdx][sfIdx][j] is not present, it is inferred to be equal 0. The value of alf_luma_coeff_abs[altIdx][sfIdx][j] shall be in the range of 0 to 128, inclusive.

alf_luma_coeff_sign[altIdx][sfIdx][j] specifies the sign of the j-th luma coefficient of the filter indicated by sfIdx of the alternative luma filter set with index altIdx as follows:

If alf_luma_coeff_sign[altIdx][sfIdx][j] is equal to 0, the corresponding luma filter coefficient has a positive value.

alf_luma_num_alts_minus1 plus 1 specifies the number of alternative filter sets for luma component. The value of alf_luma_num_alts_minus1 shall be in the range of 0 to 3, inclusive.

alf_luma_clip_flag[altIdx] equal to 0 specifies that linear adaptive loop filtering is applied to the alternative luma filter set with index altIdx. alf_luma_clip_flag[altIdx] equal to 1 specifies that non-linear adaptive loop filtering could be applied to the alternative luma filter set with index altIdx.

alf_luma_num_filters_signaled_minus1[altIdx] plus 1 specifies the number of adaptive loop filter classes for which luma coefficients can be signaled of the alternative luma filter set with index altIdx. The value of alf_luma_num_filters_signaled_minus1 [altIdx] shall be in the range of 0 to NumAlfFilters−1, inclusive.

alf_luma_coeff_delta_idx[altIdx][filtIdx] specifies the indices of the signaled adaptive loop filter luma coefficient deltas for the filter class indicated by filtIdx ranging from 0 to NumAlfFilters−1 for the alternative luma filter set with index altIdx. When alf_luma_coeff_delta_idx[filtIdx][altIdx] is not present, it is inferred to be equal to 0. The length of alf_luma_coeff_delta_idx[altIdx][filtIdx] is Ceil(Log 2(alf_luma_num_filters_signaled_minus1[altIdx]+1)) bits. The value of alf_luma_coeff_delta_idx[altIdx][filtIdx] shall be in the range of 0 to alf_luma_num_filters_signaled_minus1 [altIdx], inclusive.

Otherwise (alf_luma_coeff_sign[altIdx][sfIdx][j] is equal to 1), the corresponding luma filter coefficient has a negative value.

When alf_luma_coeff_sign[altIdx][sfIdx][j] is not present, it is inferred to be equal to 0.

alf_luma_clip_idx[altIdx][sfIdx][j] specifies the clipping index of the clipping value to use before multiplying by the j-th coefficient of the signaled luma filter indicated by sfIdx of the alternative luma filter set with index altIdx. When alf_luma_clip_idx[altIdx][sfIdx][j] is not present, it is inferred to be equal to 0.

The coding tree unit syntax elements of ALF associated to LUMA component in ECM are listed as follows:

| | Descriptor |
|---|---|
| coding_tree_unit( ) { | |
| xCtb = CtbAddrX << CtbLog2SizeY | |
| yCtb = CtbAddrY << CtbLog2SizeY | |
| if( sh_alf_enabled_flag ){ | |
|   **alf_ctb_flag**[ 0 ][ CtbAddrX ][ CtbAddrY ] | ae(v) |
|   if( alf_ctb_flag[ 0 ][ CtbAddrX ][ CtbAddrY ] ) { | |
|     if( sh_num_alf_aps_ids_luma > 0 ) | |
|       **alf_use_aps_flag** | ae(v) |
|     if( alf_use_aps_flag ) { | |
|       if( sh_num_alf_aps_ids_luma > 1 ) | |
|     **alt_ctb_luma_filter_alt_idx**[CtbAddrX][CtbAddrY] | ae(v) |
|         **alf_luma_prev_filter_idx** | ae(v) |

-continued

| | Descriptor |
|---|---|
| } else | |
| **alf_luma_fixed_filter_idx** | ae(v) |
| } | |
| } | |

alf_ctb_luma_filter_alt_idx[xCtb>>CtbLog 2Size Y][yCtb>>CtbLog 2SizeY] specifies the index of the alternative luma filters applied to the coding tree block of the luma component, of the coding tree unit at luma location (xCtb, yCtb). When alf_ctb_luma_filter_alt_idx[xCtb>>CtbLog 2Size Y][yCtb>>CtbLog 2Size Y] is not present, it is inferred to be equal to zero.

3.8. Bilateral In-Loop Filter 3.8.1 Bilateral Image Filter

Bilateral image filter is a nonlinear filter that smooths the noise while preserving edge structures. The bilateral filtering is a technique to make the filter weights decrease not only with the distance between the samples but also with increasing difference in intensity. This way, over-smoothing of edges can be ameliorated. A weight is defined as $$w(\Delta x, \Delta y, \Delta I) = e^{-\frac{\Delta x^2+\Delta y^2}{2\sigma_d^2}-\frac{\Delta I^2}{2\sigma_r^2}}$$

where Δx and Δy is the distance in the vertical and horizontal and ΔI is the difference in intensity between the samples.

The edge-preserving de-noising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Combining the range filter and the domain filter, a bilateral filter at an edge pixel becomes an elongated Gaussian filter that is oriented along the edge and is greatly reduced in gradient direction. This is the reason why the bilateral filter can smooth the noise while preserving edge structures.

3.8.2 Bilateral Filter in Video Coding

The bilateral filter in video coding is proposed as a coding tool for the VVC. The filter acts as a loop filter in parallel with the sample adaptive offset (SAO) filter. Both the bilateral filter and SAO act on the same input samples, each filter produces an offset, and these offsets are then added to the input sample to produce an output sample that, after clipping, goes to the next stage. The spatial filtering strength $\sigma_d$ is determined by the block size, with smaller blocks filtered more strongly, and the intensity filtering strength σ, is determined by the quantization parameter, with stronger filtering being used for higher QPs. Only the four closest samples are used, so the filtered sample intensity $I_F$ can be calculated as $$I_F = I_C + \frac{w_A\Delta I_A + w_B\Delta I_B + w_L\Delta I_L + w_R\Delta I_R}{w_C + w_A + w_B + w_L + w_R}$$

where $I_C$ denotes the intensity of the center sample, $\Delta I_A=I_A-I_C$ the intensity difference between the center sample and the sample above. $\Delta I_B$, $\Delta I_L$ and $\Delta I_R$ denote the intensity difference between the center sample and that of the sample below, to the left and to the right respectively.

4. PROBLEMS

The existing designs for adaptive loop filter in video coding have the following problems:

1. In current ALF design, a fixed filter shape is used for online-trained filters or offline-trained filters. The performance of ALF may be further improved by using filter shape selection.
2. In current ALF design, an APS only contains filters with one filter shape for each color component. The performance of ALF may be further improved by storing filters with different shapes.

5. EXEMPLARY EMBODIMENTS

To solve the above problems and some other problems not mentioned, methods as summarized below are disclosed. The embodiments should be considered as examples to explain the general concepts and should not be interpreted in a narrow way. Furthermore, these embodiments can be applied individually or combined in any manner.

It should be noted that the proposed methods may be used as in-loop filters or post-processing. In this disclosure, a video unit may refer to a sequence, a picture, a sub-picture, a slice, a CTU, a block or a region. The video unit may comprise one color component or it may comprise multiple color components.

In this disclosure, an ALF processing unit may refer to a sequence, a picture, a sub-picture, a slice, a CTU, a block, a region, or a sample. The ALF processing unit may comprise one color component or it may comprise multiple color components.

1) It is proposed to apply multiple filter shapes within a video unit which is mentioned as filter shape selection method in the following bullets.
   a. In one example, for two samples within a video unit, the filter shapes to be applied may be different.
   b. In one example, for two CTU/CTBs, the filter shapes to be applied may be different.
   c. In one example, for two regions within the video unit (e.g., a slice/tile/subpicture/picture), the filter shapes to be applied may be different.
   d. Alternatively, furthermore, which filter shape to be selected from the multiple filter shapes may be signaled or inherited or derived on-the-fly.
   e. In one example, a filter shape may represent which neighboring samples (adjacent or non-adjacent) to be involved in the filtering process of current sample.
      a) Alternatively, a filter shape may represent how many neighboring samples are involved.
      b) Two filtering methods with different filter taps may also be treated as two different filter shapes (even the filter coefficients for certain locations could be treated to be equal to 0).
         1. For example, diamond 5*5 is treated as a different filter shape from diamond 7*7.
         2. For example, diamond 5*5 is treated as a different filter shape from limited square 5*5 even filter taps are the same.
   f. In one example, indications of filter shapes may be signaled in a bitstream, e.g., in the ALF APS.
      a) Alternatively, furthermore, for a video unit to be filtered, when the filter coefficients are inherited/ predicted from a given ALF APS, the associated filter shape of the ALF APS may be also inherited.

2) In one example, the proposed/described filter shape selection method may be applied to any in-loop filtering tools, pre-processing or post-processing filtering method in video coding (including but not limited to ALF/CCALF or any other filtering method).
   a. In one example, the proposed filter shape selection method may be applied to an in-loop filtering method.
      a) In one example, the proposed filter shape selection method may be applied to ALF.
      b) In one example, the proposed filter shape selection method may be applied to CCALF.
      c) Alternatively, the proposed filter shape selection method may be applied to other in-loop filtering methods.
   b. In one example, the proposed filter shape selection method may be applied to a pre-processing filtering methods.
   c. In one example, the proposed filter shape selection method may be applied to a post-processing filtering methods.
3) The online-trained filters (e.g., the derived filters according to least square error between reconstruction and original samples) may have multiple sets of filter coefficients and each set may correspond to one or multiple filter shapes.
   a. In one example, the online-trained filters for a LUMA component may use multiple filter shape candidates.
   b. In one example, the online-trained filters for a CHROMA component may use multiple filter shape candidates.
   c. In one example, the encoder may collect training data for each shape candidate.
      a) In one example, the collected data may be used individually for training each shape candidate.
      b) In one example, the collected data may be used jointly for training each shape candidate.
   d. In one example, the class merging may be performed on multiple filter shapes.
      a) In one example, the class merging may be performed on each shape candidate individually.
      b) In one example, the class merging may be performed on each shape candidate jointly.
      c) Alternatively, the class merging results may be reused between shape candidates.
   e. In one example, the training alternative number/round may be decided for each shape candidate.
      a) In one example, the training alternative number/round may be decided for each shape candidate individually.
      b) In one example, the training alternative number/round may be decided for each shape candidate jointly.
      c) Alternatively, the training alternative number/round may be reused between different shape candidates.
   f. In one example, the online-trained filters with different shapes may use one or more extra/virtual taps for training and filtering.
      a) In one example, an extra/virtual tap may use other input instead of a sample that located at a specific position in the spatial domain.
         1. In one example, an extra/virtual tap may use the intermediate filtering result of an online-trained filter as input.
         2. In one example, an extra/virtual tap may use the intermediate filtering result of an offline-trained filter as input.
         3. In one example, an extra/virtual tap may use the intermediate result that generated by a coding tool as input.
         4. Alternatively, an extra/virtual tap may use a derived/determined on the fly value as input.
      b) In one example, each shape candidate may use the intermediate filtering results from the offline-trained filters with an identical shape as the extra/virtual taps.
      c) In one example, each shape candidate may use the intermediate filtering results from the offline-trained filters with different shapes as the extra/virtual taps.
      d) In one example, each shape candidate may use the intermediate filtering results from other online-trained filters with an identical shape as extra/virtual taps.
      e) In one example, each shape candidate may use the intermediate filtering results from other online-trained filters with different shapes as the extra/virtual taps.
4) The offline-trained filters (e.g., the fixed filters in GALF of VVC) may have multiple sets of filter coefficients and each set may correspond to one or multiple filter shapes.
   a. In one example, the offline-trained filters for a LUMA component may have multiple filter shape candidates.
   b. In one example, the offline-trained filters for CHROMA components may have multiple filter shape candidates.
5) Different sets of samples may use filters with different filter shapes.
   a. A set of samples may correspond to an ALF processing unit, such as a CTU/CTB.
      a) Alternatively, a set of samples may correspond to samples in a picture or a slice or a sub-picture or a sequence.
      b) Alternatively, a set of samples may correspond to samples in a specific band, such as samples with values in the range of [Smin, Smax].
   b. In one example, a filter shape index may be signaled/derived/determined on the fly for each ALF processing unit.
   c. In one example, an on/off control flag may be signaled/derived/determined on the fly for each ALF processing unit.
   d. In one example, an alternative number index may be signaled/derived/determined on the fly for each ALF processing unit.
6) A first syntax element may be signaled to indicate the filter shape.
   a. In one example, the first syntax element may be coded by arithmetic coding.
      a) In one example, the first syntax element may be coded with at least one context.
         1. The context may depend on coding information of the current block or neighbouring block.
         2. The context may depend on the filtering shape of at least one neighbouring block.

b) In one example, the first syntax element may be coded with bypass coding.

b. In one example, the first syntax element may be binarized by unary code, or truncated unary code, or fixed-length code, or exponential Golomb code, truncated exponential Golomb code, etc.

c. In one example, the first syntax element may be signaled conditionally.

a) For example, the first syntax element may be signaled only if the number of available filter shapes is at least two.

d. The first syntax element may be coded in a predictive way.

a) The first syntax element may be predicted by the filtering shape of at least one neighbouring block.

e. The first syntax element may be signaled independently for different color components.

a) Alternatively, the first syntax element may be signaled and shared for different color components.

b) Alternatively, the first syntax element may be signaled for a first color component but not signaled for a second color component.

7) A syntax element structure (such as an APS) may contain filters with one or more filter shapes for different color components. In the following discussion, APS may be used to represent the syntax element structure.

a. In one example, a syntax element structure may contain filters with an identical filter shape for LUMA component.

a) In one example, a LUMA shape candidate index may be signaled in a syntax element structure.

b) In one example, the number of enabled LUMA filters with the selected filter shape candidate may be signaled in the syntax element structure.

c) In one example, the class merging results of the filters with the selected filter shape candidate may be signaled in the syntax element structure.

d) In one example, the coefficients of LUMA filters with the selected filter shape candidate may be signaled in the syntax element structure.

e) In one example, the clip parameters of CHROMA filters with the selected filter shape candidate may be signaled in the syntax element structure.

b. In one example, a syntax element structure may contain filters with an identical filter shape for CHROMA components.

a) In one example, a CHROMA shape candidate index may be signaled in the syntax element structure.

b) In one example, the number of enabled CHROMA filters with the selected filter shape candidate may be signaled in the syntax element structure.

c) In one example, the class merging results of the selected shape candidate may be signaled in the syntax element structure.

d) In one example, the coefficients of CHROMA filters with the selected filter shape candidate may be signaled in the syntax element structure.

e) In one example, the clip parameters of CHROMA filters with the selected filter shape candidate may be signaled in the syntax element structure.

c. In one example, a syntax element structure (such as an APS) may contain filters with different filter shapes for LUMA component.

a) In one example, the filter shape indices of each filter may be signaled.

1. In one example, the filter shape indices of each filter set with different filter shapes may be signaled in the syntax element structure.

b) In one example, the number of enabled filters associated with a filter shape index may be signaled in the syntax element structure.

1. In one example, the number of enabled filters of each filter set that associated with a filter shape index may be signaled in the syntax element structure.

c) In one example, the class merging results may be signaled in the syntax element structure.

1. In one example, the class merging results of each filter set that associated with a filter shape index may be signaled in the syntax element structure.

d) In one example, the coefficients of each enabled filter may be signaled in the syntax element structure.

1. In one example, the coefficients of each filter set that associated with a filter shape index may be signaled in the syntax element structure.

2. In one example, the clip parameters of each filter set that associated with a filter shape index may be signaled in the syntax element structure.

d. In one example, a syntax element structure may contain filters with different filter shapes for CHROMA components.

a) In one example, the filter shape indices of each filter may be signaled.

1. In one example, the filter shape indices of each filter set that associated with a filter shape index may be signaled in the syntax element structure.

b) In one example, the number of enabled filters may be signaled in the syntax element structure.

1. In one example, the number of enabled filters of each filter set that associated with a filter shape index may be signaled in the syntax element structure.

c) In one example, the class merging results may be signaled in the syntax element structure.

1. In one example, the class merging results of each filter set that associated with a filter shape index may be signaled in the syntax element structure.

d) In one example, the coefficients of each enabled filter may be signaled in the syntax element structure.

1. In one example, the coefficients of each filter set that associated with a filter shape index may be signaled in the syntax element structure.

2. In one example, the clip parameters of each filter set that associated with a filter shape index may be signaled in the syntax element structure.

e. In one example, a syntax element structure may contain filters with an identical filter shape for other color components.

f. In one example, a syntax element structure may contain filters with different filter shapes for other color components.

g. In one example, the number of signaled coefficients for a specific filter may depend on different filter shapes.

h. In one example, the number of signaled clip parameters for a specific filter may depend on different filter shapes.

Figure 7:
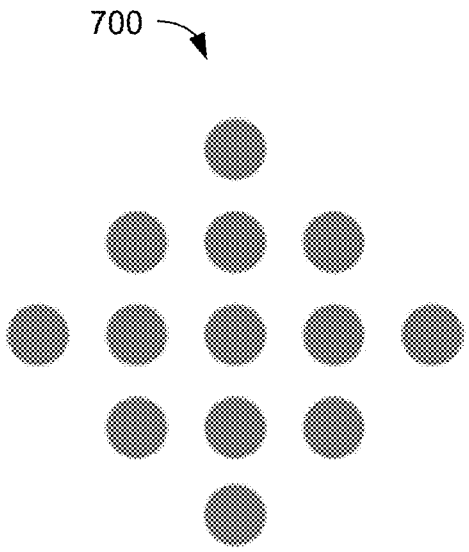
FIG. 7 illustrates a diamond shape with a size of 5×5.
Figure 8:
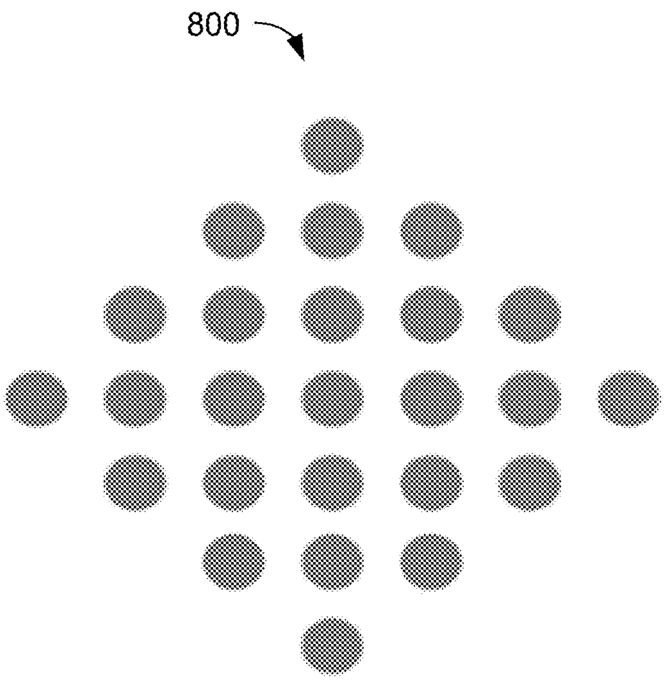
FIG. 8 illustrates a diamond shape with a size of 7×7.
Figure 9:
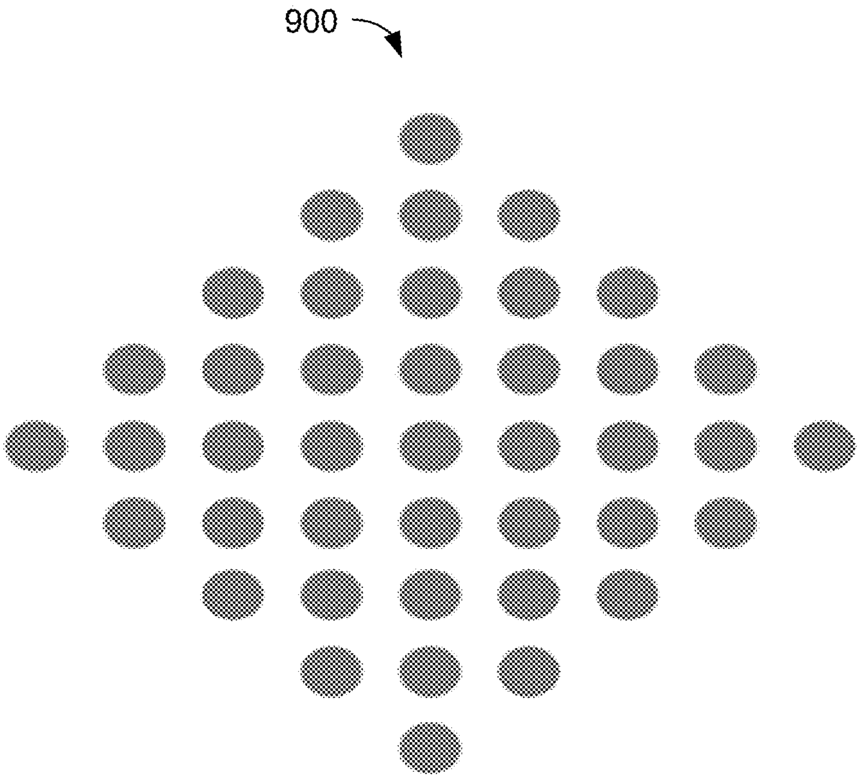
FIG. 9 illustrates a diamond shape with a size of 9×9.
Figure 10:
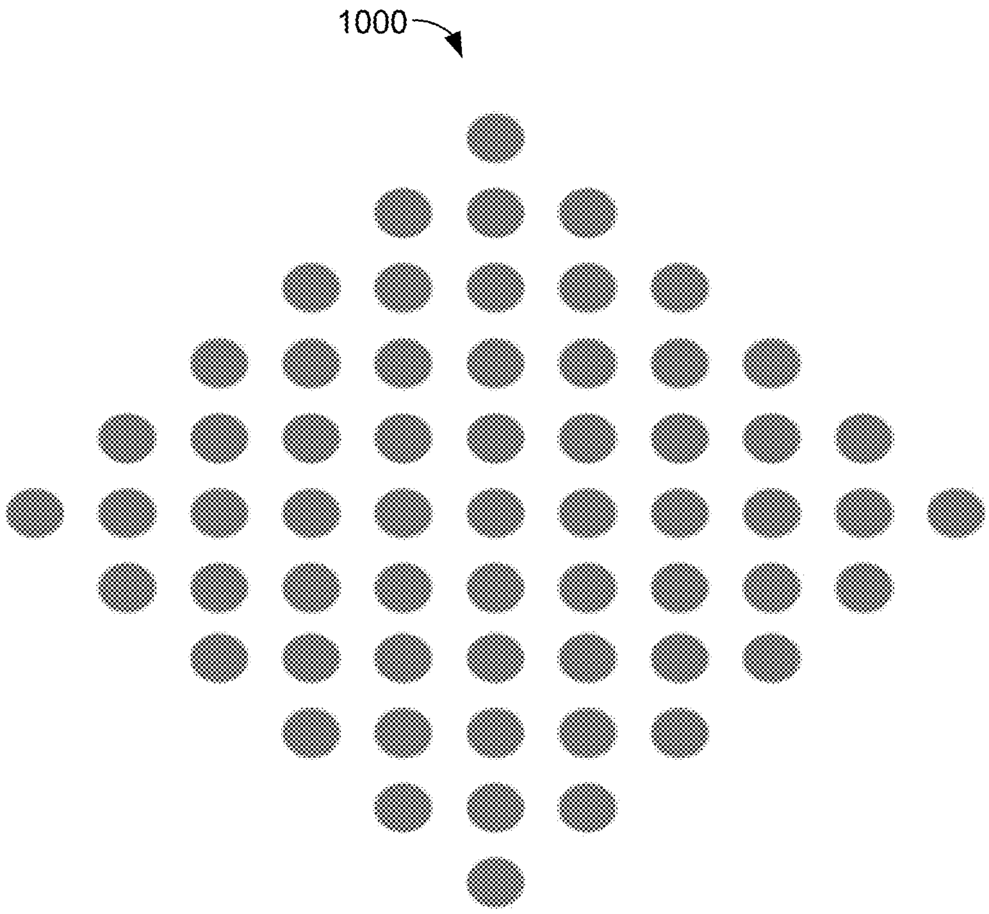
FIG. 10 illustrates a diamond shape with a size of 11×11.
Figure 11:
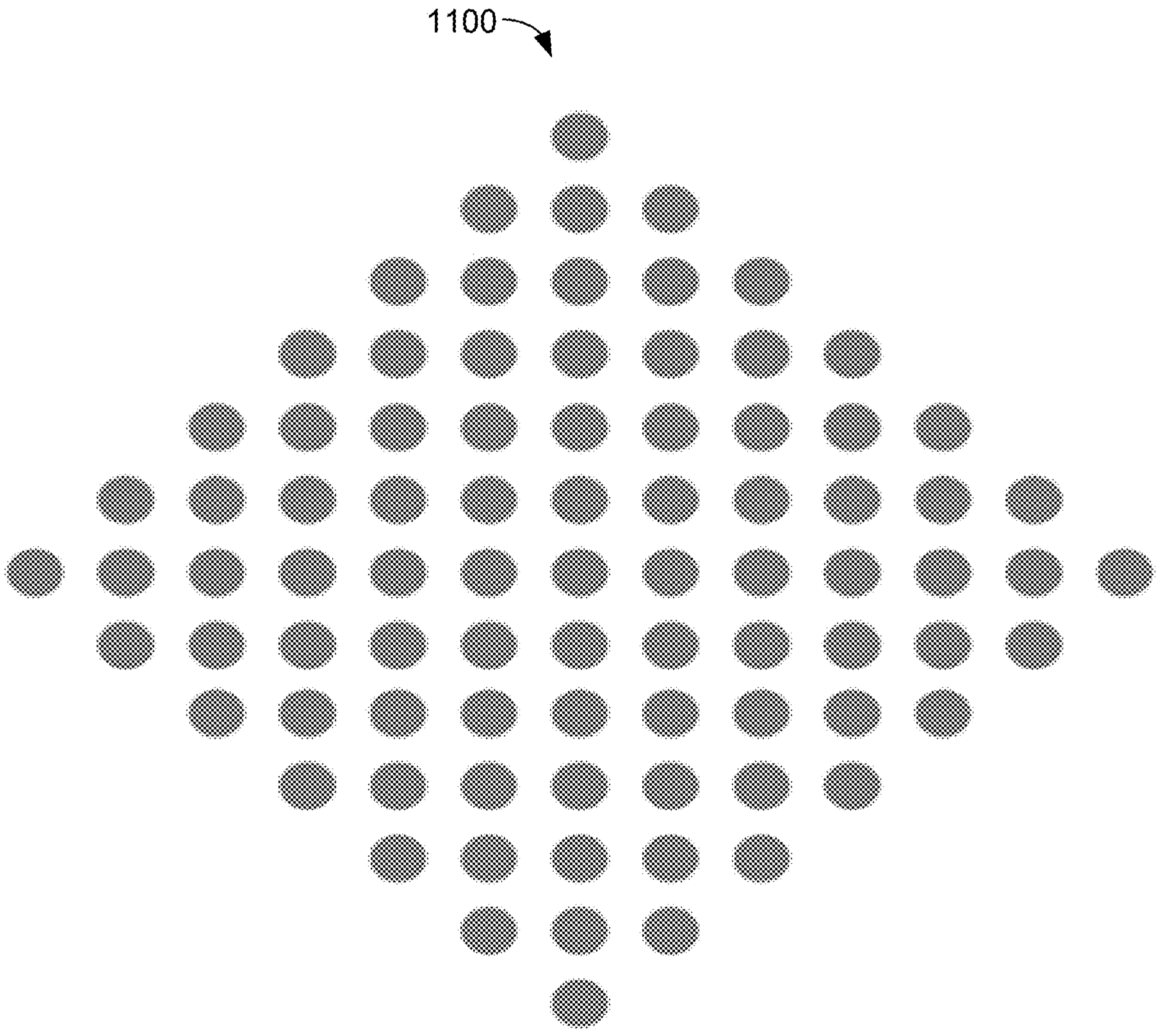
FIG. 11 illustrates a diamond shape with a size of 13×13.
Figure 12:
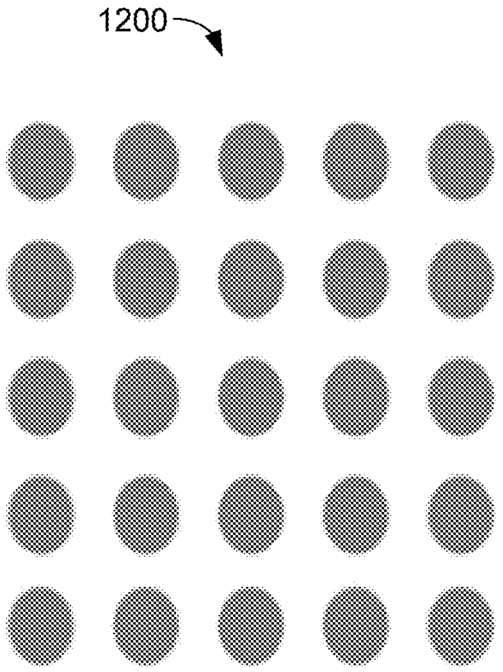
FIG. 12 illustrates a square shape with a size of 5×5.
Figure 13:
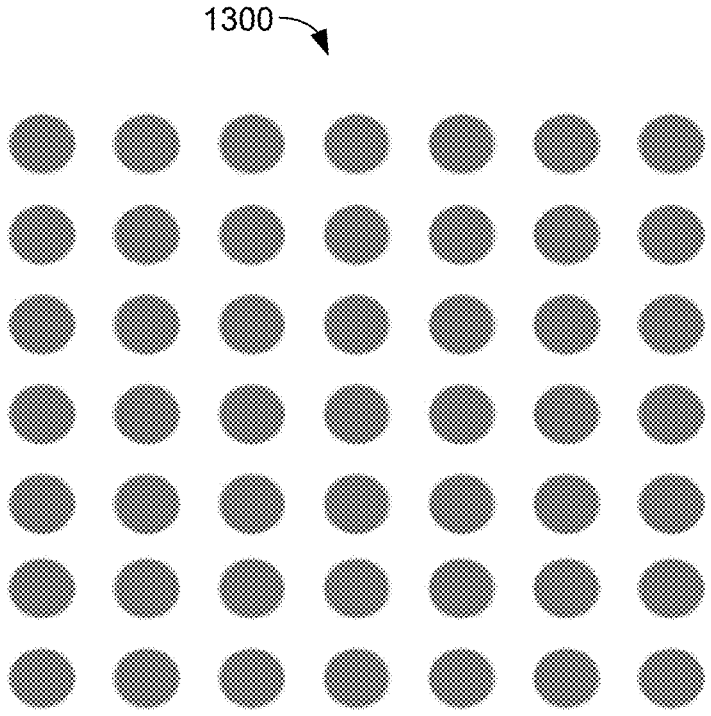
FIG. 13 illustrates a square shape with a size of 7×7.
Figure 14:
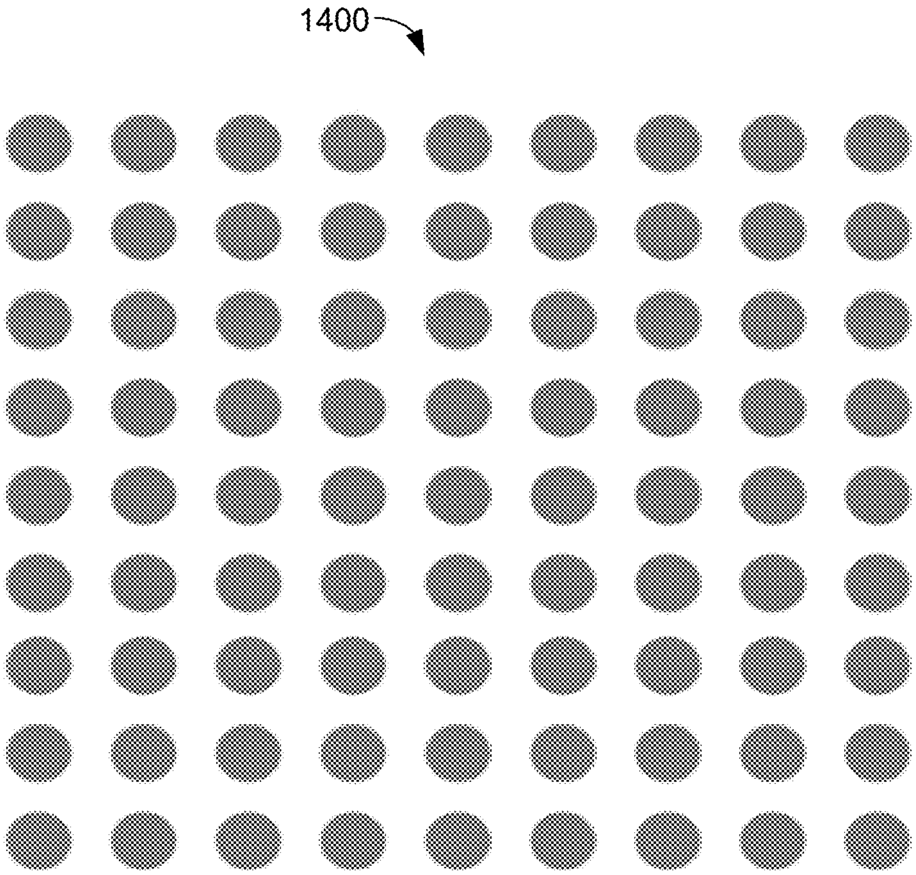
FIG. 14 illustrates a square shape with a size of 9×9.
Figure 15:
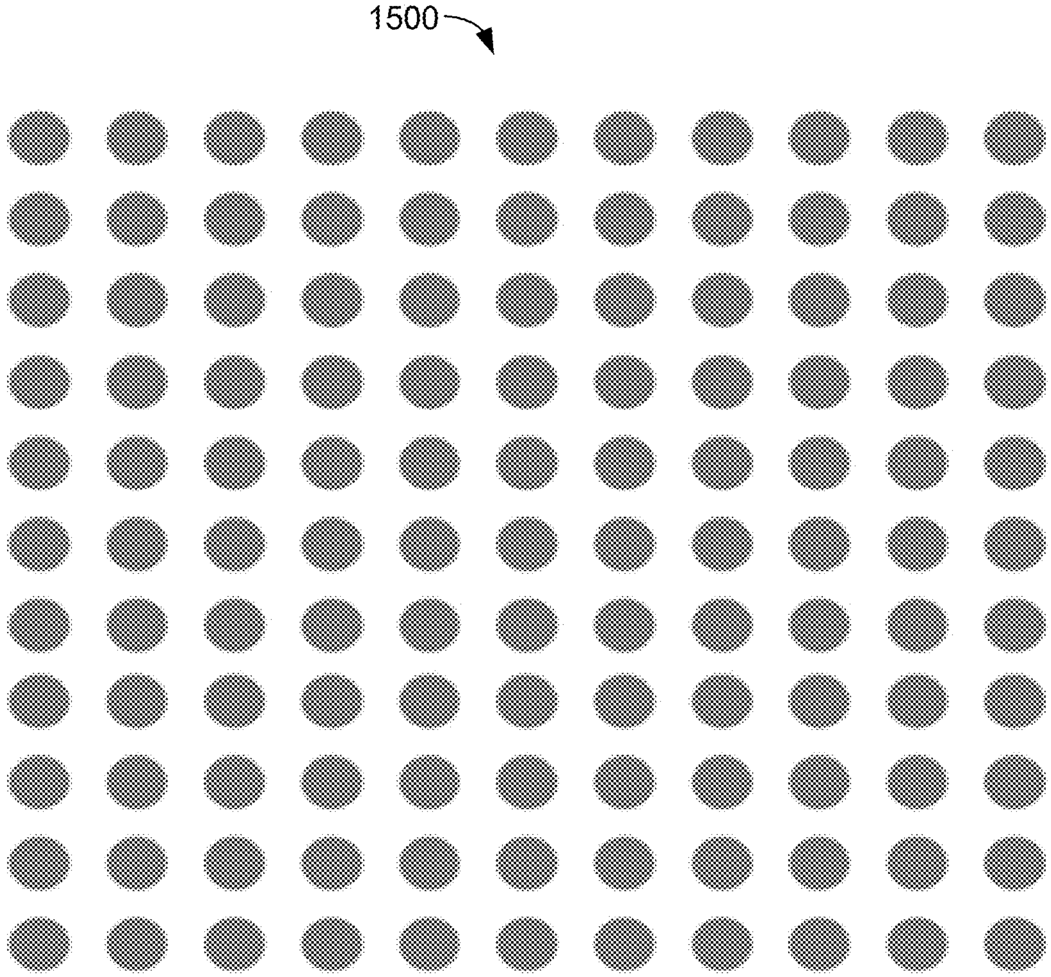
FIG. 15 illustrates a square shape with a size of 11×11.
Figure 16:
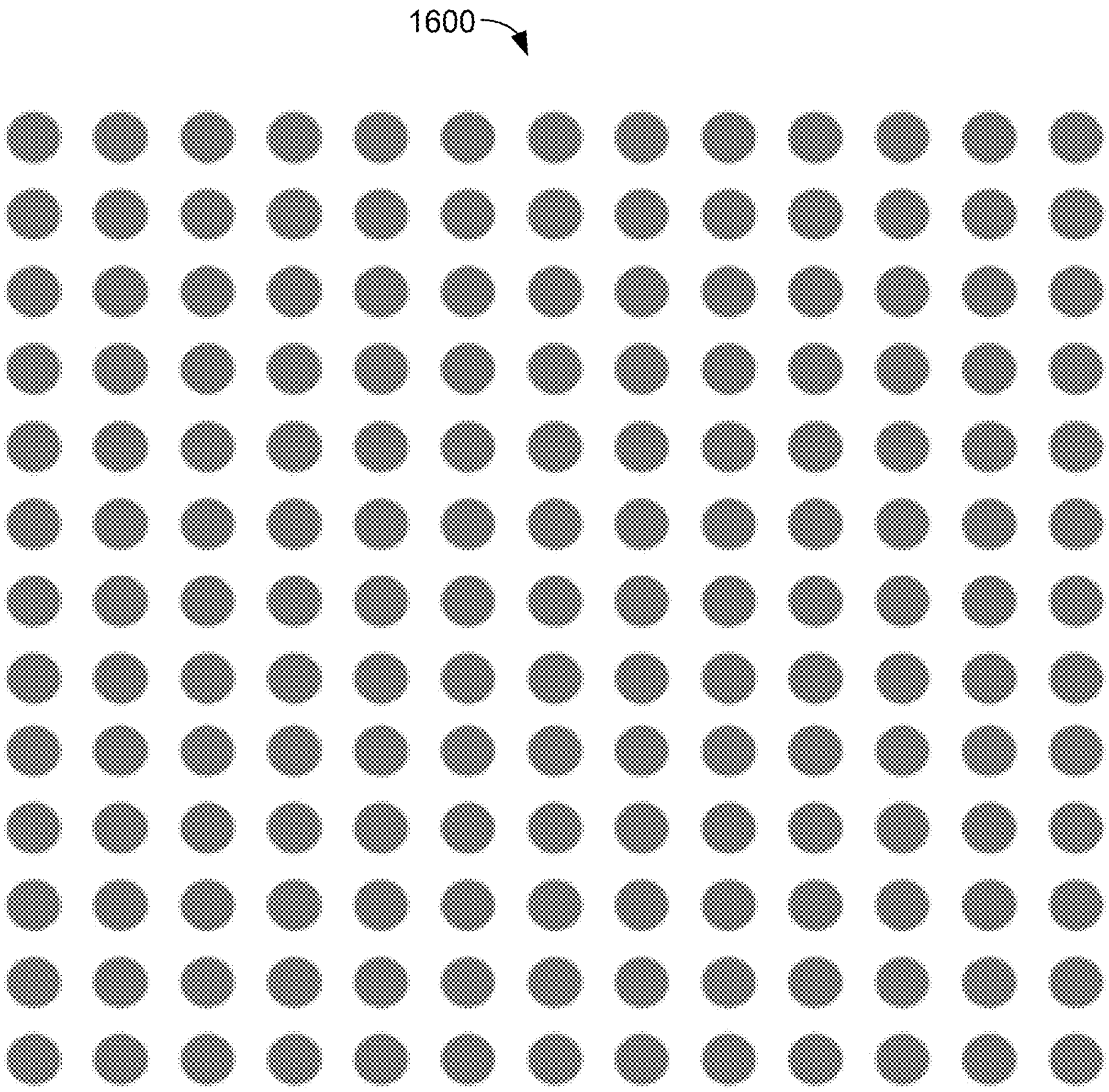
FIG. 16 illustrates a square shape with a size of 13×13.
Figure 17:
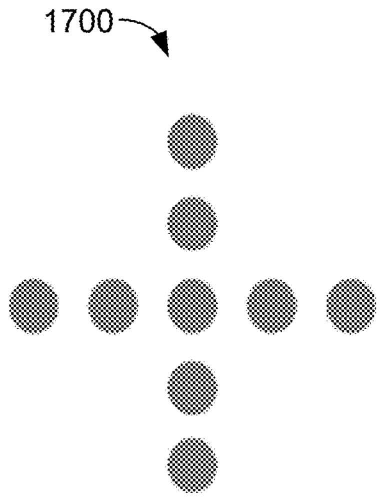
FIG. 17 illustrates a cross shape with a size of 5×5.
Figure 18:
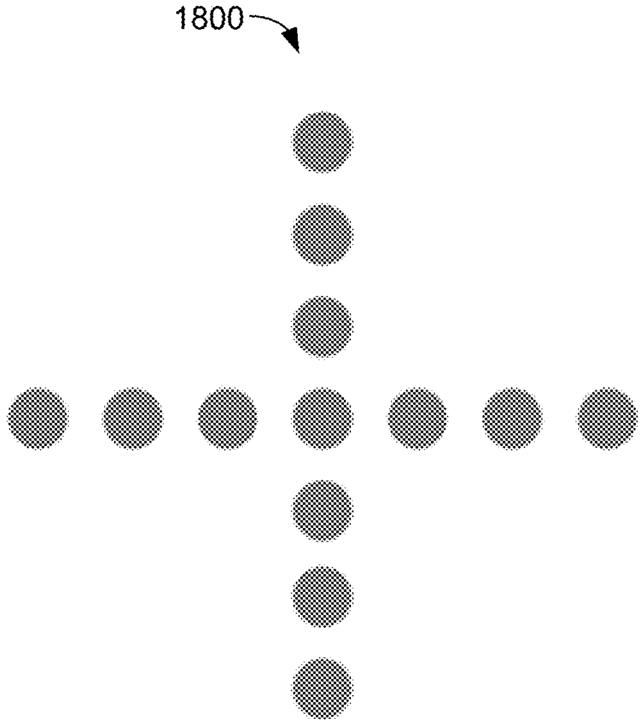
FIG. 18 illustrates a cross shape with a size of 7×7.
Figure 19:
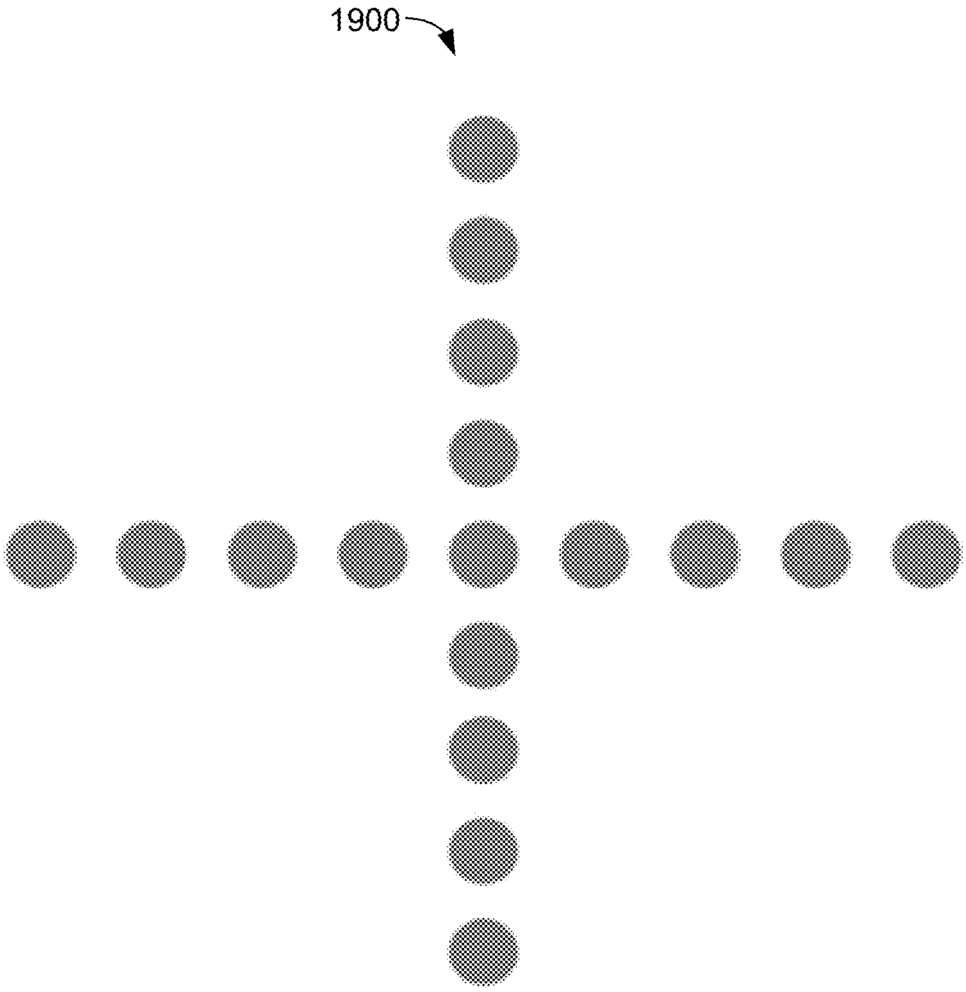
FIG. 19 illustrates a cross shape with a size of 9×9.
Figure 20:
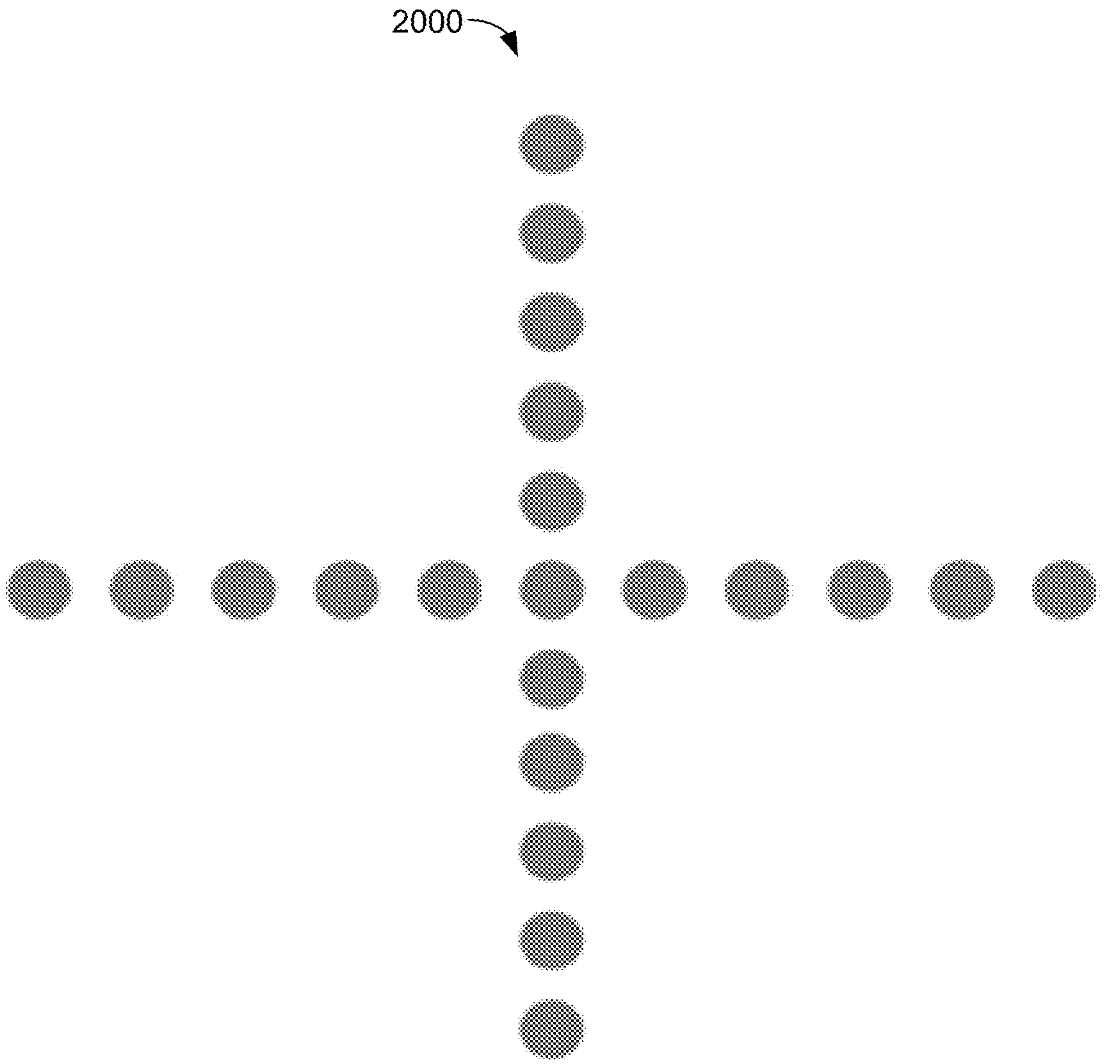
FIG. 20 illustrates a cross shape with a size of 11×11.
Figure 21:
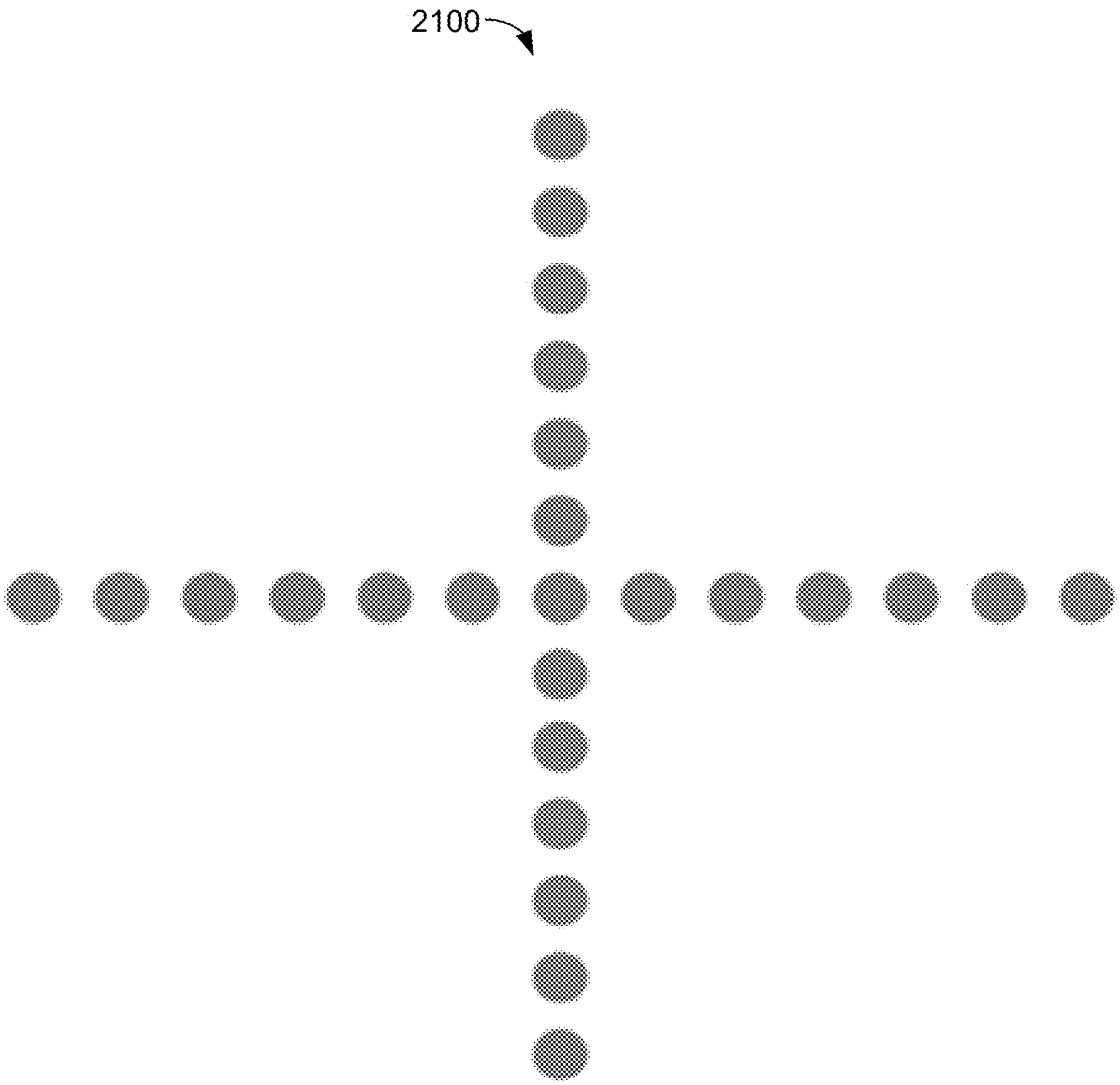
FIG. 21 illustrates a cross shape with a size of 13×13.
Figure 22:
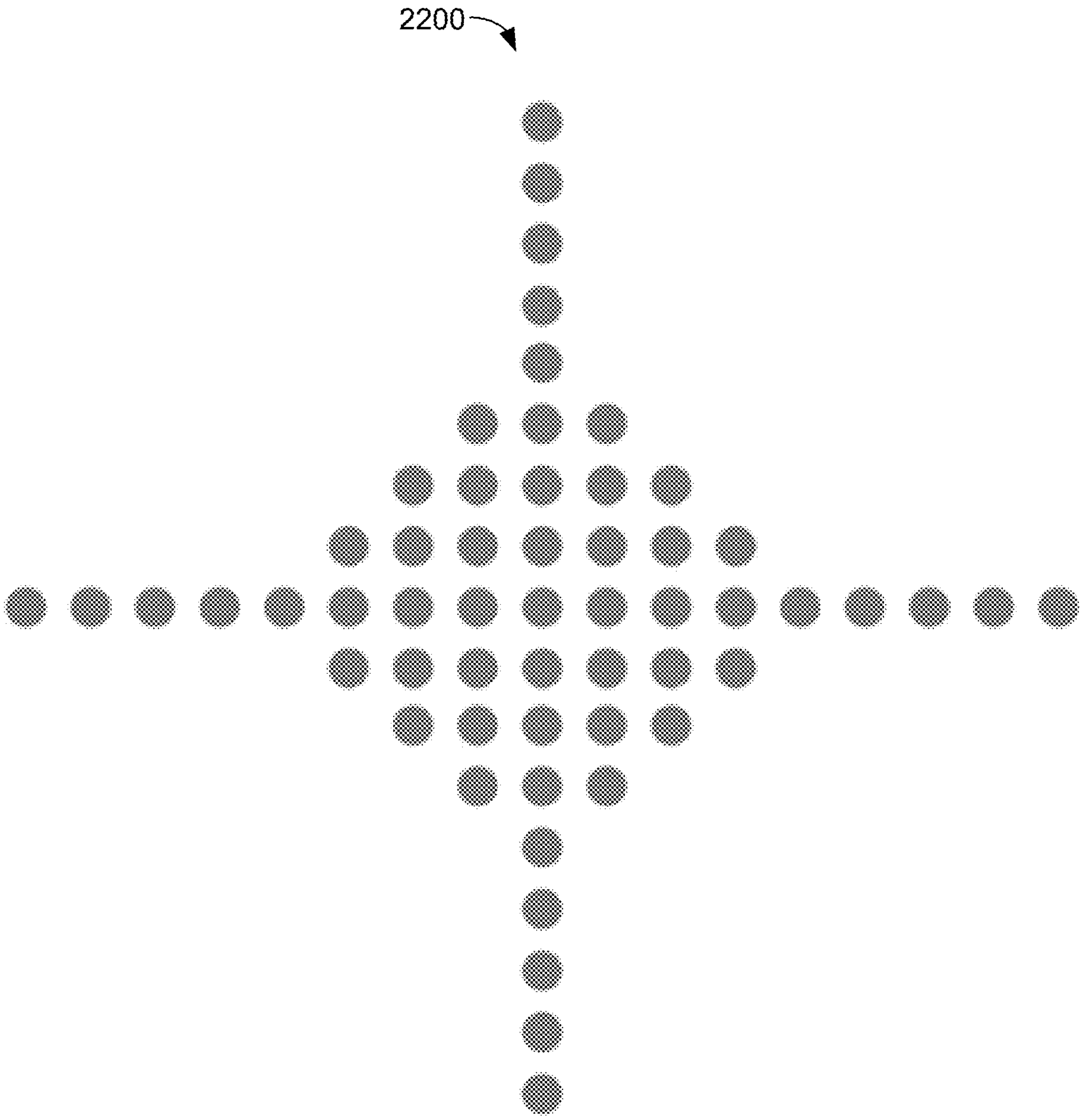
FIG. 22 illustrates a symmetrical shape with a size of 17×17.
Figure 23:
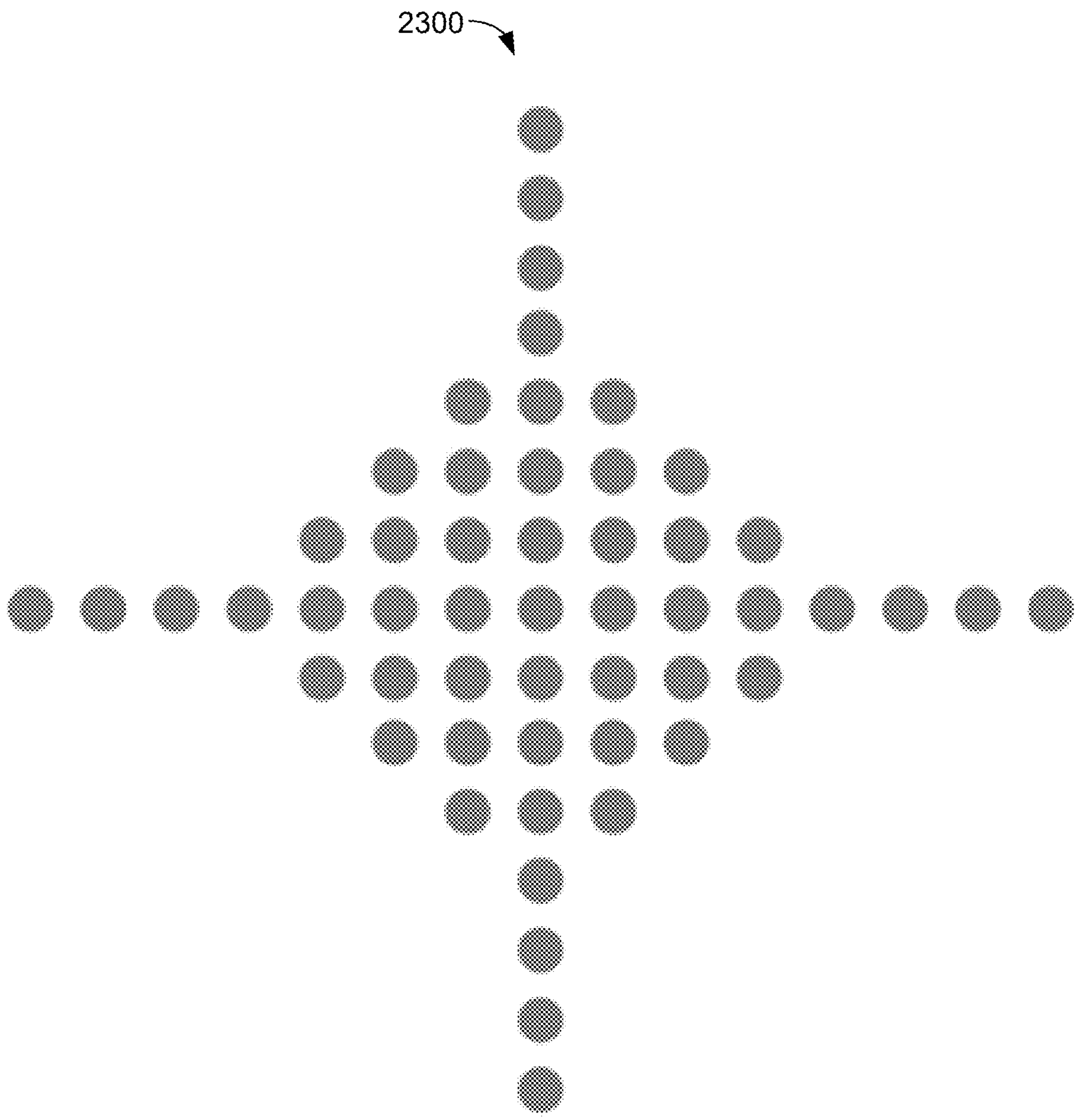
FIG. 23 illustrates a symmetrical shape with a size of 15×15.
Figure 24:
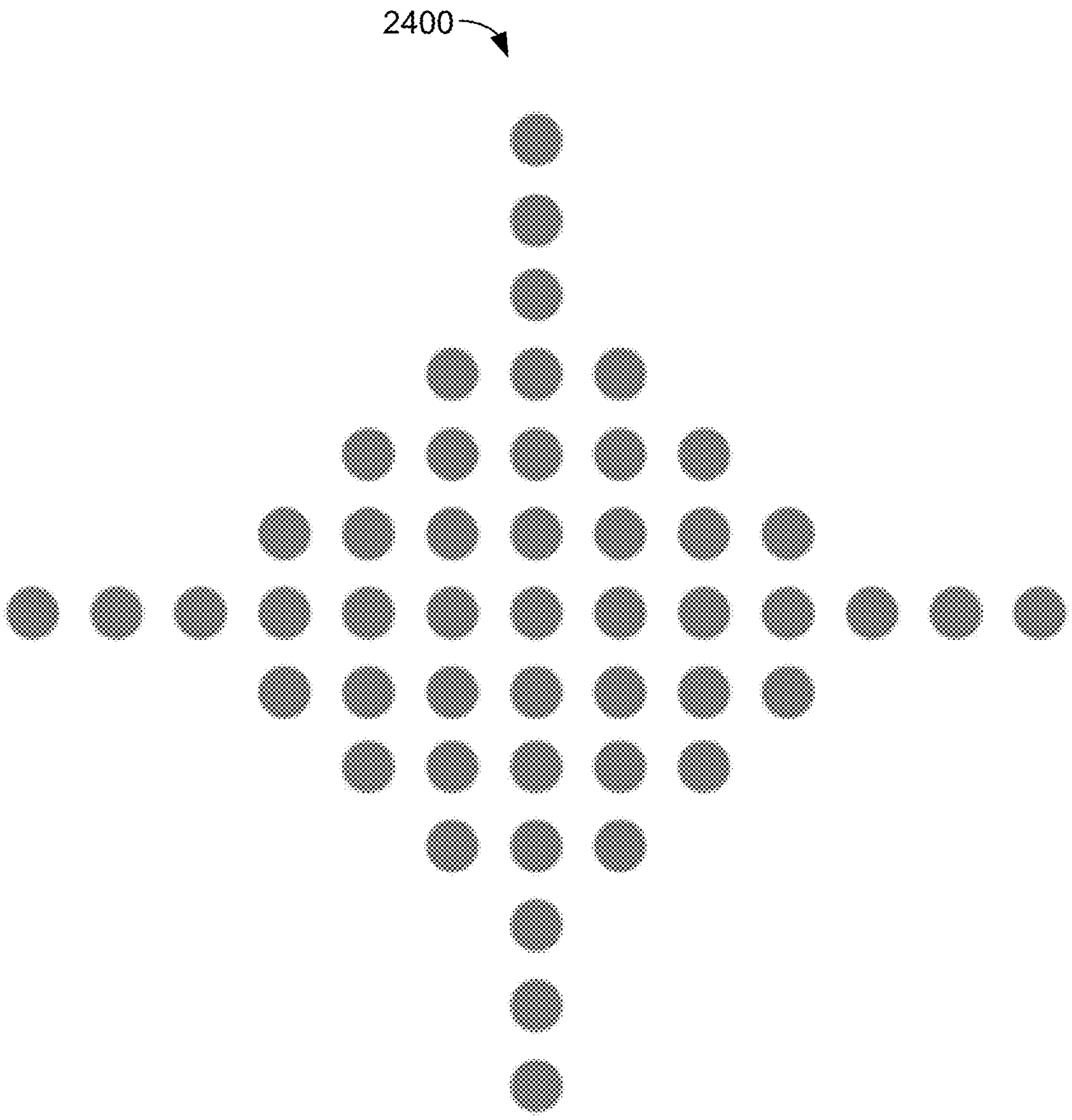
FIG. 24 illustrates a symmetrical shape with a size of 13×13.
Figure 25:
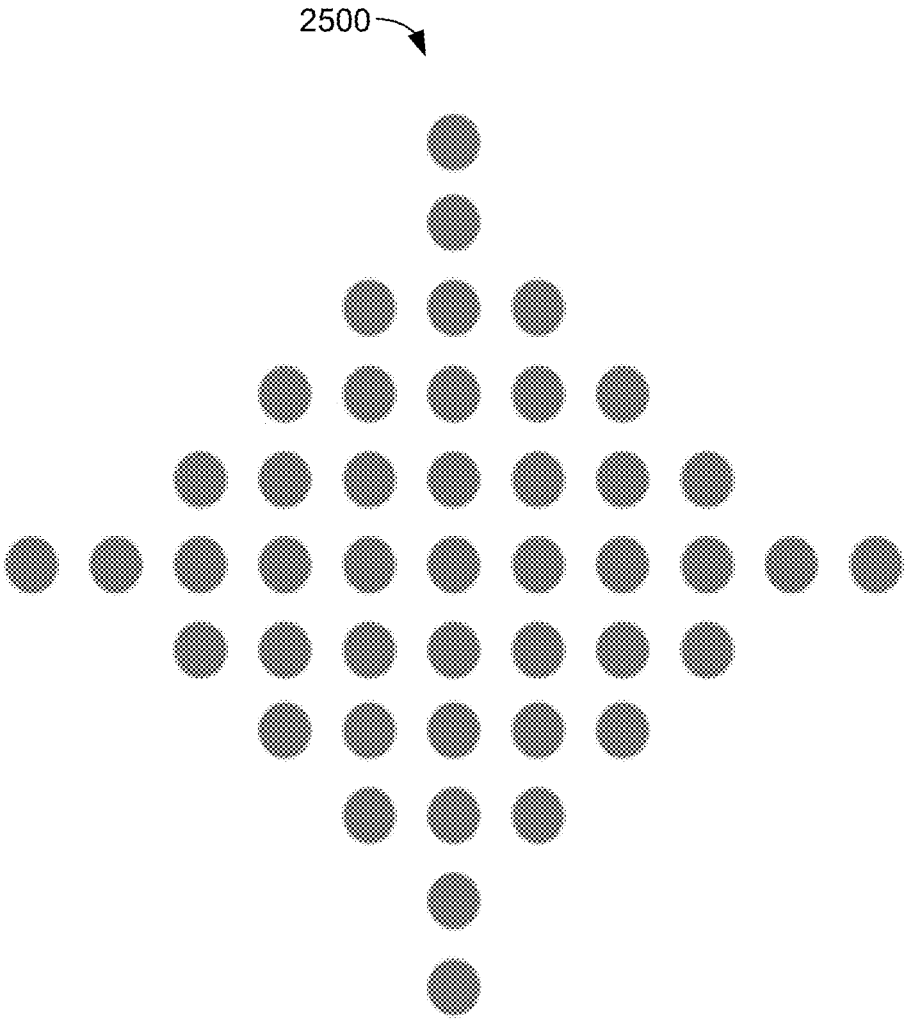
FIG. 25 illustrates a symmetrical shape with a size of 11×11.
Figure 26:
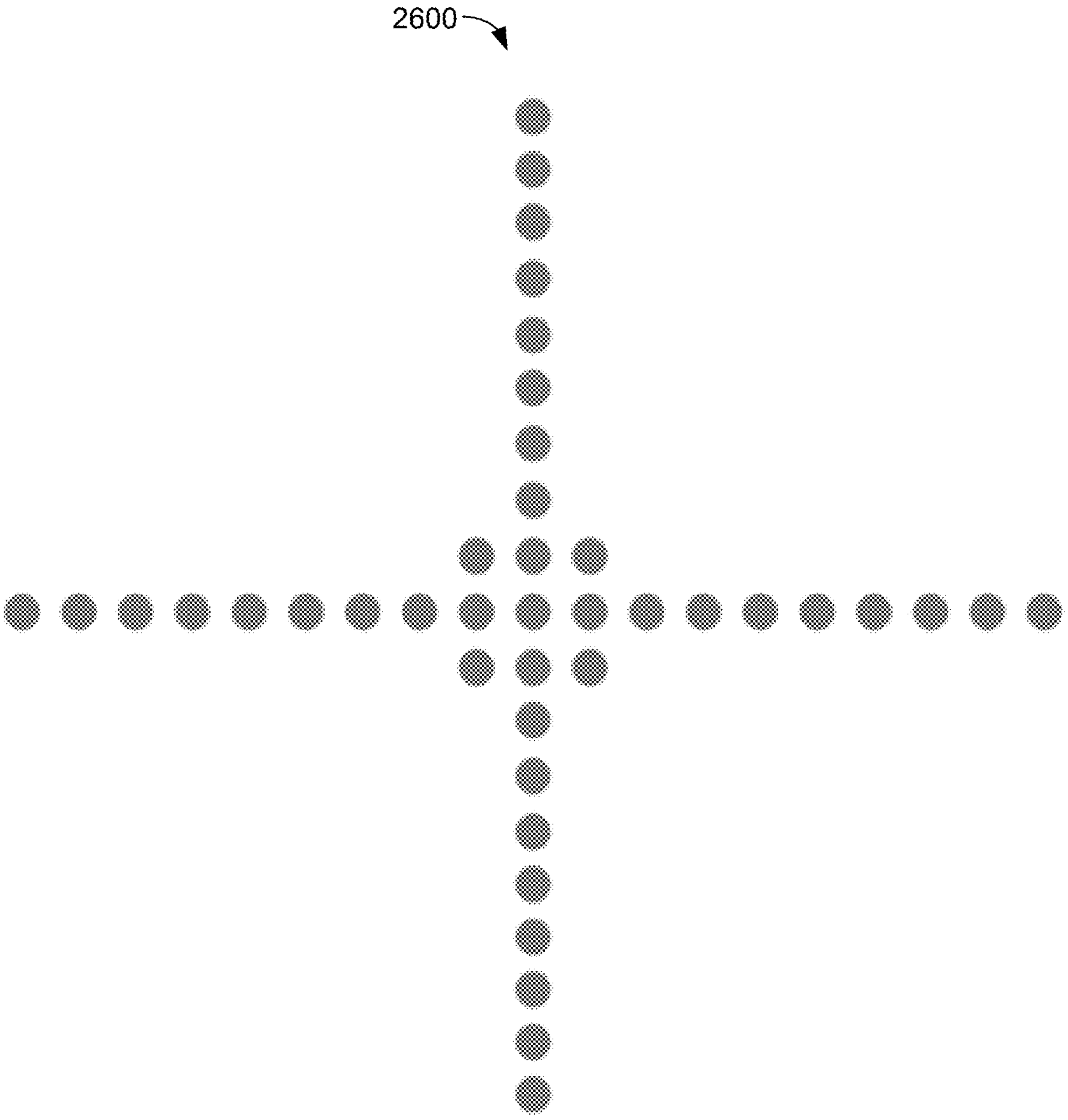
FIG. 26 illustrates a symmetrical shape with a size of 19×19.
Figure 27:
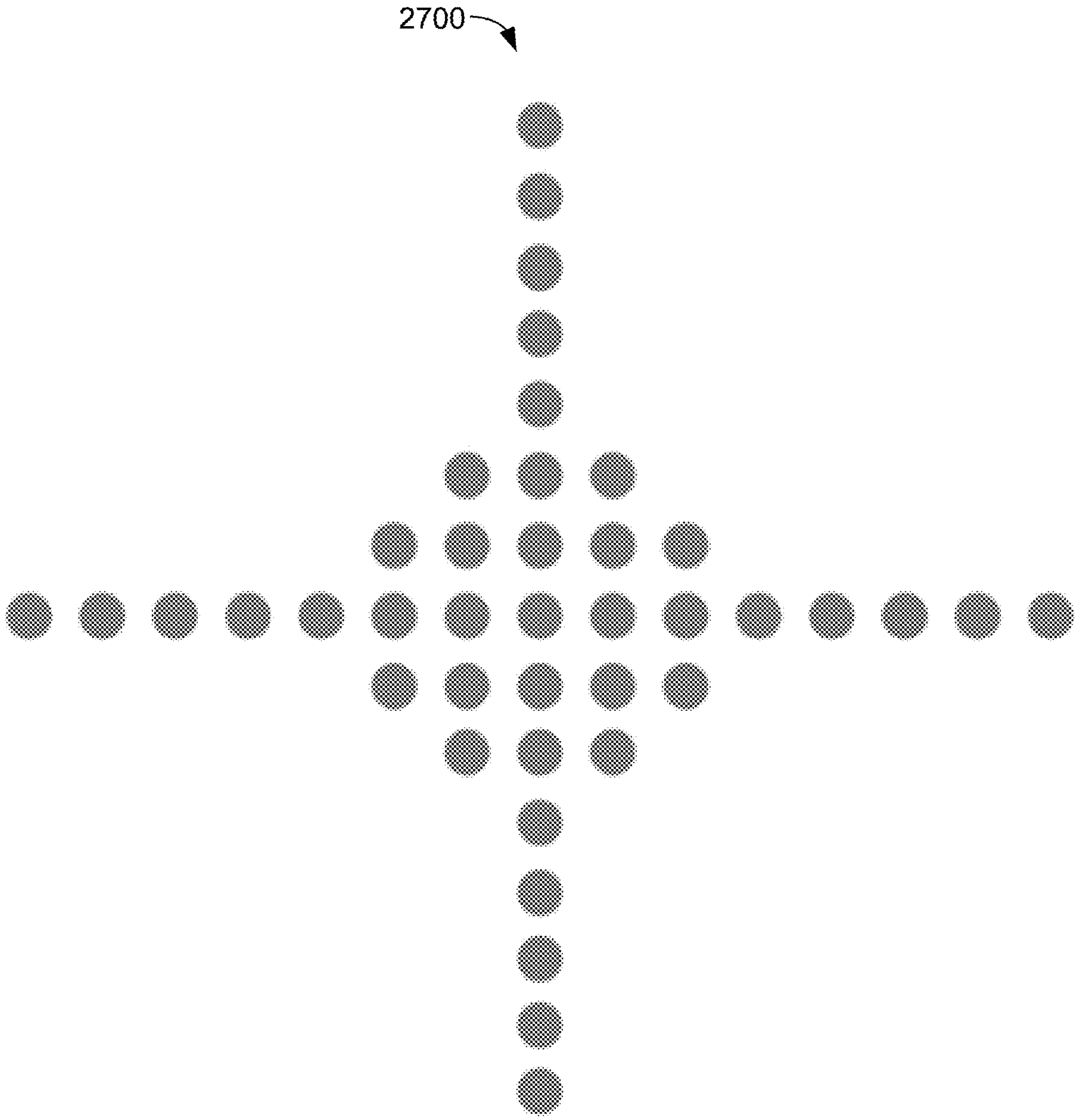
FIG. 27 illustrates a symmetrical shape with a size of 15×15.
Figure 28:
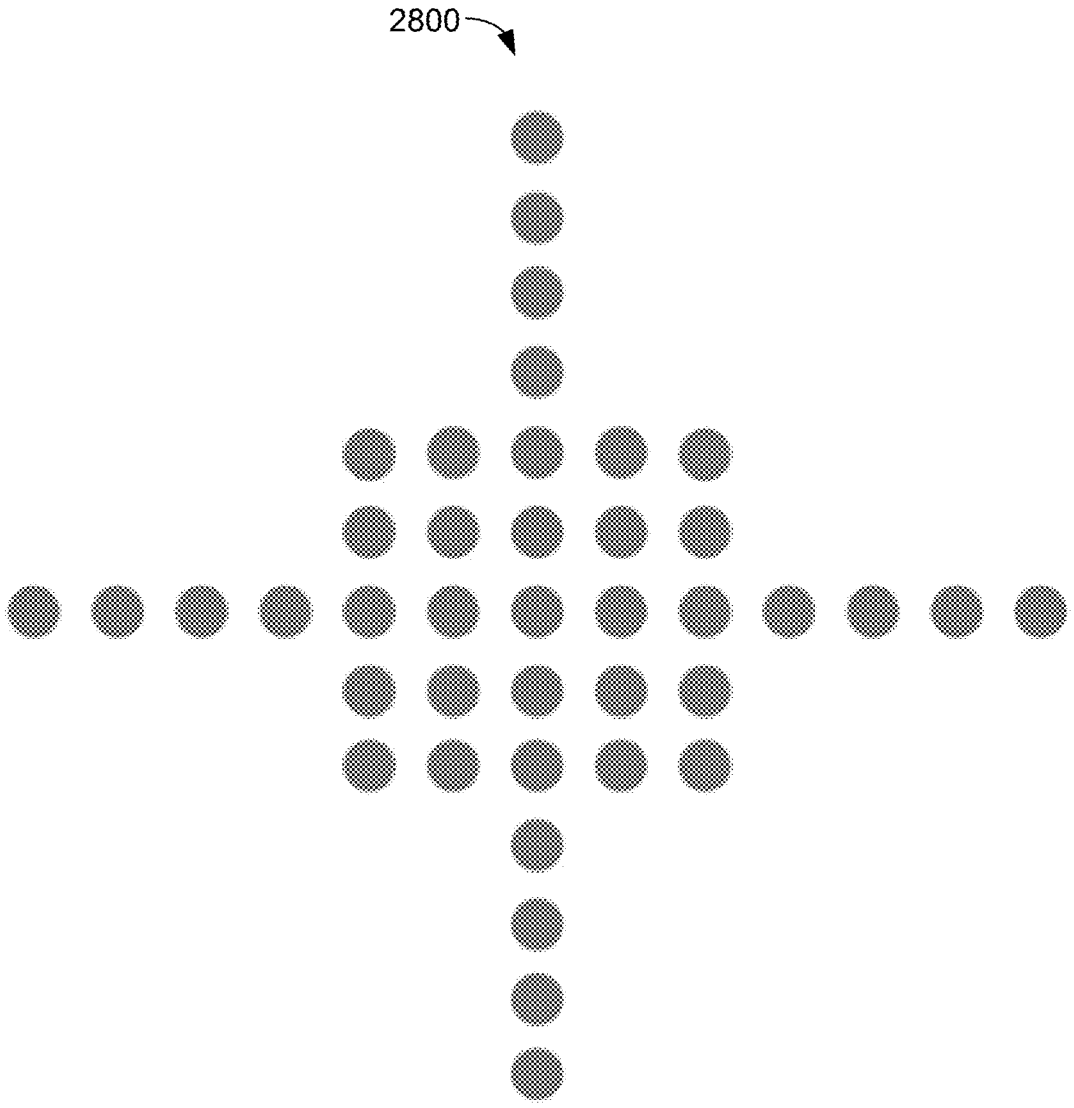
FIG. 28 illustrates a symmetrical shape with a size of 13×13.
Figure 29:
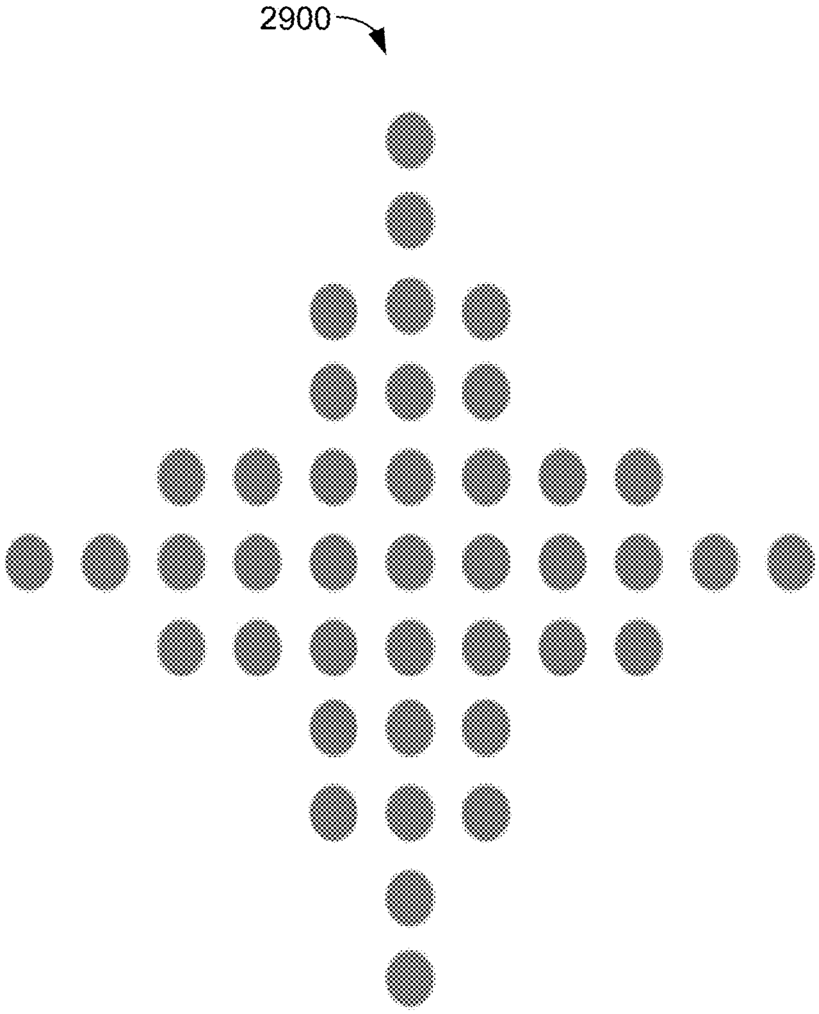
FIG. 29 illustrates a symmetrical shape with a size of 11×11.

8) The multiple filter shapes applied in the proposed filter shape selection method may have different sizes or shapes.

a. In one example, a shape candidate of the proposed filter shape selection may be a diamond.

a) In one example, the size of the shape candidate may be M×N.

b) In one example, a shape candidate may as shown in FIG. 7. FIGS. 7-29 illustrate a shape candidate, respectively.

c) In one example, a shape candidate may as shown in FIG. 8.

d) In one example, a shape candidate may as shown in FIG. 9.

e) In one example, a shape candidate may as shown in FIG. 10.

f) In one example, a shape candidate may as shown in FIG. 11.

b. In one example, a shape candidate of the proposed filter shape selection method may be a square.

a) In one example, the size of a shape candidate may be M×N.

b) In one example, a shape candidate may as shown in FIG. 12.

c) In one example, a shape candidate may as shown in FIG. 13.

d) In one example, a shape candidate may as shown in FIG. 14.

e) In one example, a shape candidate may as shown in FIG. 15.

f) In one example, a shape candidate may as shown in FIG. 16.

c. In one example, a shape candidate of the proposed filter shape selection method may be a cross.

a) In one example, the size of a shape candidate may be M×N.

b) In one example, a shape candidate may as shown in FIG. 17.

c) In one example, a shape candidate may as shown in FIG. 18.

d) In one example, a shape candidate may as shown in FIG. 19.

e) In one example, a shape candidate may as shown in FIG. 20.

f) In one example, a shape candidate may as shown in FIG. 21.

d. In one example, a shape candidate of the proposed filter shape selection method may be a symmetrical shape.

a) In one example, the size of a shape candidate may be M×N.

b) In one example, a shape candidate may as shown in FIG. 22.

c) In one example, a shape candidate may as shown in FIG. 23.

d) In one example, a shape candidate may as shown in FIG. 24.

e) In one example, a shape candidate may as shown in FIG. 25.

f) In one example, a shape candidate may as shown in FIG. 26.

g) In one example, a shape candidate may as shown in FIG. 27.

h) In one example, a shape candidate may as shown in FIG. 28.

i) In one example, a shape candidate may as shown in FIG. 29.

e. In one example, a shape candidate of the proposed filter shape selection method may be an asymmetrical shape.

f. In one example, a shape candidate of the proposed filter shape selection method may be other shapes.

g. In one example, the above-mentioned filter shapes may be used for online-trained filters.

h. In one example, the above-mentioned filter shapes may be used for offline-trained filters.

i. Alternatively, the above-mentioned filter shapes may be used for a color component individually.

j. Alternatively, the above-mentioned filter shapes may be used for multiple color components jointly.

9) The transpose-based coefficient order or the transpose-based clip parameter may depend on the different filter shapes.

a. In one example, the transpose-based coefficient order or the transposed-based clip parameter may depend on the symmetrical filter shape.

a) In one example, the symmetrical filter shape may as shown in the FIG. 29.

Figure 30:
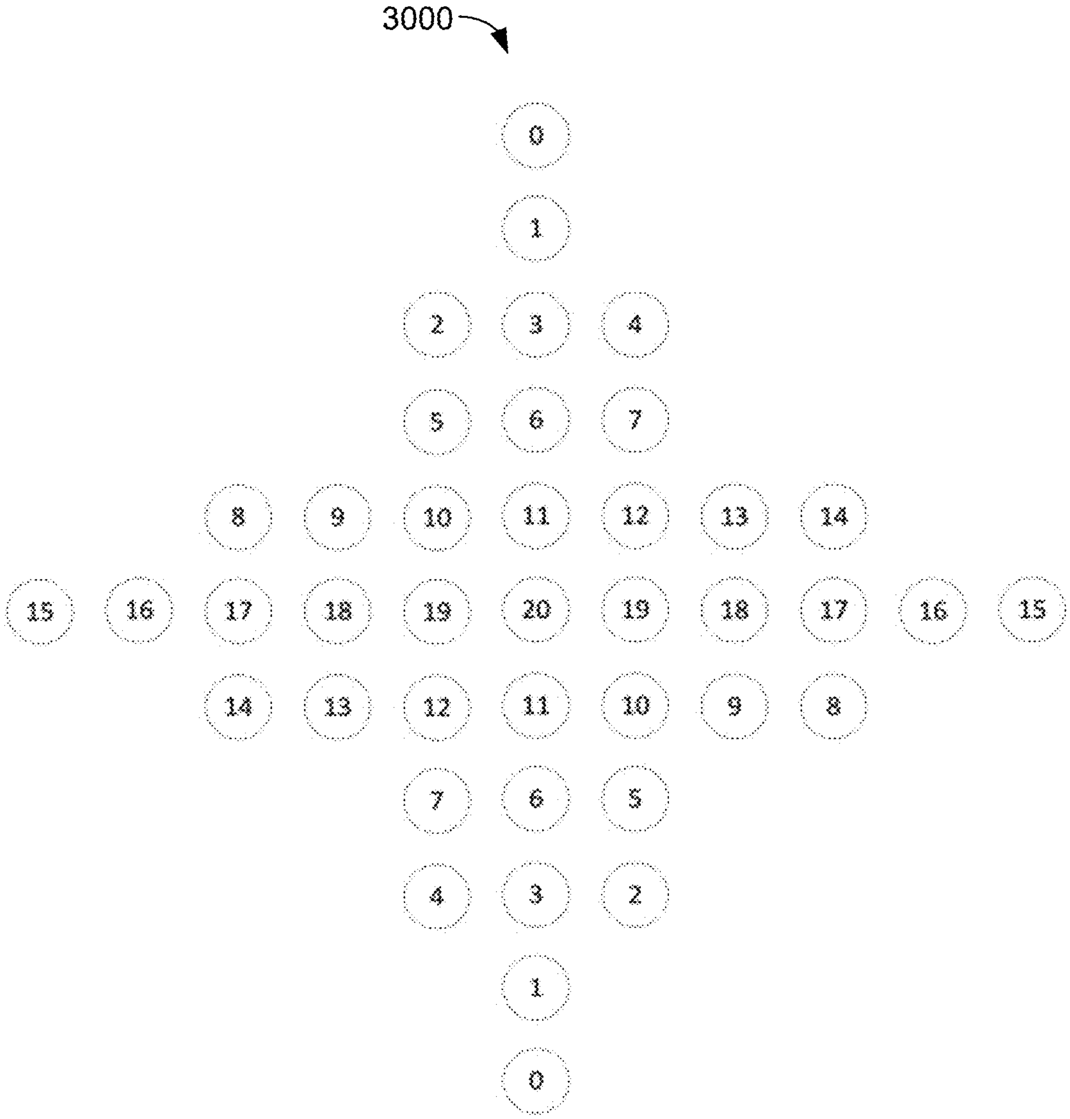
FIGS. 30-61 illustrate a possible order of parameters, respectively.

1. In one example, a possible order that associated with a transpose parameter may as shown in the FIG. 30. FIGS. 30-61 illustrate a possible order of parameters, respectively.

Figure 31:
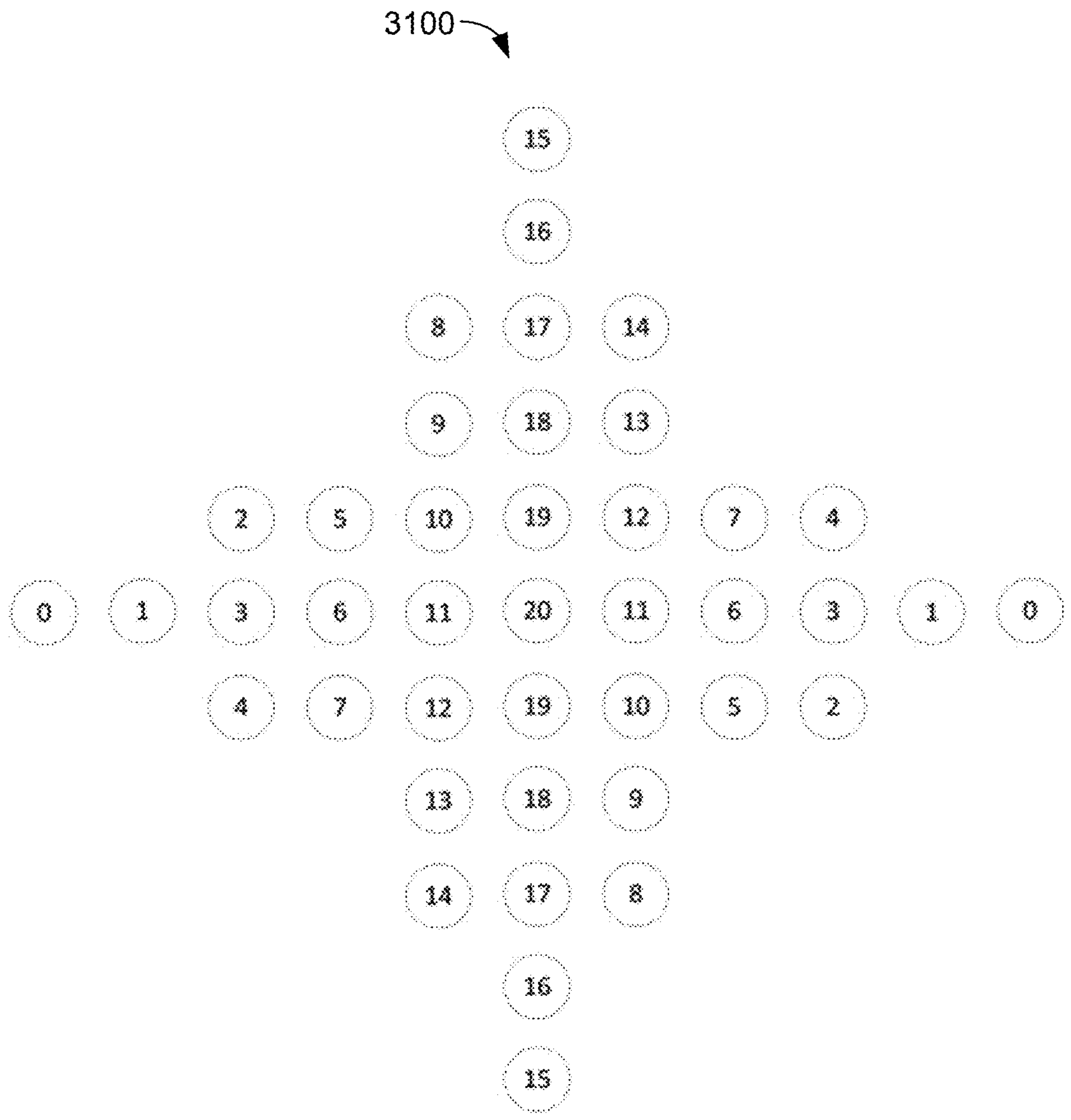

2. In one example, a possible order that associated with a transpose parameter may as shown in FIG. 31.

Figure 32:
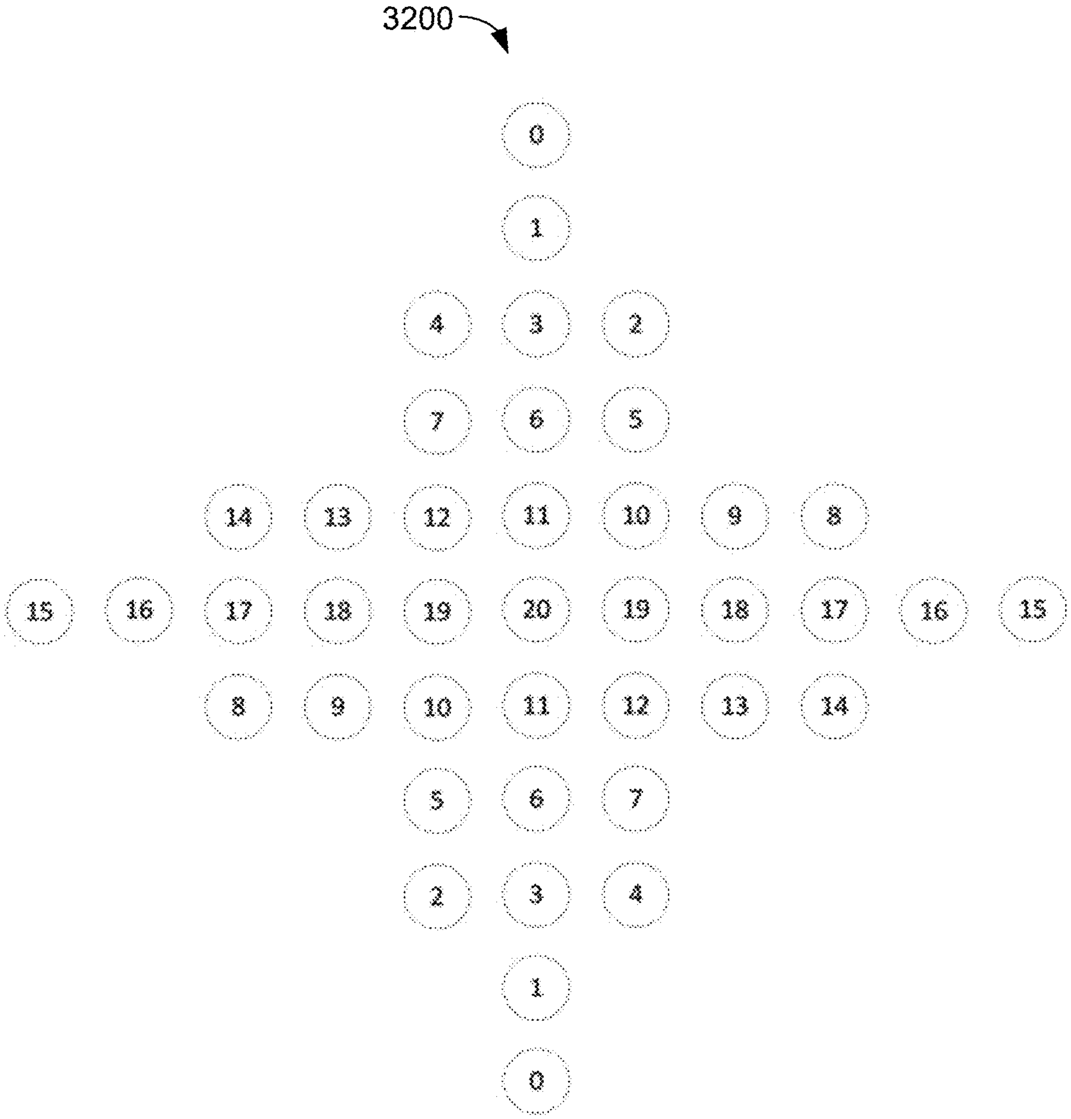

3. In one example, a possible order that associated with a transpose parameter may as shown in FIG. 32.

Figure 33:
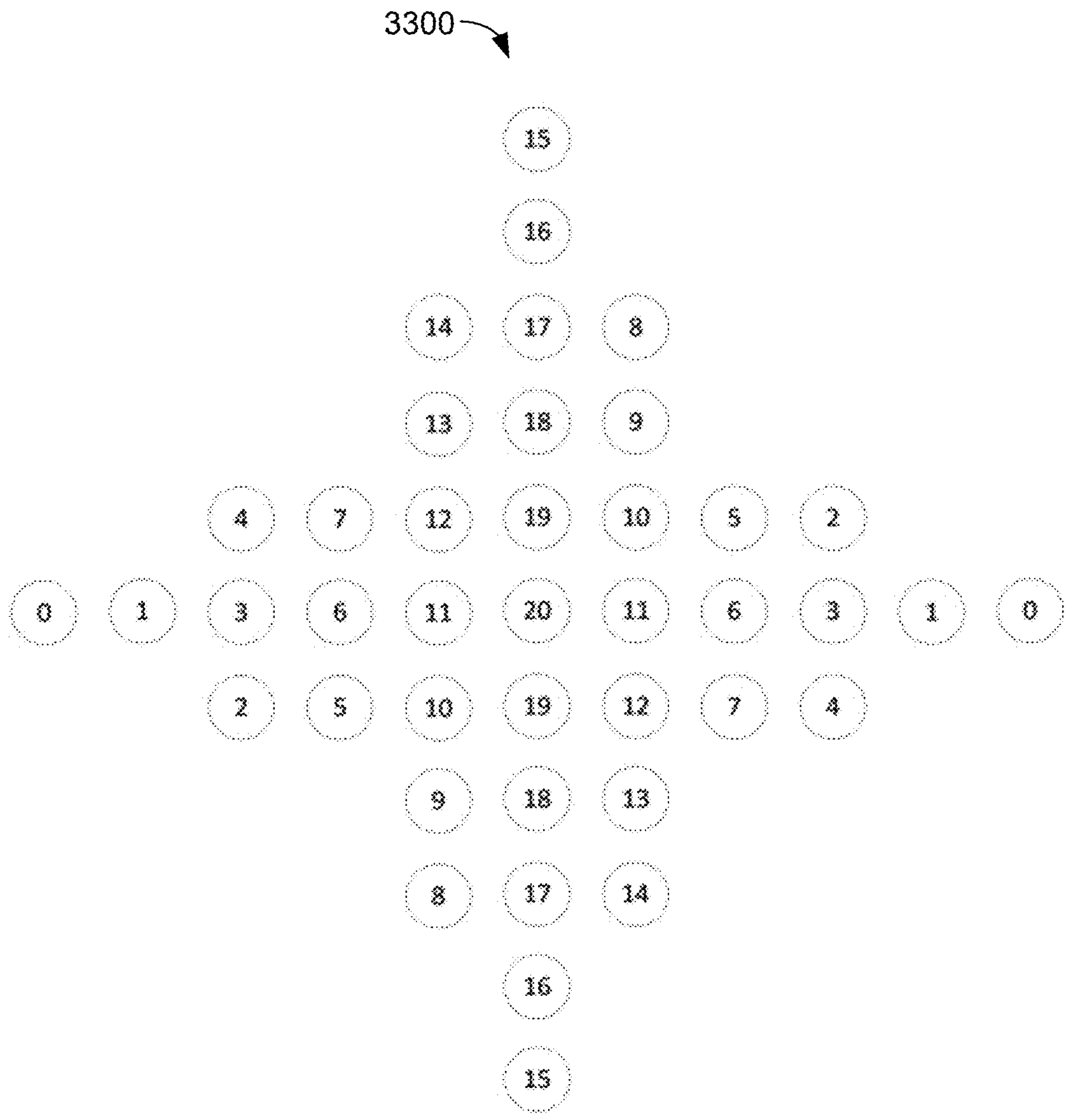

4. In one example, a possible order that associated with a transpose parameter may as shown in FIG. 33.

b) In one example, the symmetrical filter shape may as shown in the FIG. 28.

Figure 34:
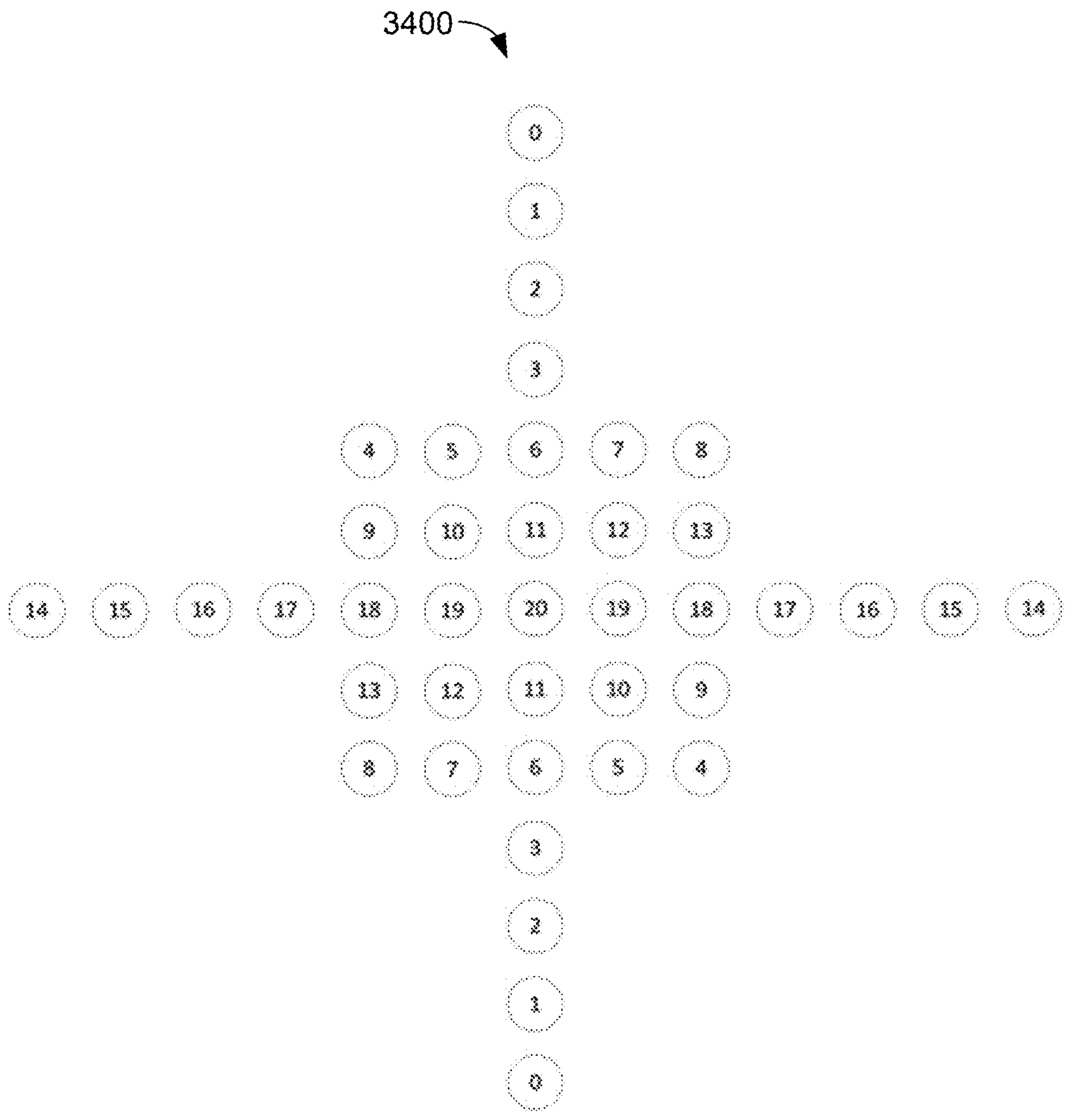

1. In one example, a possible order that associated with a transpose parameter may as shown in FIG. 34.

Figure 35:
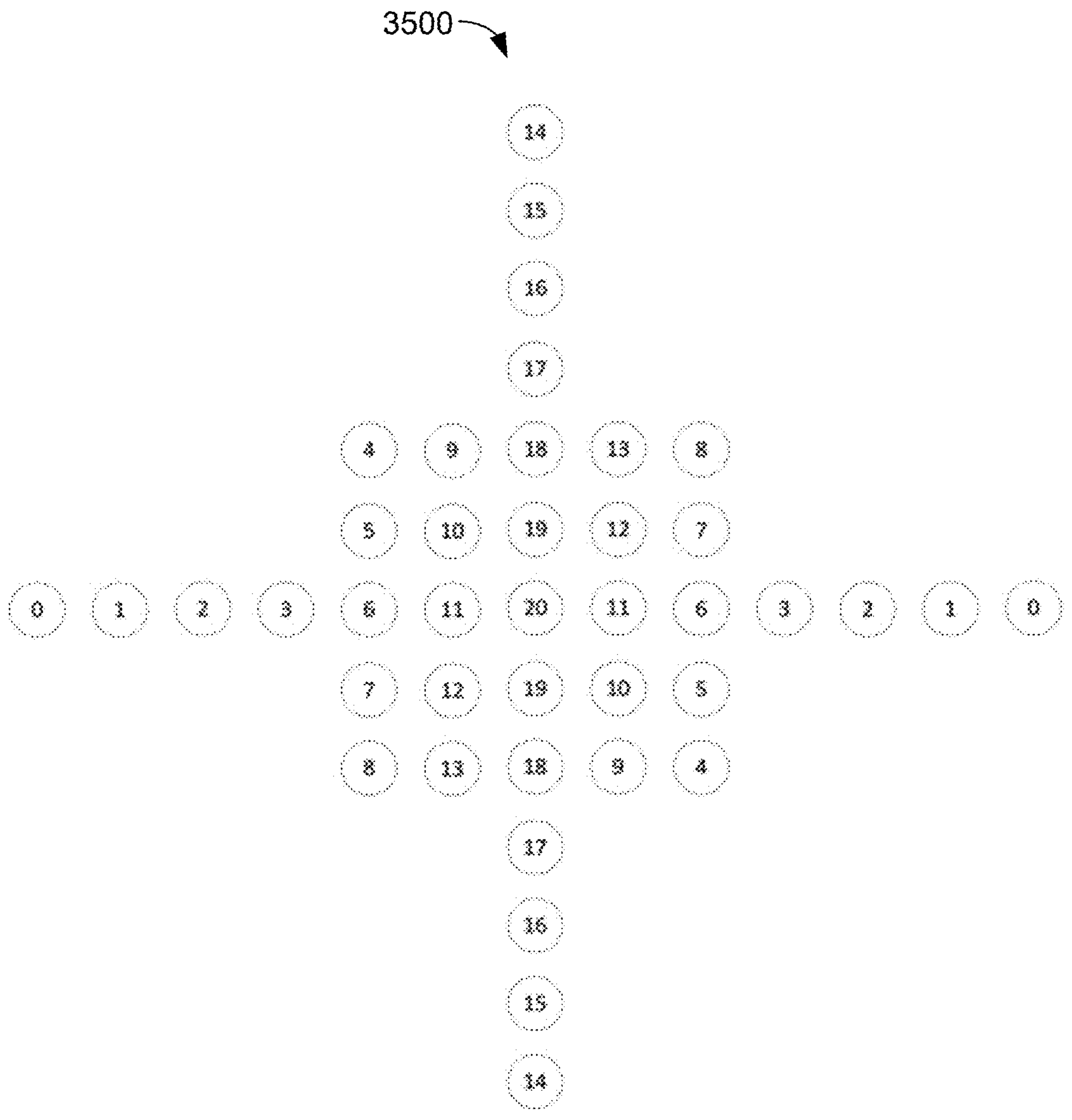

2. In one example, a possible order that associated with a transpose parameter may as shown in FIG. 35.

Figure 36:
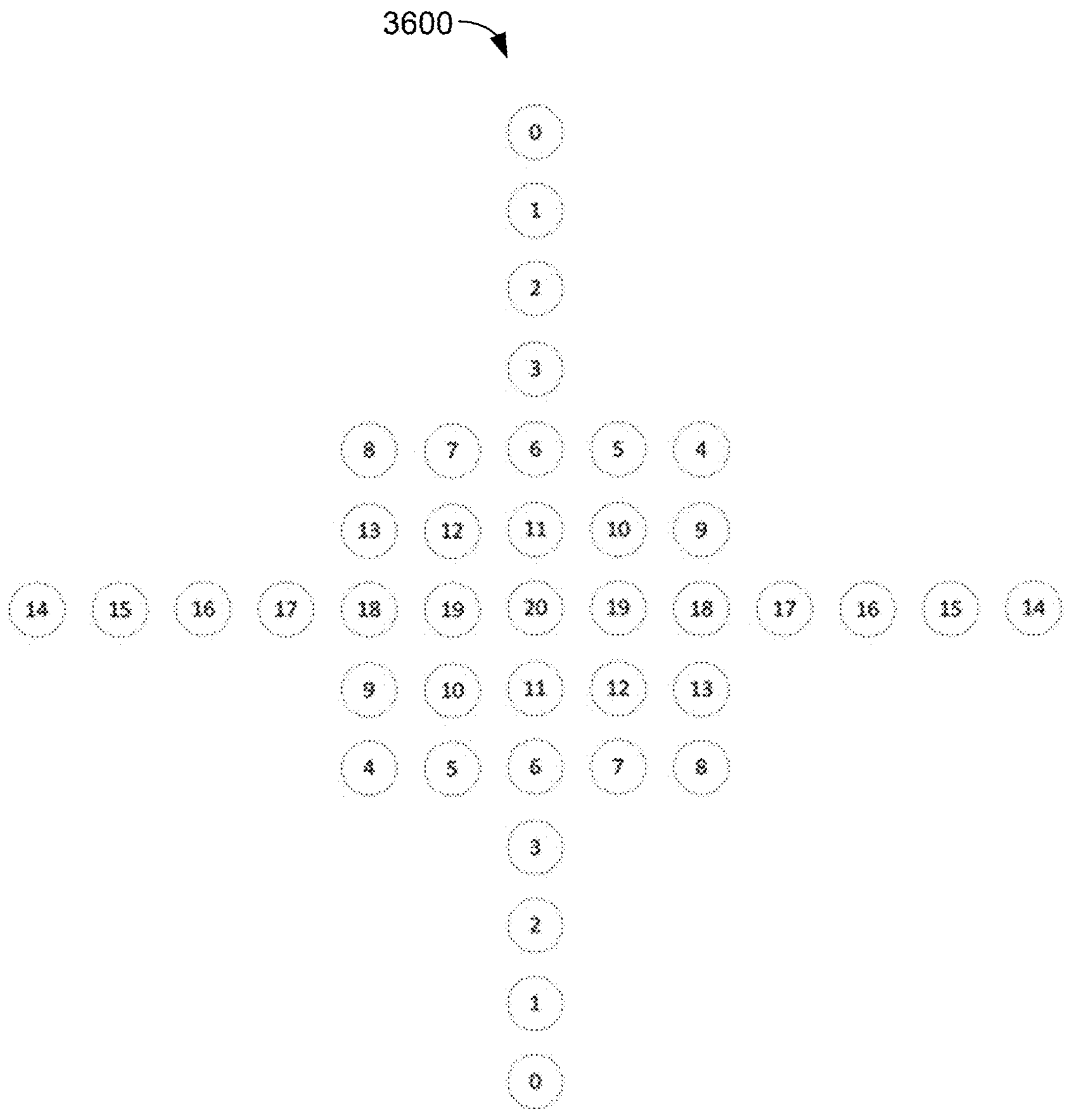

3. In one example, a possible order that associated with a transpose parameter may as shown in FIG. 36.

Figure 37:
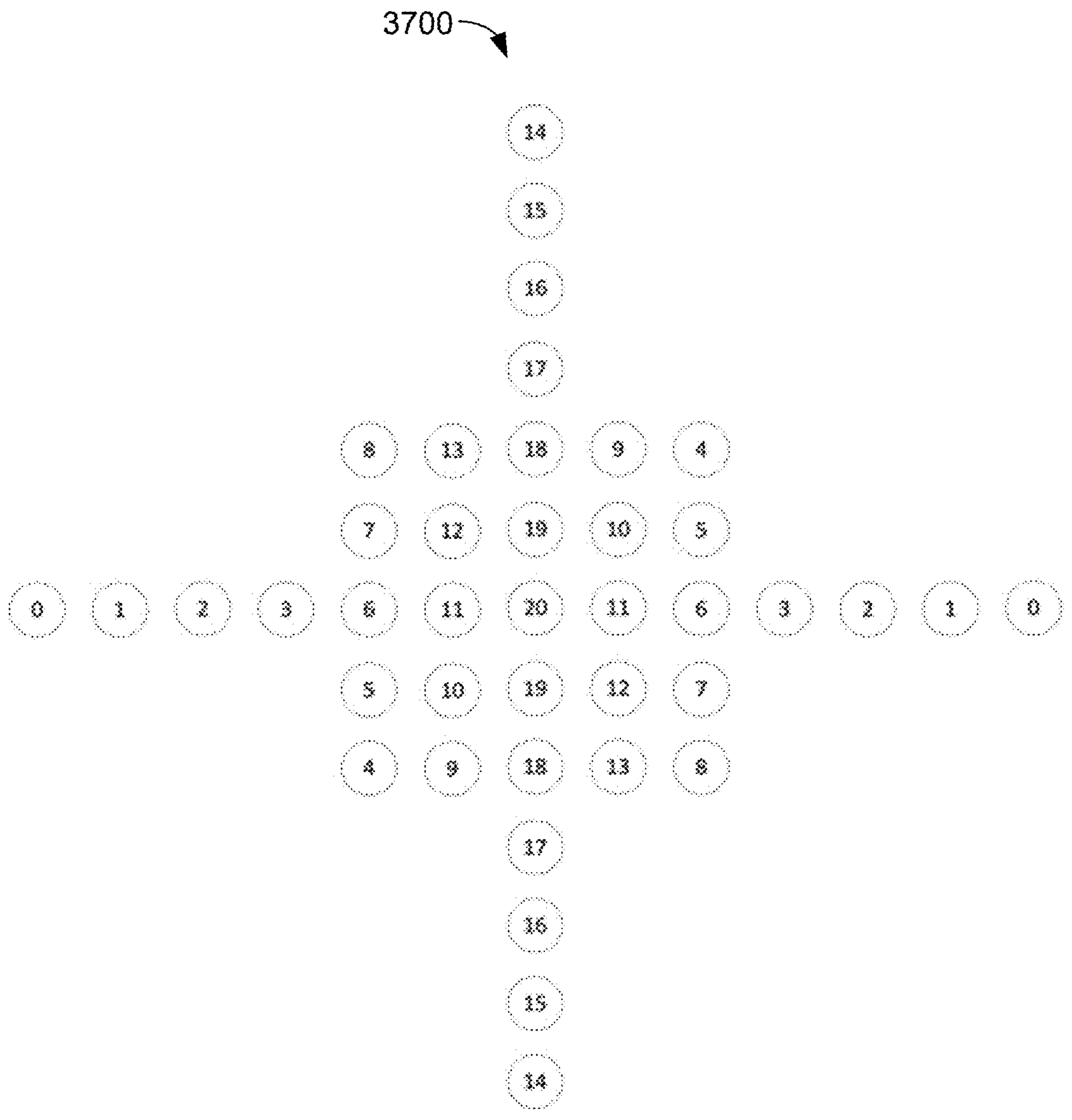

4. In one example, a possible order that associated with a transpose parameter may as shown in FIG. 37.

c) In one example, the symmetrical filter shape may as shown in the FIG. 27.

Figure 38:
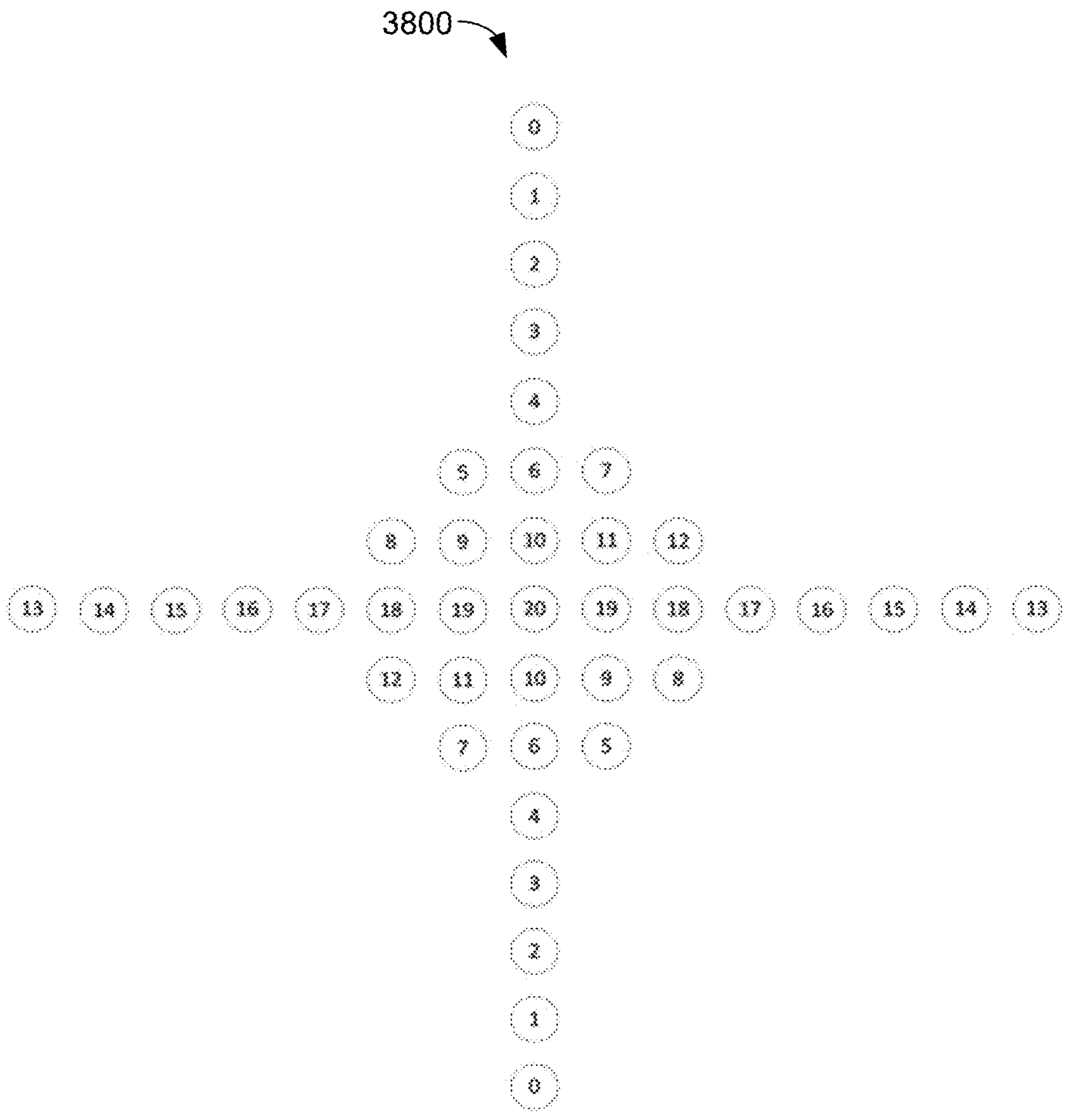

1. In one example, a possible order that associated with a transpose parameter may as shown in FIG. 38.

Figure 39:
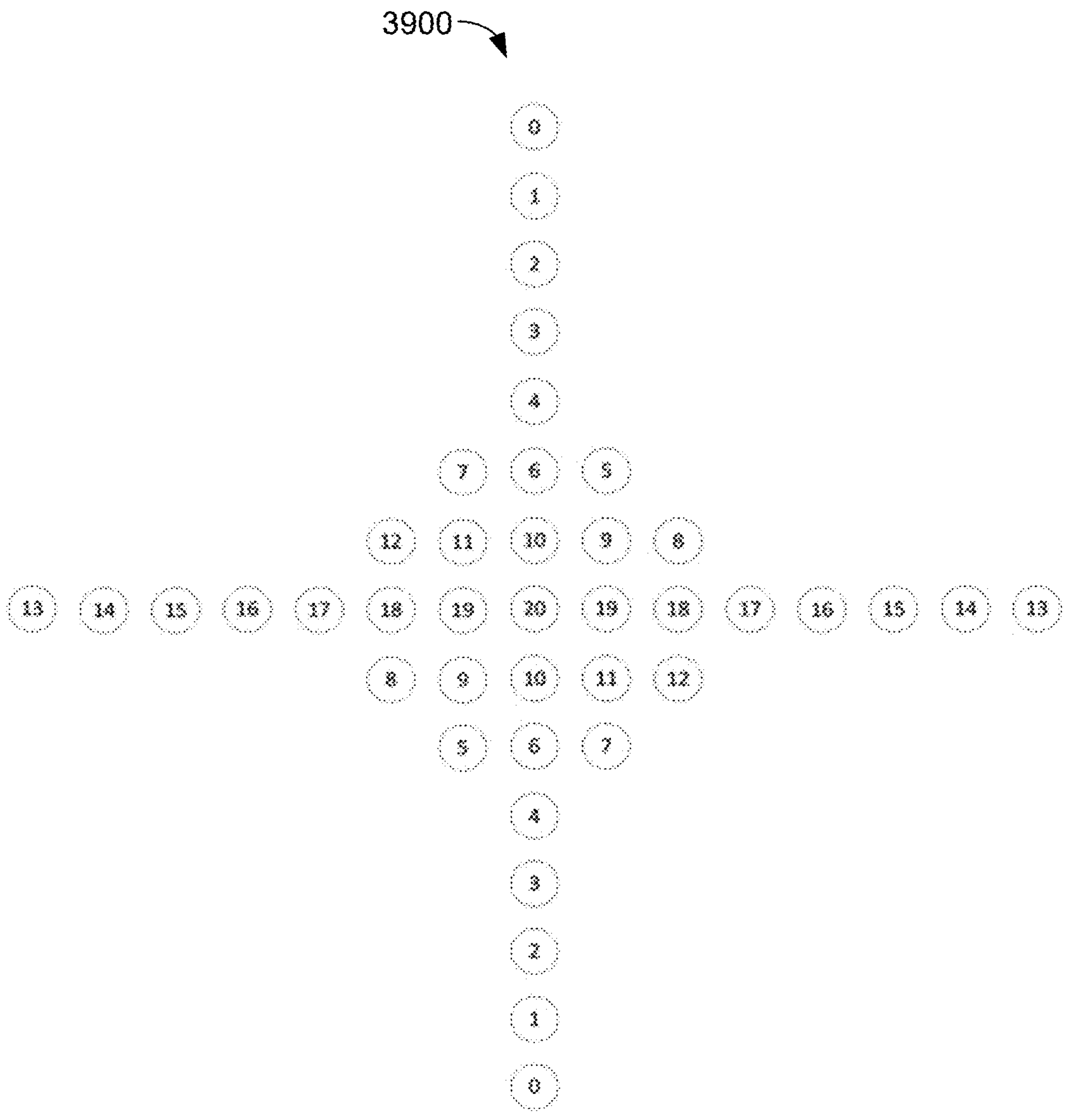

2. In one example, a possible order that associated with a transpose parameter may as shown in FIG. 39.

Figure 40:
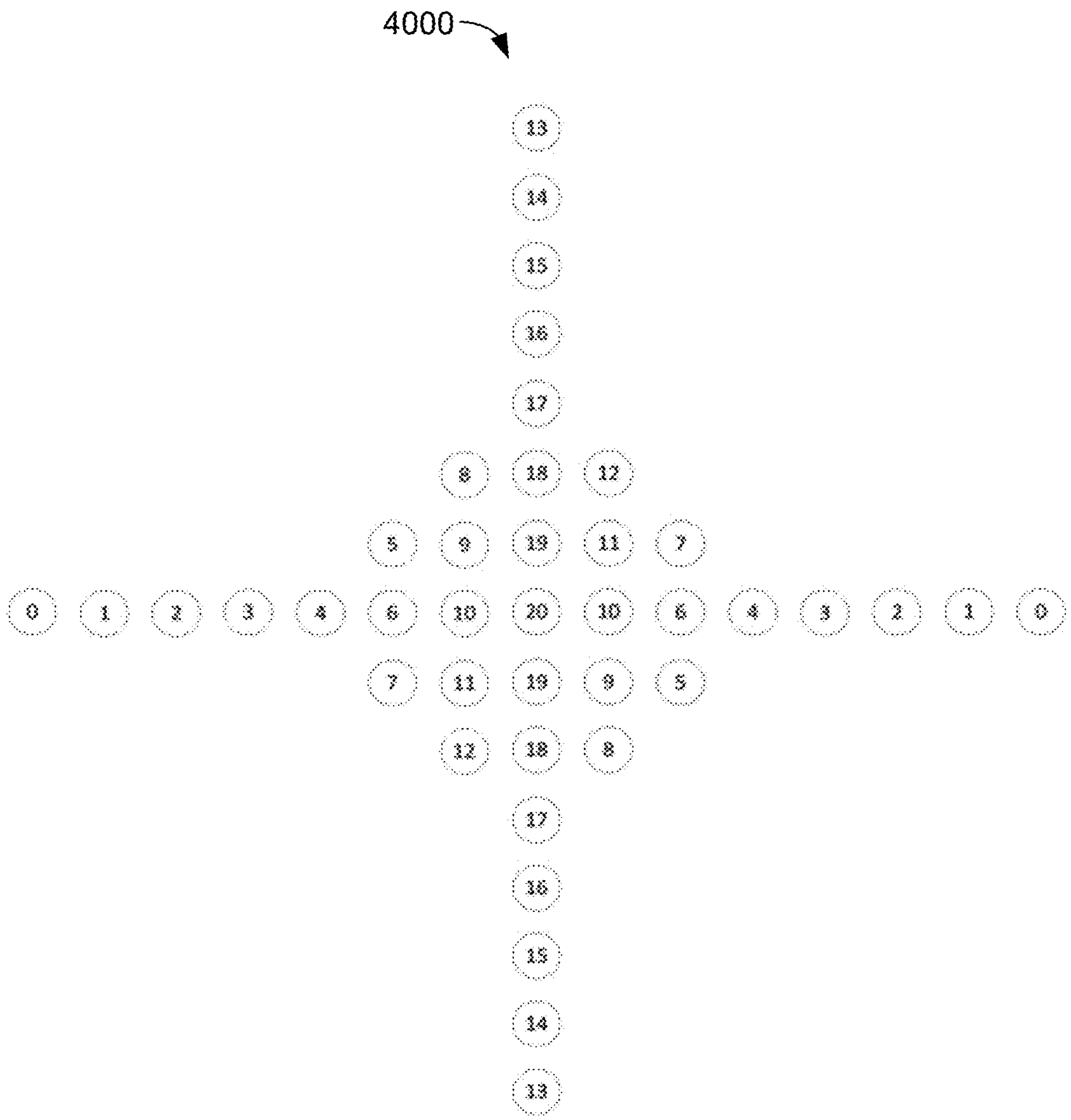

3. In one example, a possible order that associated with a transpose parameter may as shown in FIG. 40.

Figure 41:
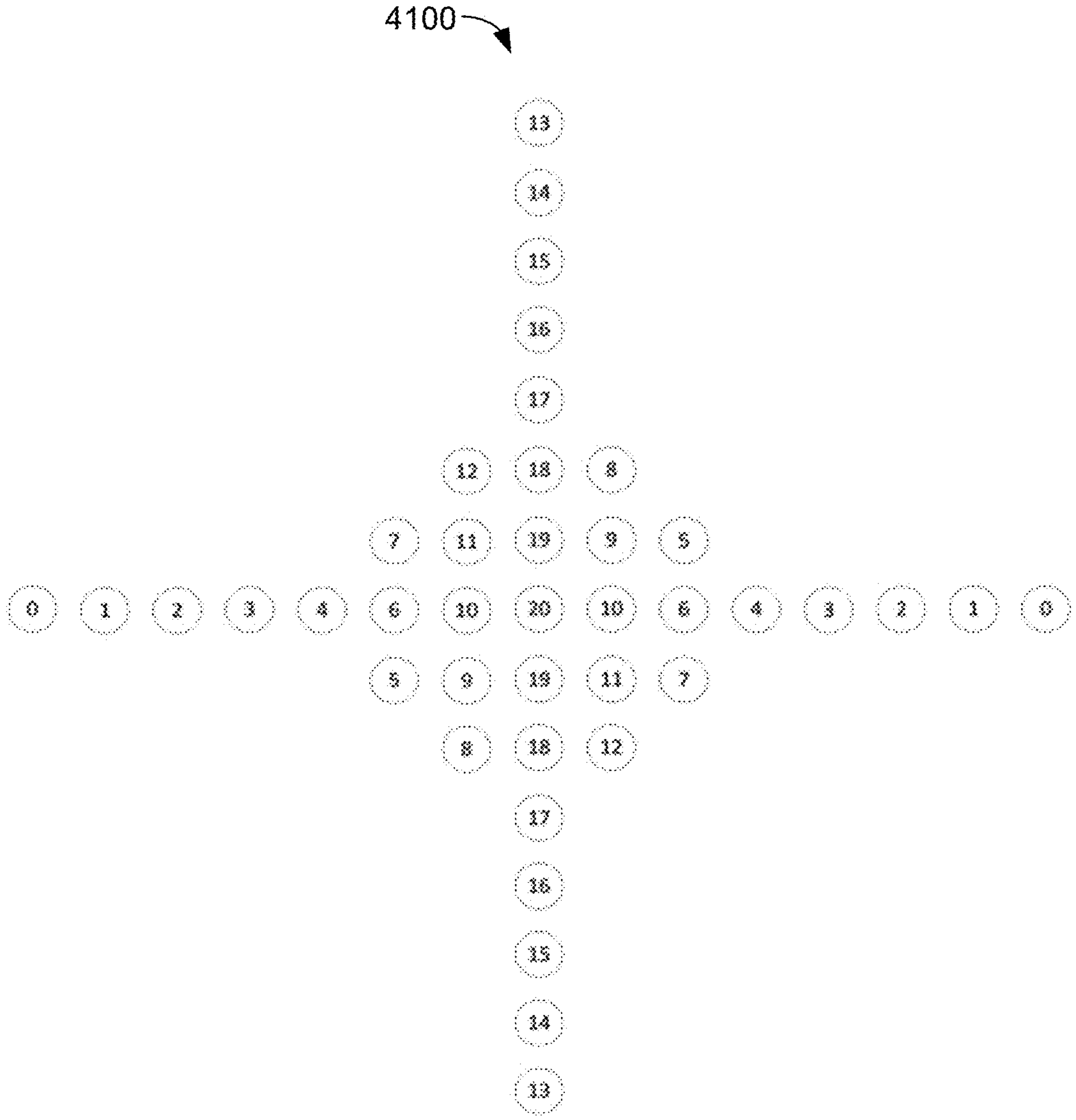
Figure 42:
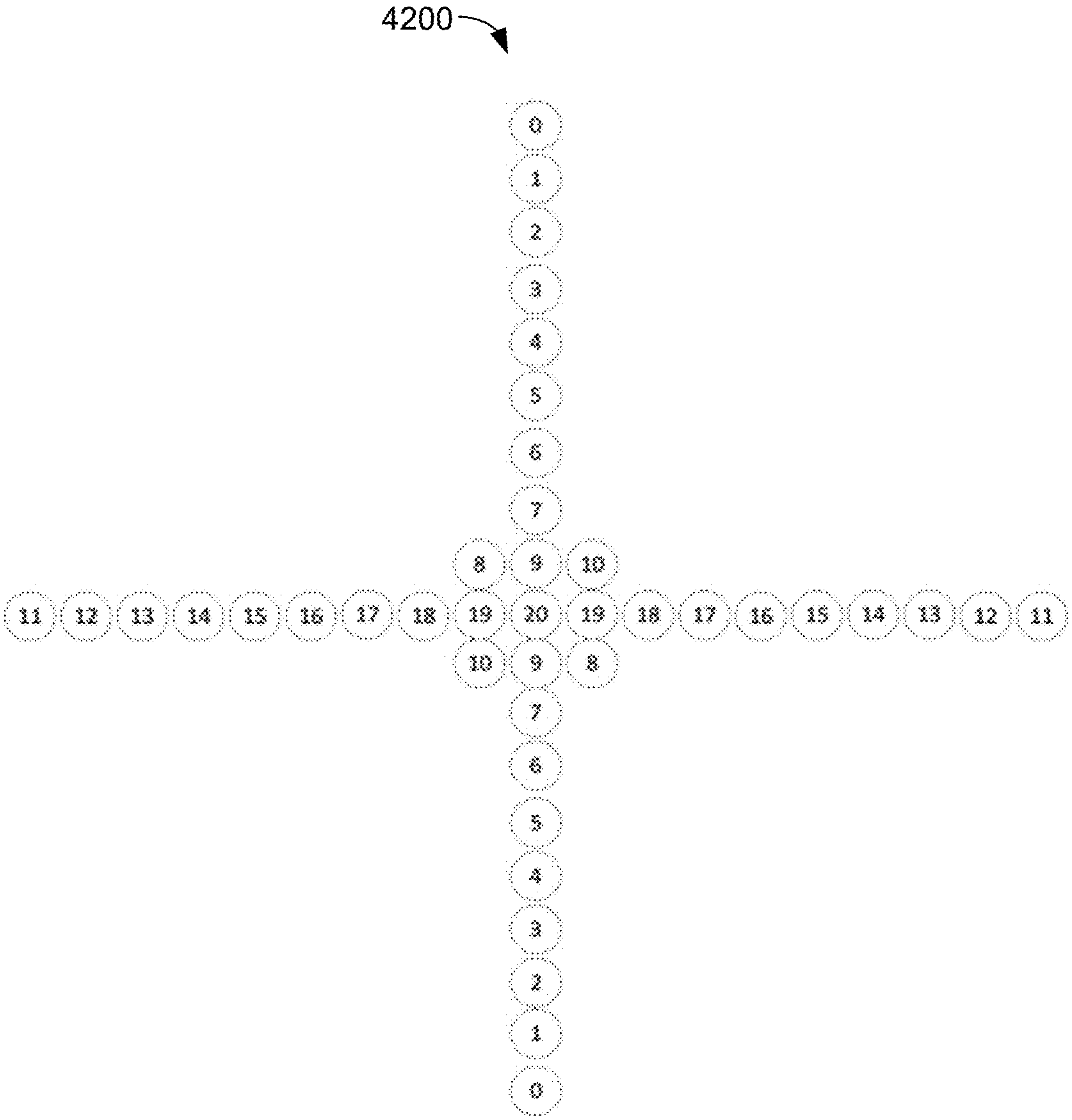
Figure 43:
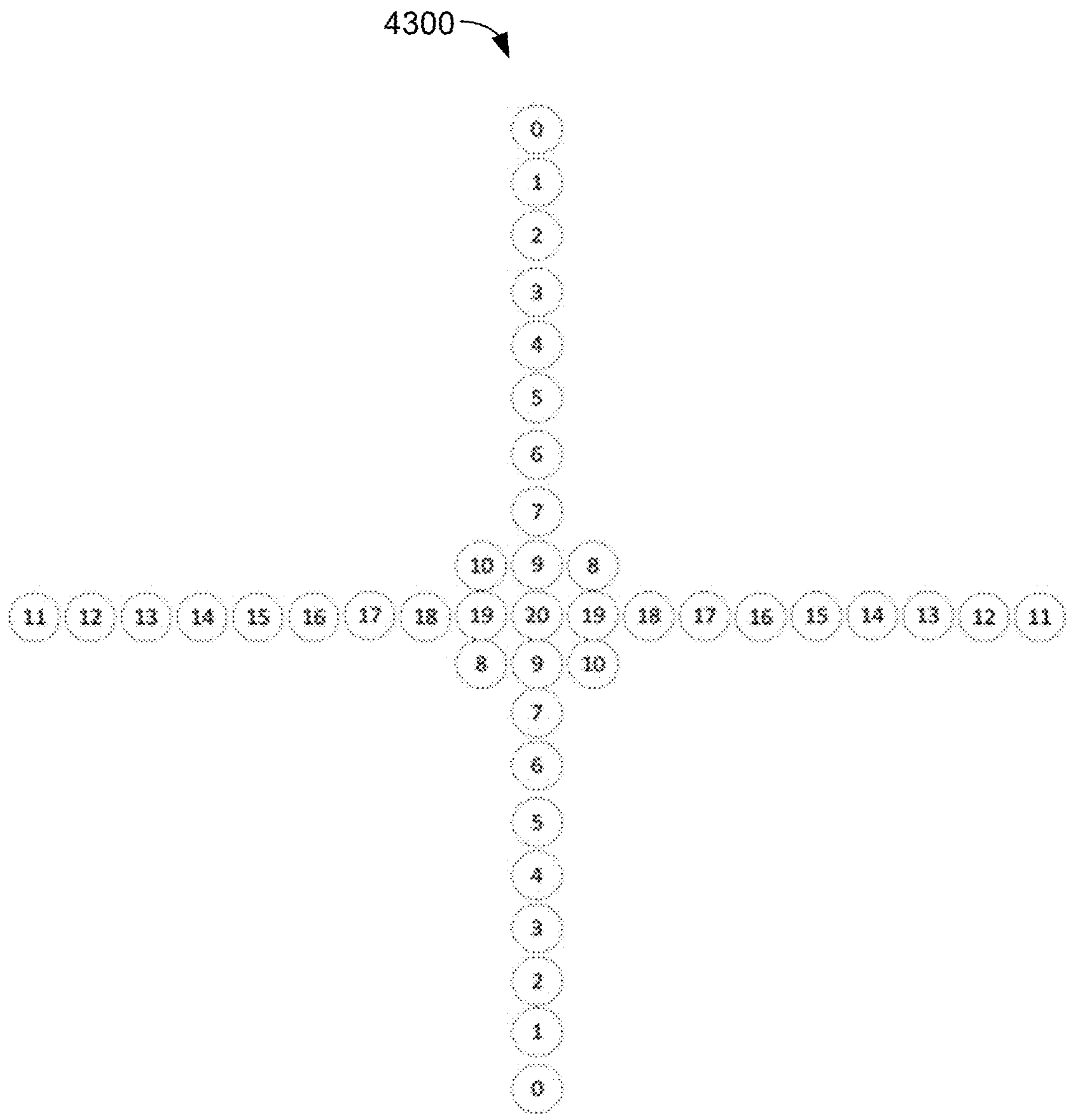
Figure 44:
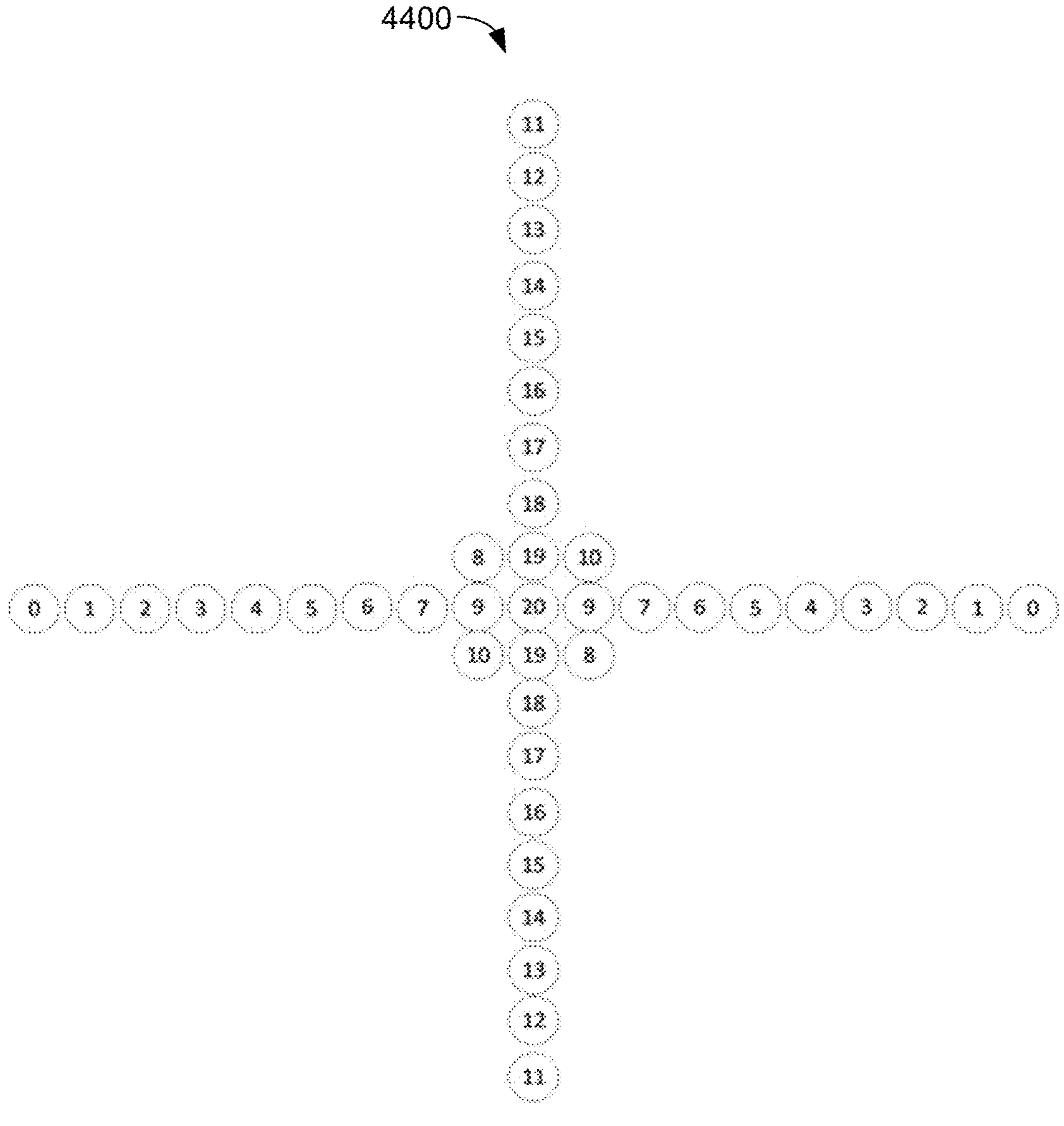
Figure 45:
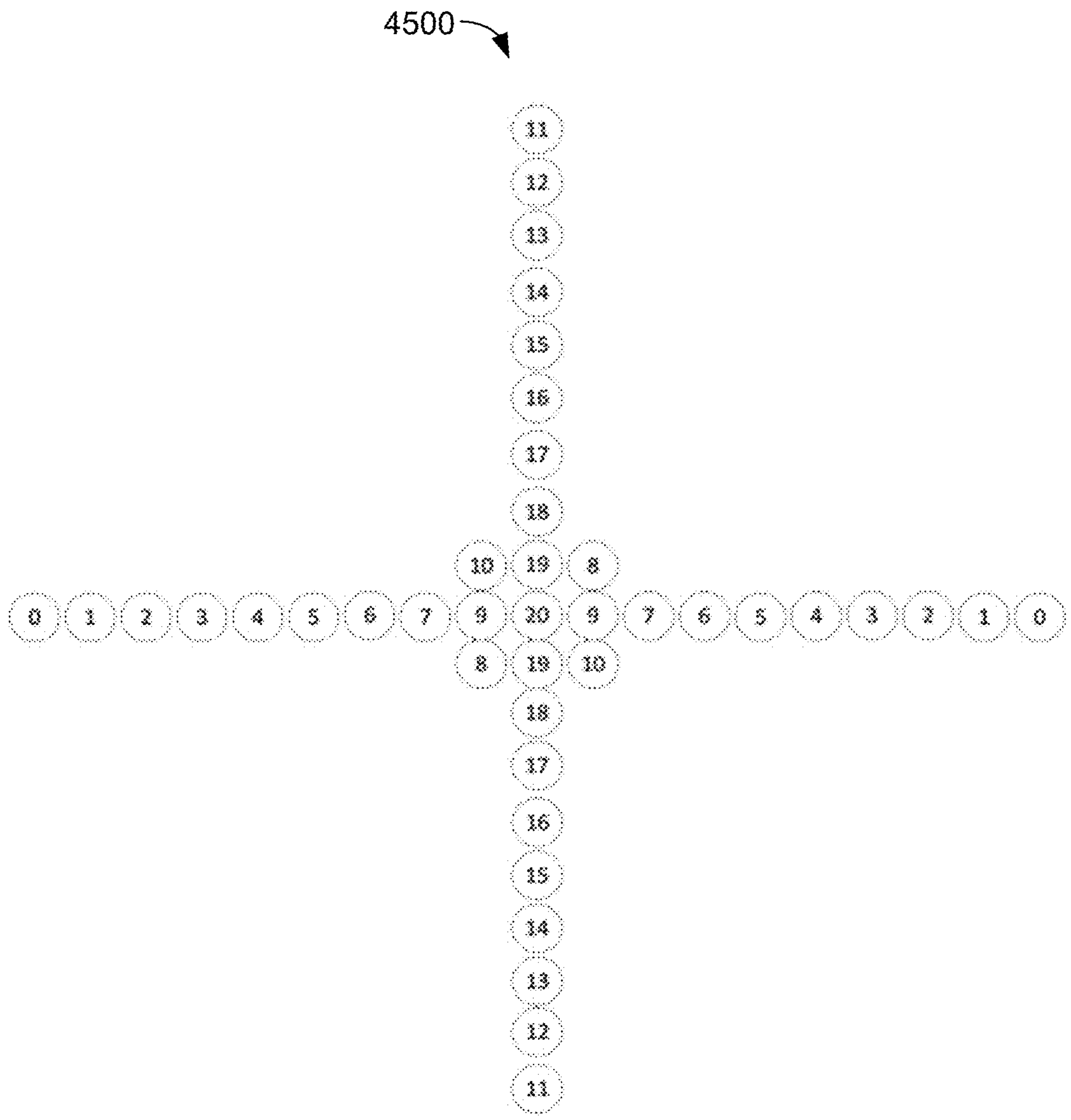
Figure 46:
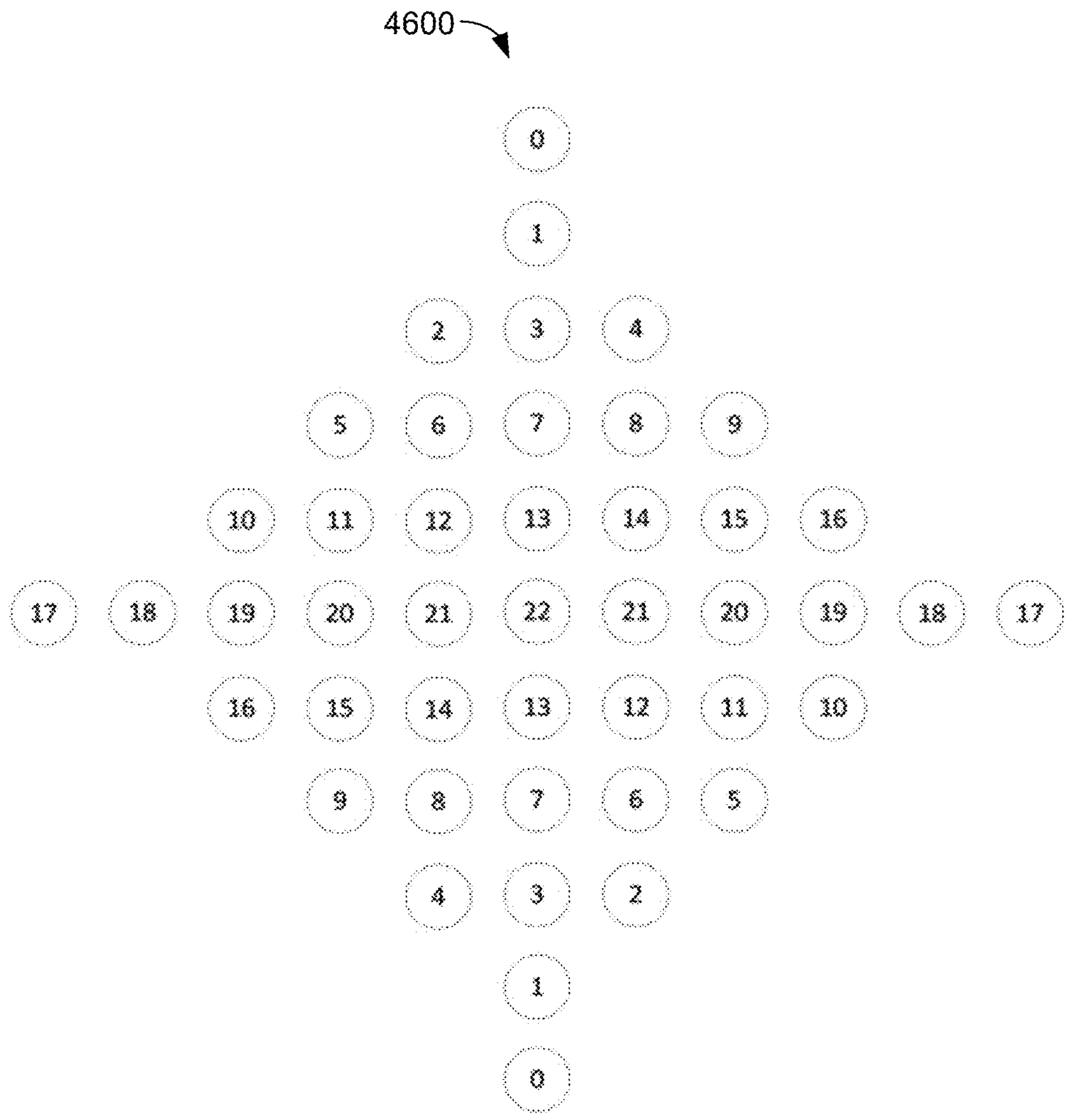
Figure 47:
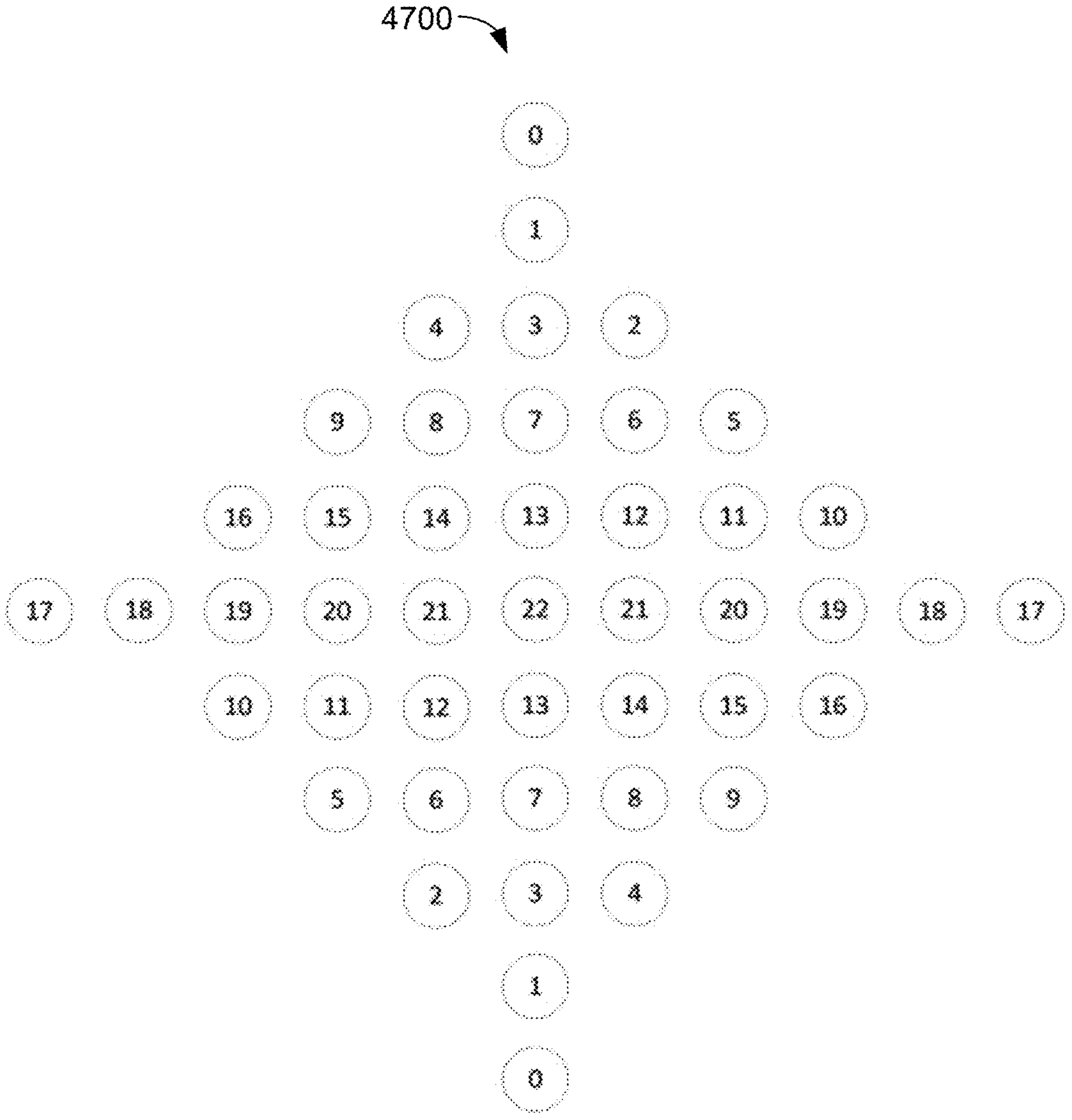
Figure 48:
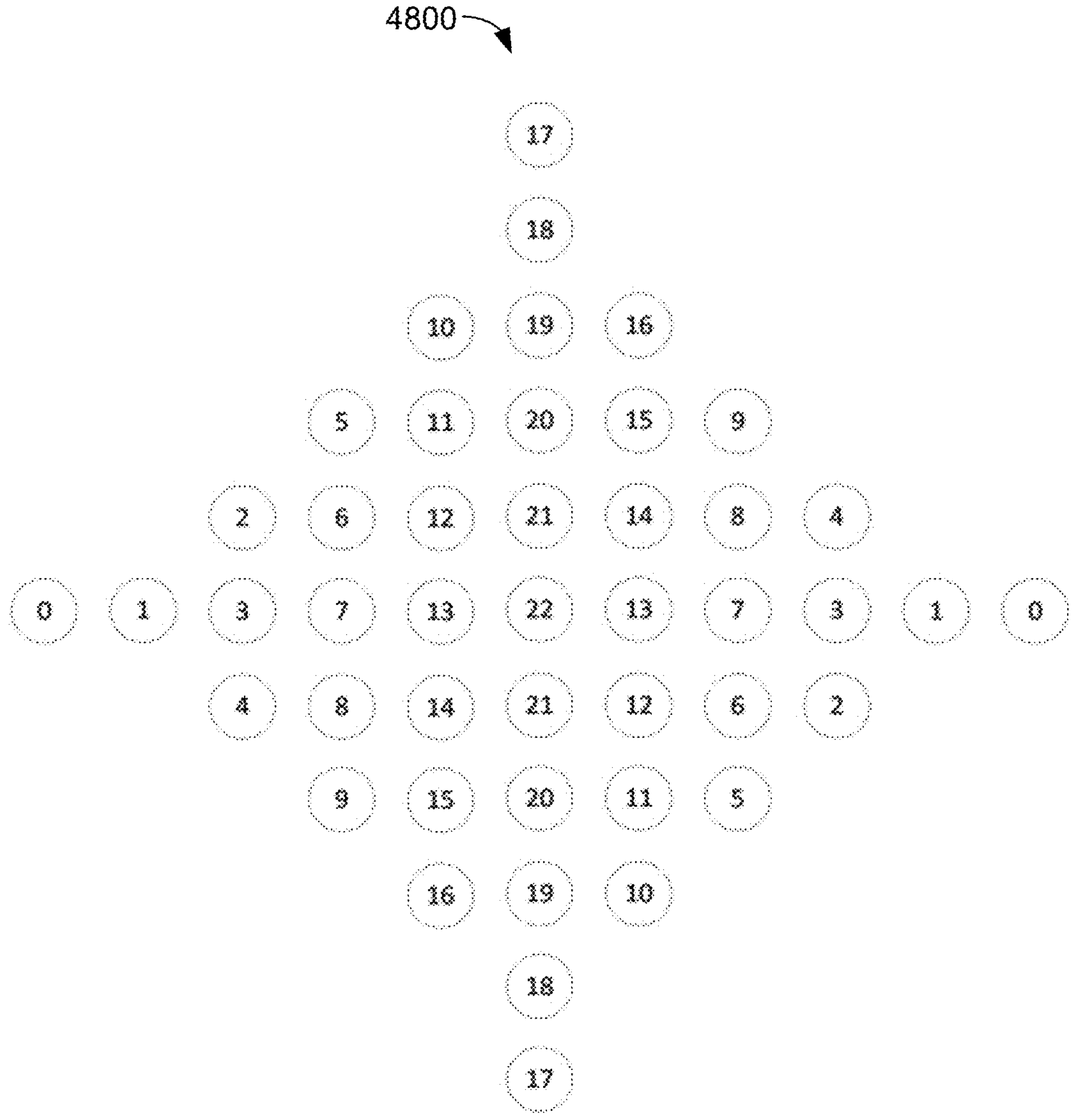
Figure 49:
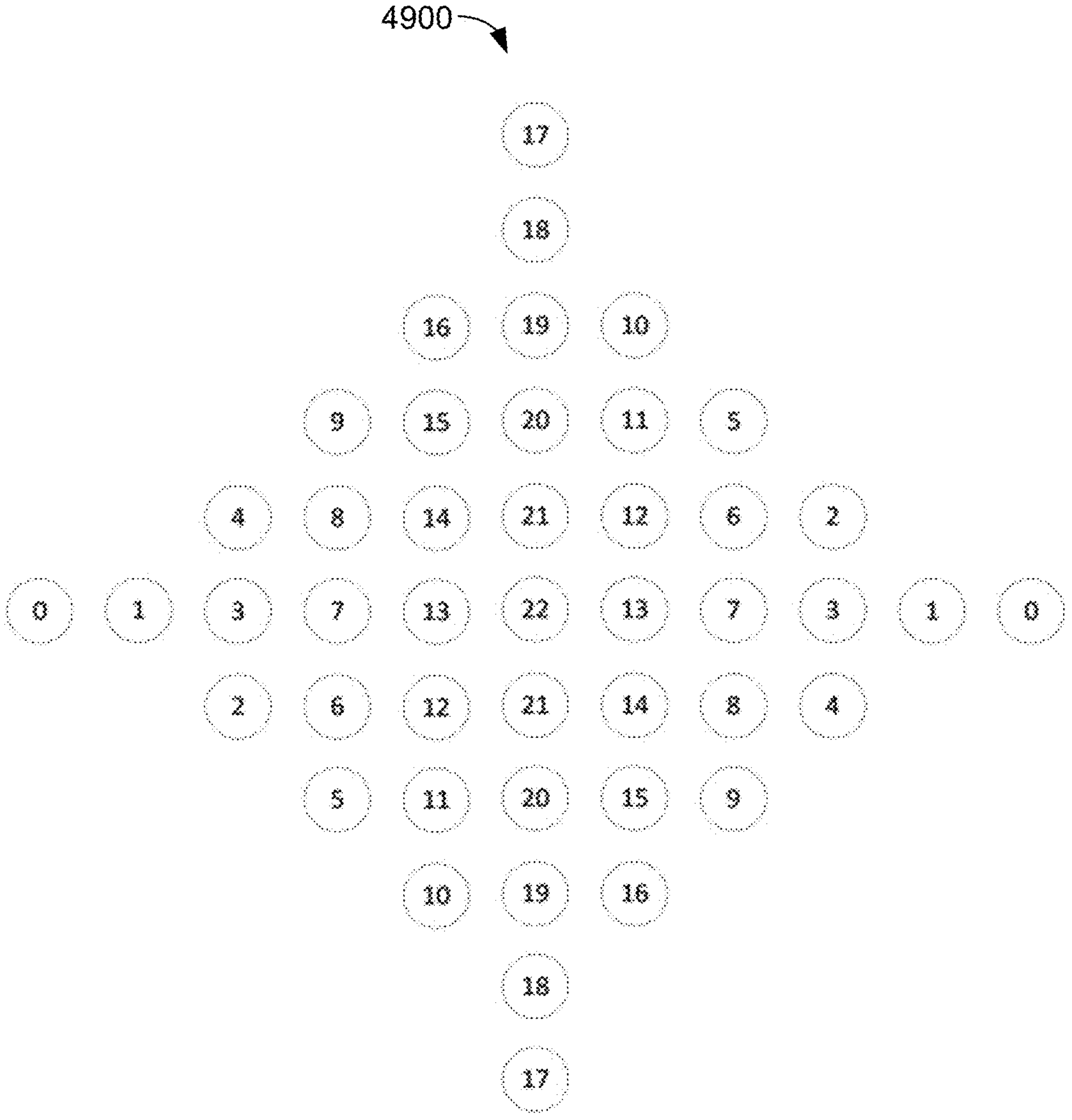
Figure 50:
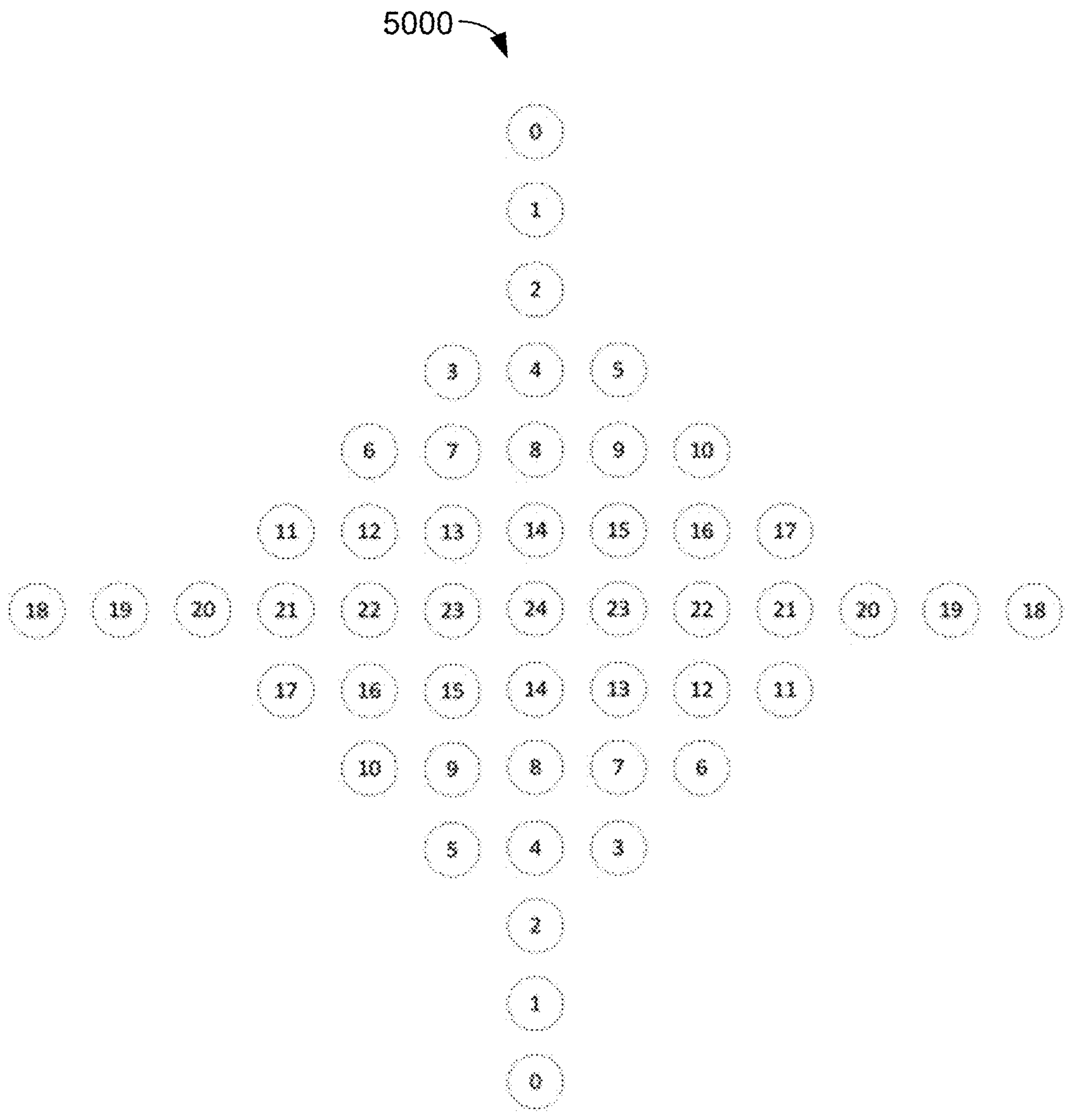
Figure 51:
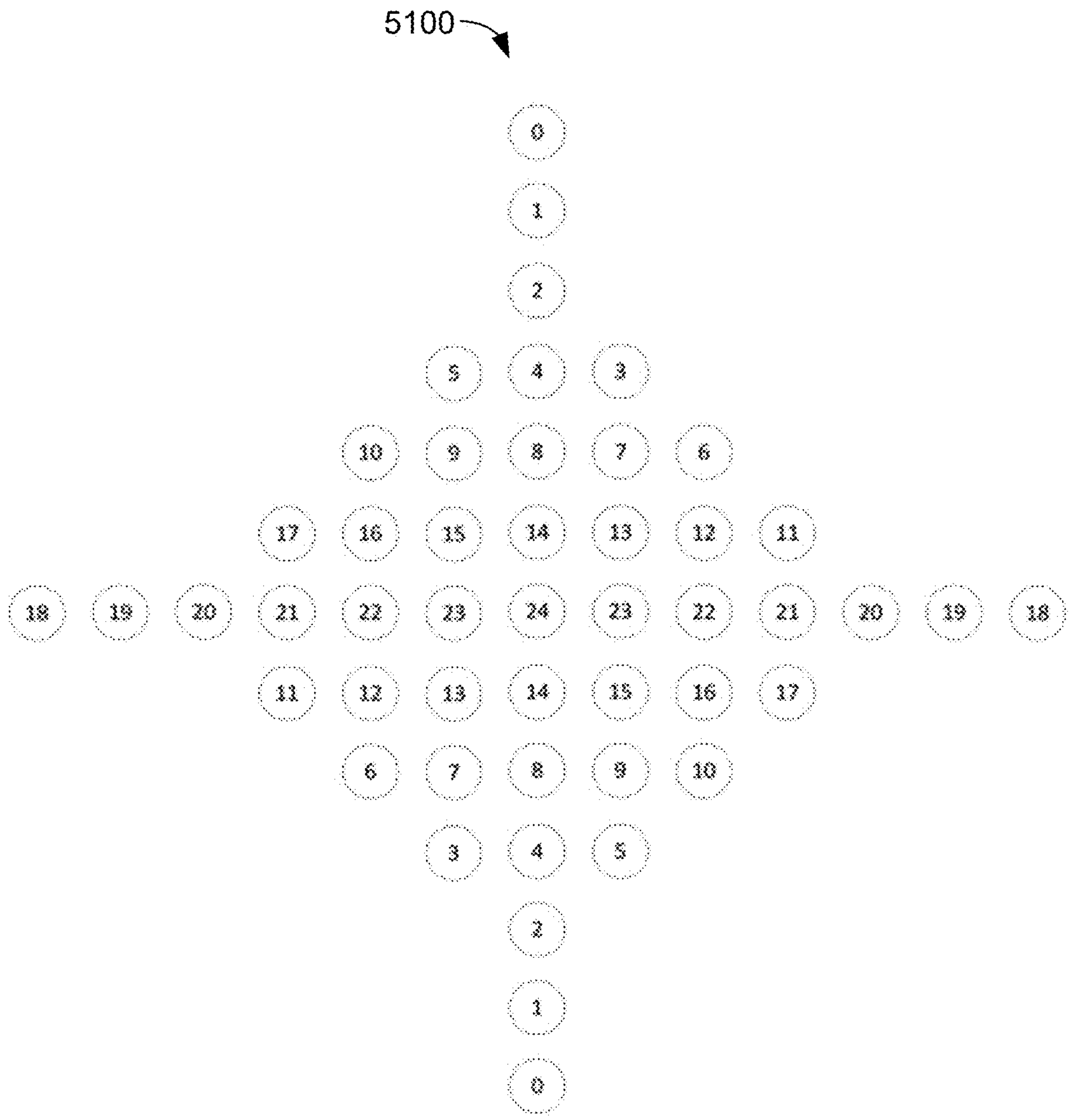
Figure 52:
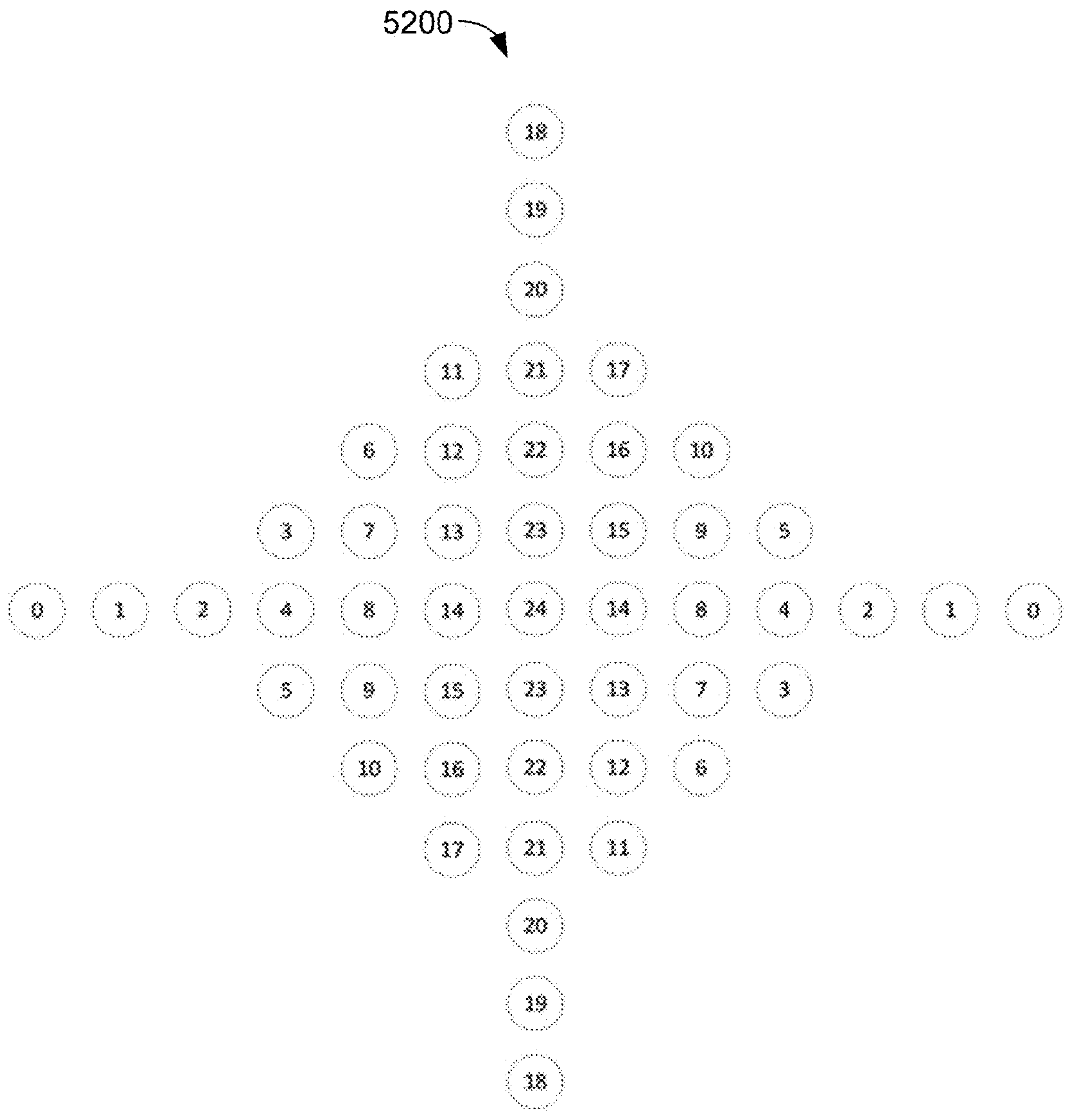
Figure 53:
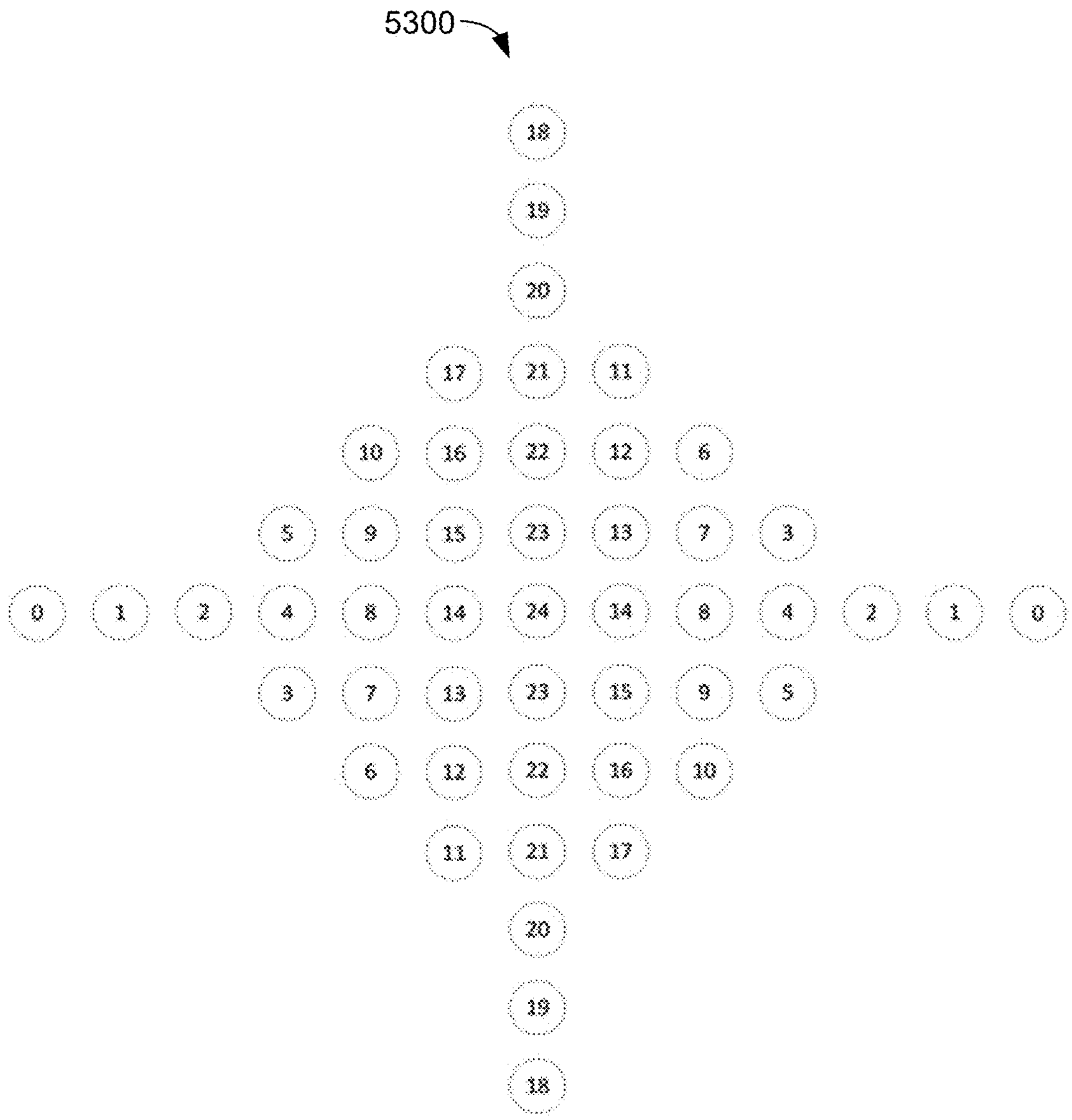
Figure 54:
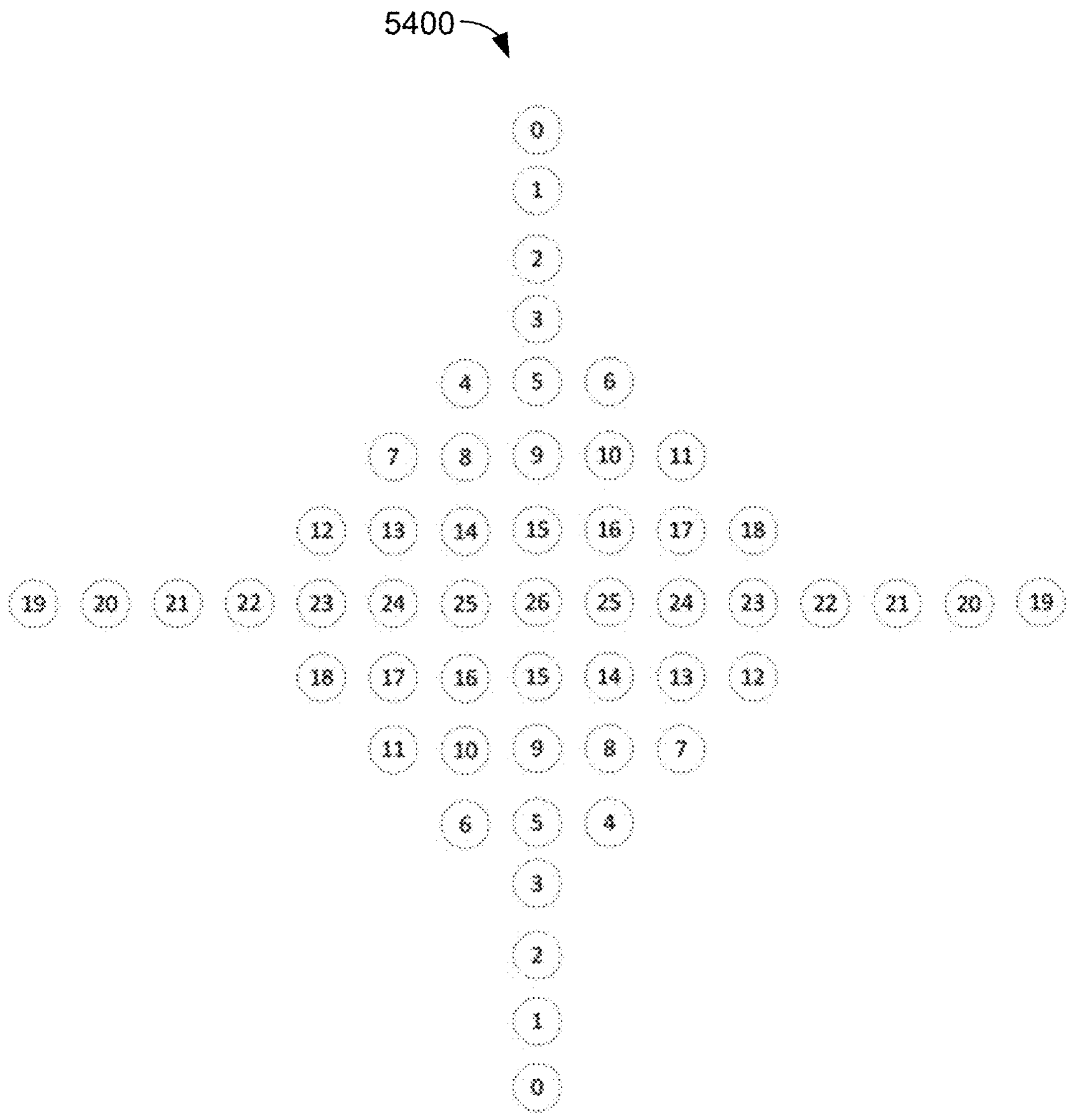
Figure 55:
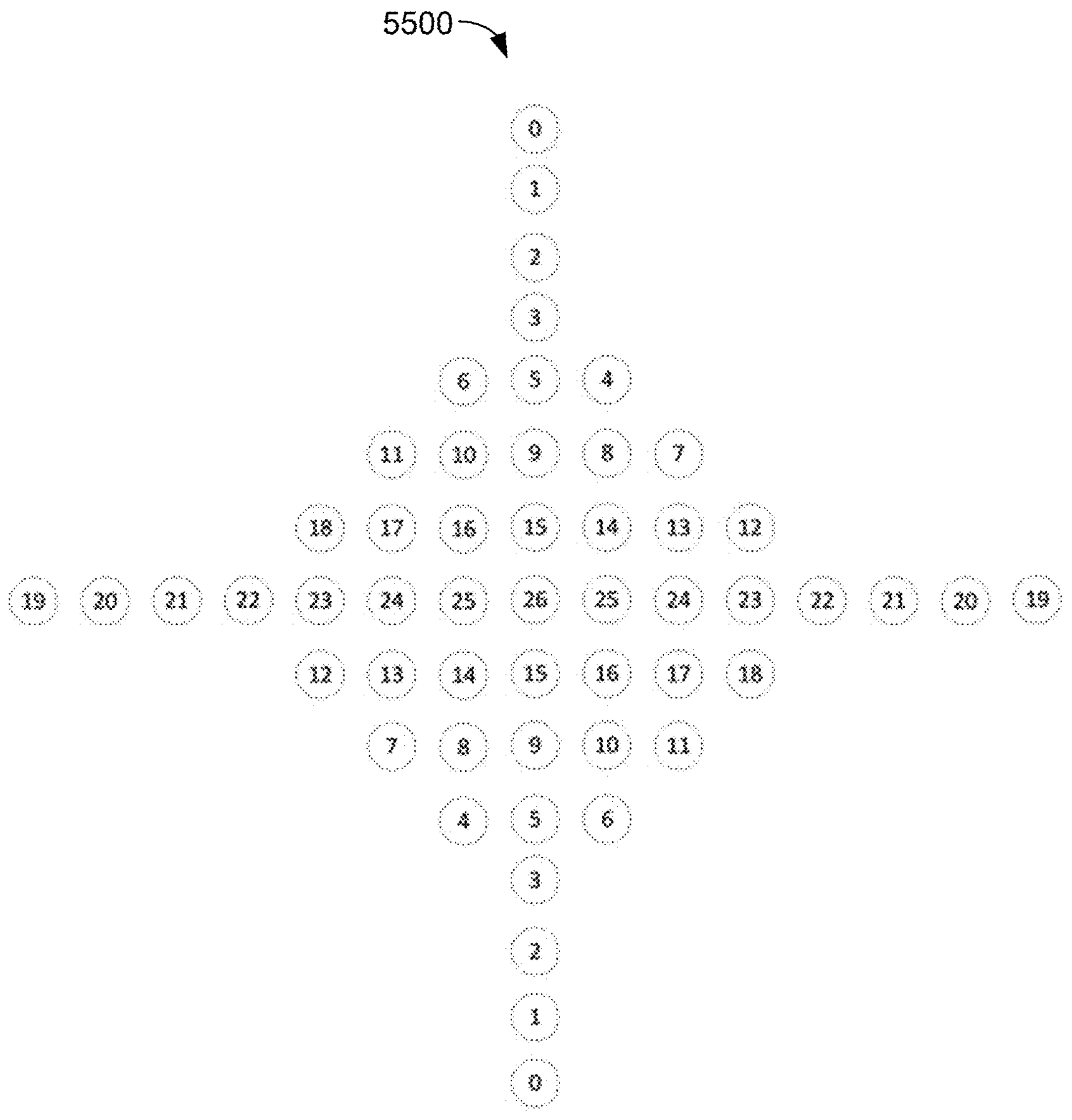
Figure 56:
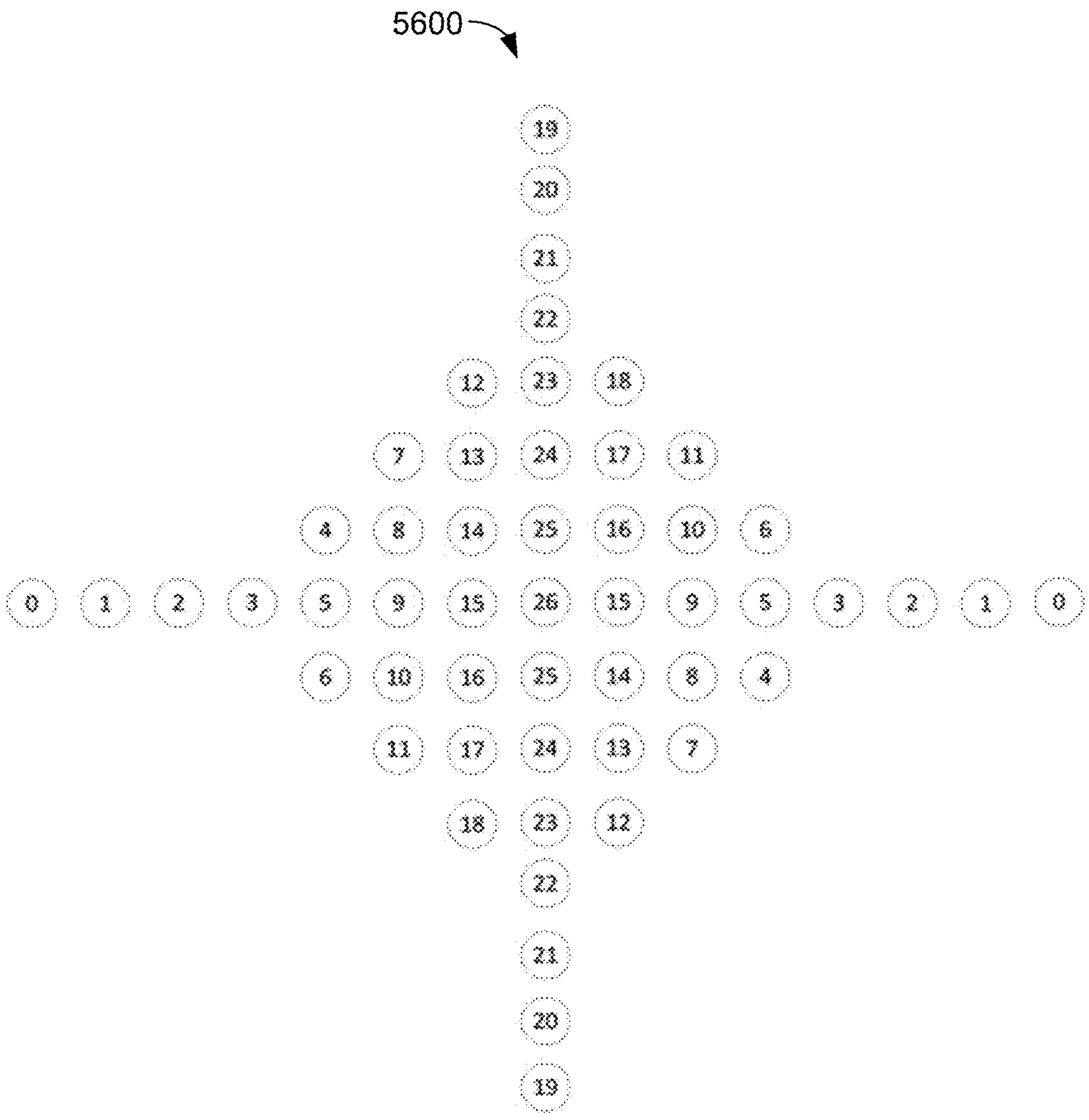
Figure 57:
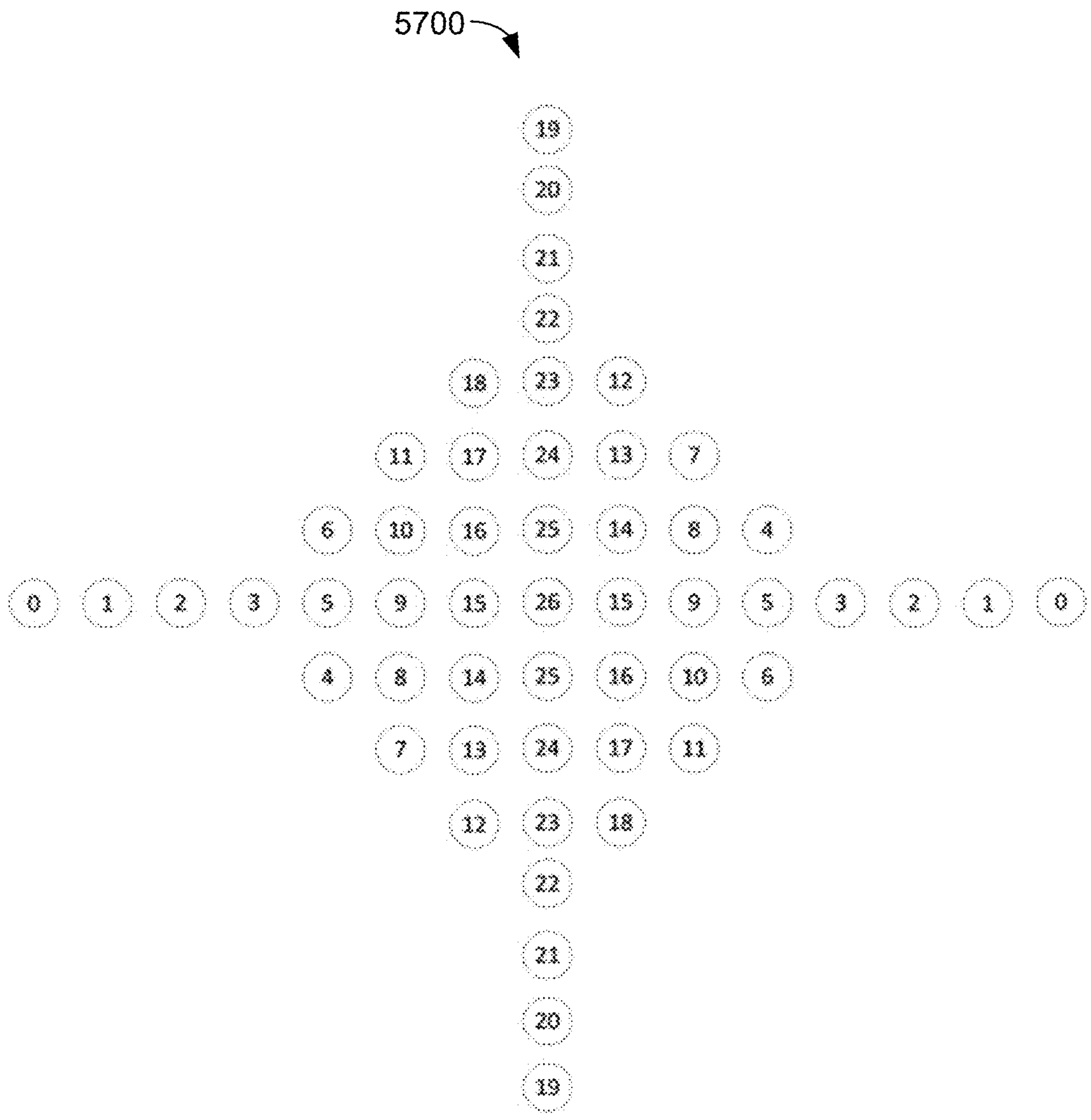
Figure 58:
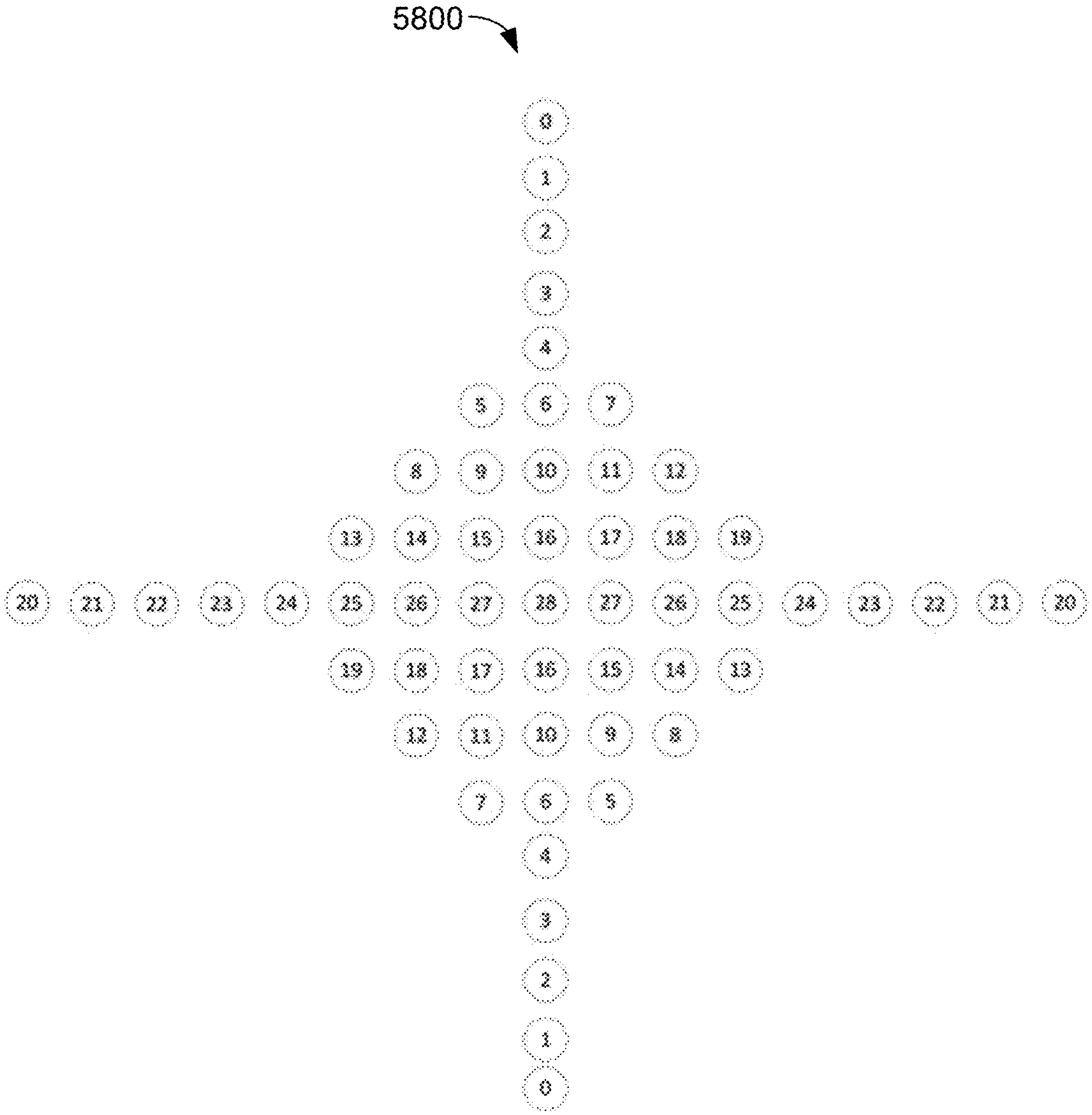
Figure 59:
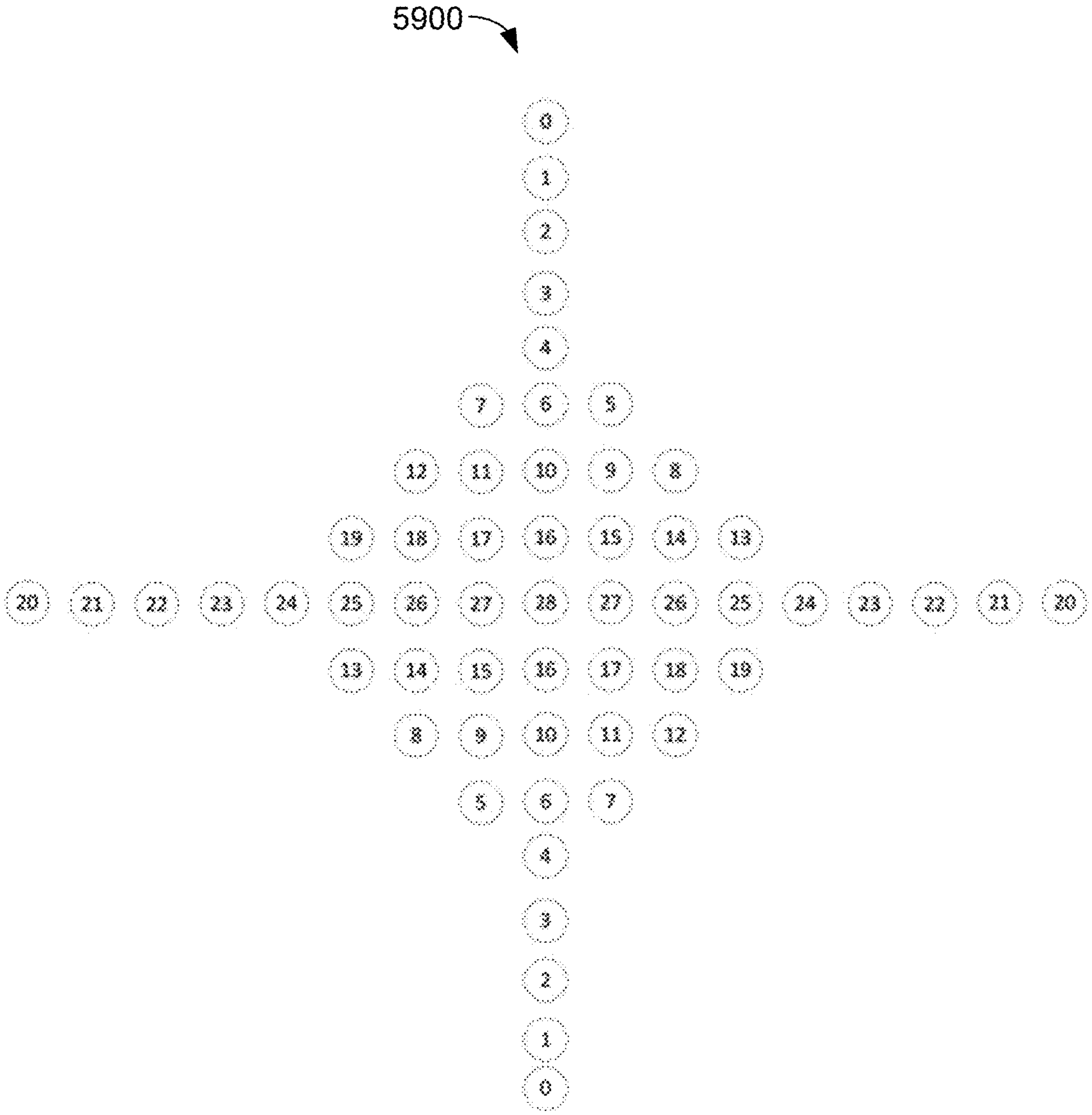
Figure 60:
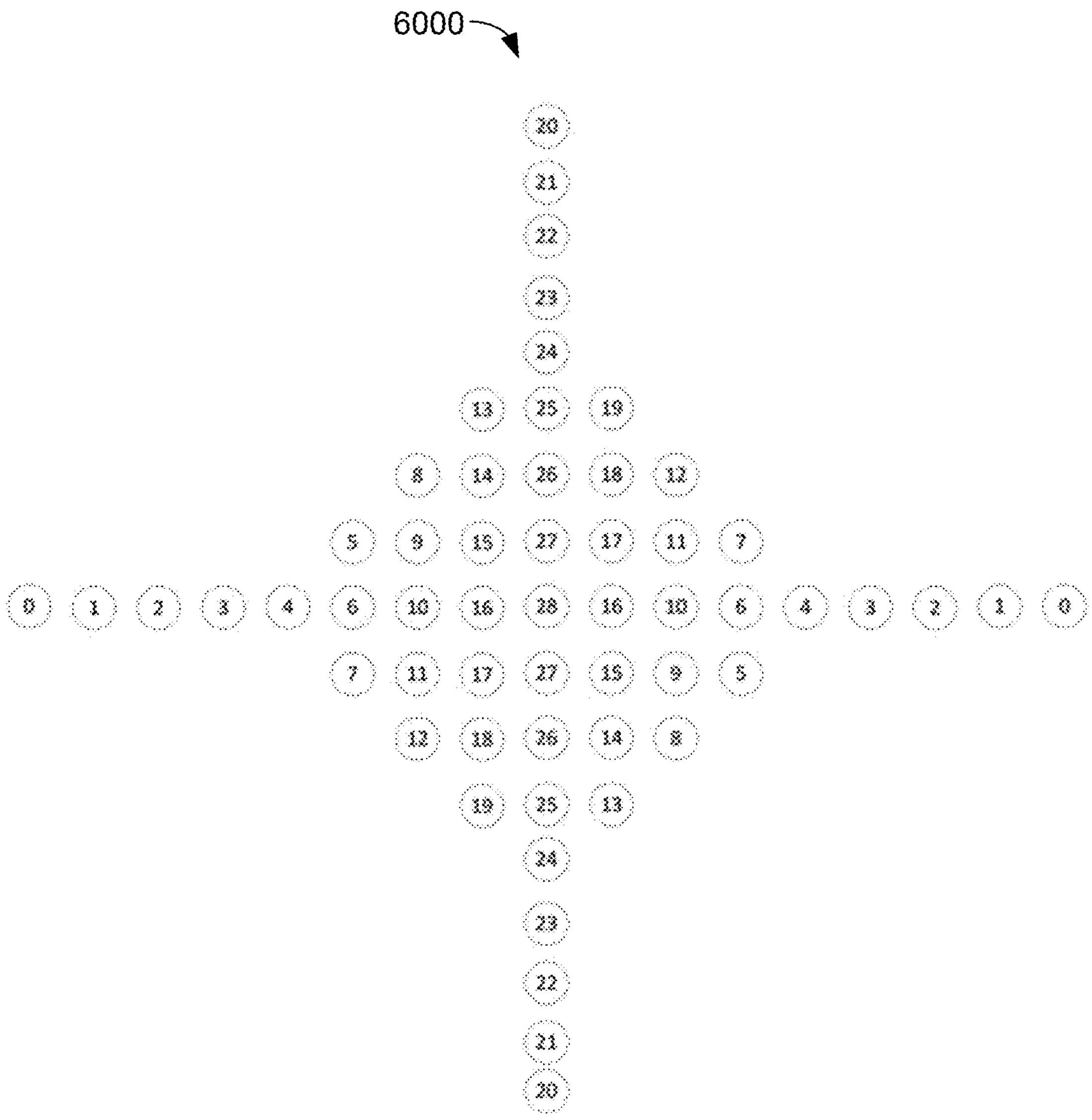
Figure 61:
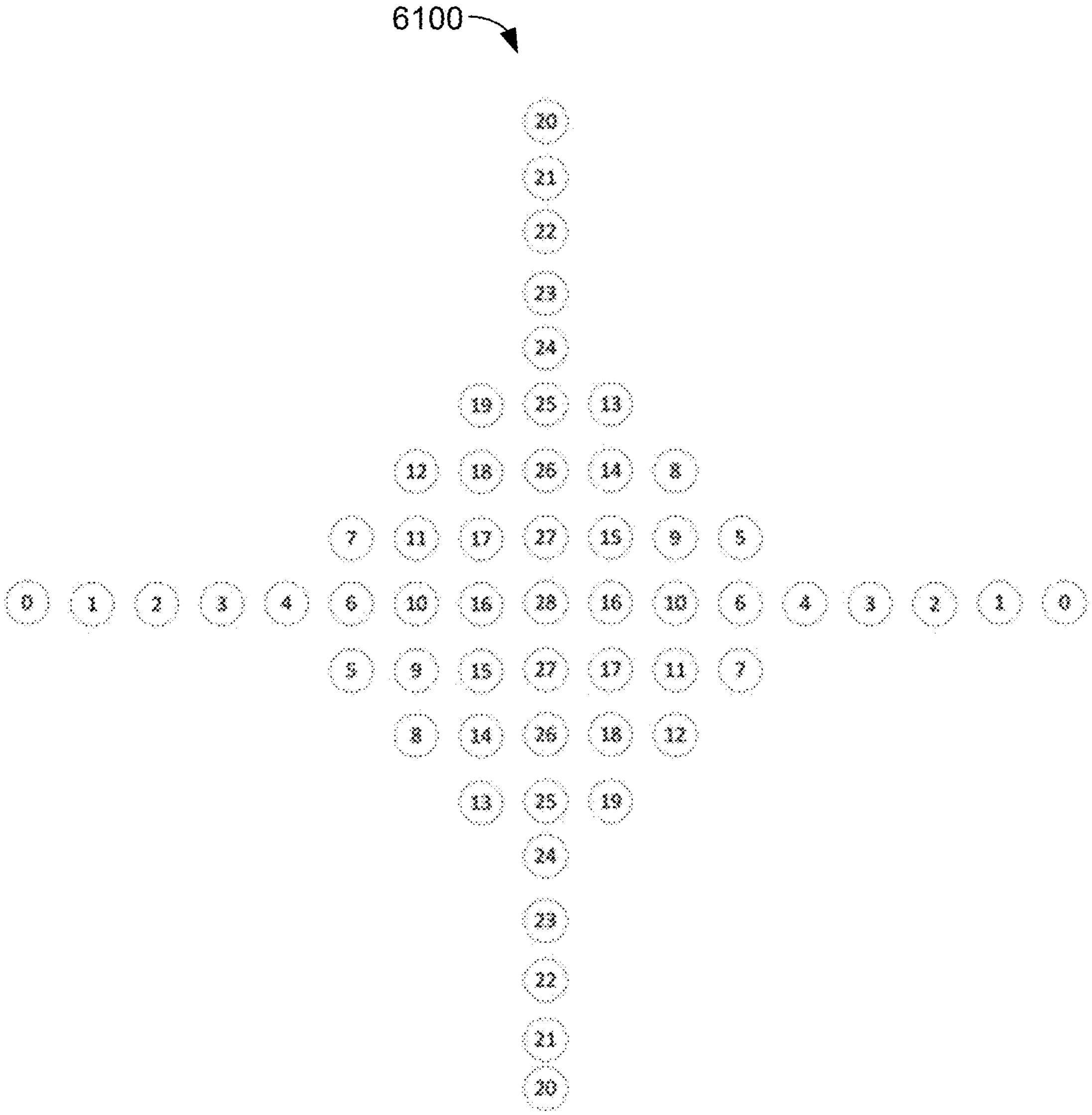

4. In one example, a possible order that associated with a transpose parameter may as shown in FIG. 41.

d) In one example, the symmetrical filter shape may as shown in the FIG. 26.
 1. In one example, a possible order that associated with a transpose parameter may as shown in FIG. 42.
 2. In one example, a possible order that associated with a transpose parameter may as shown in FIG. 43.
 3. In one example, a possible order that associated with a transpose parameter may as shown in FIG. 44.
 4. In one example, a possible order that associated with a transpose parameter may as shown in FIG. 45.

e) In one example, the symmetrical filter shape may as shown in the FIG. 25.
 1. In one example, a possible order that associated with a transpose parameter may as shown in FIG. 46.
 2. In one example, a possible order that associated with a transpose parameter may as shown in FIG. 47.
 3. In one example, a possible order that associated with a transpose parameter may as shown in FIG. 48.
 4. In one example, a possible order that associated with a transpose parameter may as shown in FIG. 49.

f). In one example, the symmetrical filter shape may as shown in the FIG. 24.
 1. In one example, a possible order that associated with a transpose parameter may as shown in FIG. 50.
 2. In one example, a possible order that associated with a transpose parameter may as shown in FIG. 51.
 3. In one example, a possible order that associated with a transpose parameter may as shown in FIG. 52.
 4. In one example, a possible order that associated with a transpose parameter may as shown in FIG. 53.

g) In one example, the symmetrical filter shape may as shown in the FIG. 23.
 1. In one example, a possible order that associated with a transpose parameter may as shown in FIG. 54.
 2. In one example, a possible order that associated with a transpose parameter may as shown in FIG. 55.
 3. In one example, a possible order that associated with a transpose parameter may as shown in FIG. 56.
 4. In one example, a possible order that associated with a transpose parameter may as shown in FIG. 57.

h) In one example, the symmetrical filter shape may as shown in the FIG. 22.
 1. In one example, a possible order that associated with a transpose parameter may as shown in FIG. 58.
 2. In one example, a possible order that associated with a transpose parameter may as shown in FIG. 59.
 3. In one example, a possible order that associated with a transpose parameter may as shown in FIG. 60.
 4. In one example, a possible order that associated with a transpose parameter may as shown in FIG. 61.

b. In one example, the transpose-based coefficient order or the transposed-based clip parameter may depend on a diamond filter shape.

c. In one example, the transpose-based coefficient order or the transposed-based clip parameter may depend on a cross filter shape.

d. In one example, the transpose-based coefficient order or the transposed-based clip parameter may depend on a asymmetrical filter shape.

e. In one example, the transpose-based coefficient order or the transposed-based clip parameter may depend on a square filter shape.

10) The clip parameters for LUMA/CHROMA filters may depend on the different filter shapes.
 a. In one example, the clip parameters for online-trained filters for LUMA component may depend on the different filter shapes.
 b. In one example, the clip parameters for online-trained filters for CHROMA components may depend on the different filter shapes.
 c. In one example, the clip parameters for offline-trained filters for LUMA component may depend on the different filter shapes.
 d. In one example, the clip parameters for offline-trained filters for CHROMA components may depend on the different filter shapes.
 e. In one example, the clip parameters for filters for a color component may depend on the different filter shapes.

11) In above examples, the video unit may refer to sequence/picture/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/any other region that contains more than one luma or chroma sample/pixel.

12) Whether to and/or how to apply the disclosed methods above may be signaled in a bitstream.
 a. In one example, they may be signaled at sequence level/group of pictures level/picture level/slice level/tile group level, such as in sequence header/picture header/SPS/VPS/DPS/DCI/PPS/APS/slice header/tile group header.
 b. In one example, they may be signaled at PB/TB/CB/PU/TU/CU/VPDU/CTU/CTU row/slice/tile/sub-picture/other kinds of region contain more than one sample or pixel.

13) Whether to and/or how to apply the disclosed methods above may be dependent on coded information, such as block size, colour format, single/dual tree partitioning, colour component, slice/picture type.

6. EMBODIMENTS

6.1 Embodiment 1

In the following exemplary embodiment, the proposed filter shape selection method may be performed on luma component in ALF. Each APS may contain a filter shape index to indicate which filter shape is used by the luma filter set inside this APS.

In detail, for a slice, the proposed filter shape selection method may let encoder collects the corresponding training data for each filter shape candidate. The class merging and coefficient training process may be performed on each filter shape candidate individually to derive the filter sets that corresponding to each filter shape. During training, each filter set may be trained multiple alternatives/rounds based on the updated CTU on/off decision related to the corresponding filter shape. The coefficients of each alternative/round may be stored. The filter shape of current slice, the CTU on/off decision and the alternative information could be decided by encoder based on the RDO cost.

The following syntax elements are introduced in the APS, wherein additions are underlined, and deleted parts are shown in ~~strike through~~ :

| | Descriptor |
|---|---|
| alf_data( ) { | |
| **alf_luma_filter_signal_flag** | u(1) |
| if( alf_luma_filter_signal_flag ) { | |
| alf_luma_num_alts_minus1 | ue(v) |
| alf_luma_shape_idx | u(1) |
| for(altIdx = 0; altIdx < alf_luma_num_alts_minus1 +1; altIdx++){ | |
| **alf_luma_clip_flag**[altIdx] | u(1) |
| alf_luma_num_filters_signalled_minus1[altIdx] | ue(v) |
| if(alf_luma_num_filters_signalled_minus1[altIdx] > 0){ | |
| for( filtIdx = 0; filtIdx < NumAlfFilters; filtIdx++ ) | |
| **alf_luma_coeff_delta_idx**[altIdx][filtIdx] | u(v) |
| } | |
| for(sfIdx = 0; sfIdx <= alf_luma_num_filters_signalled_minus1[altIdx]; sfIdx++){ | |
| for(j = 0; j < ~~19~~ numCoeff[alf_luma_shape_idx]; j++){ | |
| **alf_luma_coeff_abs**[altIdx][ sfIdx ][ j ] | ue(v) |
| if( alf_luma_coeff_abs[altIdx][ sfIdx ][ j ] ) | |
| **alf_luma_coeff_sign**[altIdx][ sfIdx ][ j ] | u(1) |
| } | |
| } | |
| if( alf_luma_clip_flag [altIdx]) | |
| for( sfIdx = 0; sfIdx <= alf_luma_num_filters_signalled_minus1[altIdx]; sfIdx++ ) | |
| for( j = 0; j < ~~19~~ numCoeff[alf_luma shape_idx]; j++ ) | |
| **alf_luma_clip_idx**[altIdx][ sfIdx ][ j ] | u(2) |
| } | |
| } | |

alf_luma_num_alts_minus1 plus 1 specifies the number of alternative filter sets for luma component. The value of alf_luma_num_alts_minus1 shall be in the range of 0 to 3, inclusive.

alf_luma_shape_idx specifies the filter shape of the luma filters inside one APS. alf_luma_shape_idx equal to 0 specifies that luma filters use a diamond shape; alf_luma_shape_idx equal to 1 specifies that luma filters use a non-diamond shape.

alf_luma_clip_flag[altIdx] equal to 0 specifies that linear adaptive loop filtering is applied to the alternative luma filter set with index altIdx~~luma component~~ . alf_luma_clip_flag[altIdx] equal to 1 specifies that non-linear adaptive loop filtering could be applied to the alternative luma filter set with index altIdx~~luma component~~ .

alf_luma_num_filters_signaled_minus1 [altIdx] plus 1 specifies the number of adaptive loop filter classes for which luma coefficients can be signaled of the alternative luma filter set with index altIdx. The value of alf_luma_num_filters_signaled_minus1 [altIdx] shall be in the range of 0 to NumAlfFilters−1, inclusive.

alf_luma_coeff_delta_idx[altIdx][filtIdx] specifies the indices of the signaled adaptive loop filter luma coefficient deltas for the filter class indicated by filtIdx ranging from 0 to NumAlfFilters−1 for the alternative luma filter set with index altIdx. When alf_luma_coeff_delta_idx[filtIdx][altIdx] is not present, it is inferred to be equal to 0. The length of alf_luma_coeff_delta_idx[altIdx][filtIdx] is Ceil(Log 2(alf_luma_num_filters_signaled_minus1[altIdx]+1)) bits. The value of alf_luma_coeff_delta_idx[altIdx][filtIdx] shall be in the range of 0 to alf_luma_num_filters_signaled_minus1 [altIdx], inclusive.

alf_luma_coeff_abs[altIdx][sfIdx][j] specifies the absolute value of the j-th coefficient of the signaled luma filter indicated by sfIdx of the alternative luma filter set with index altIdx. When alf_luma_coeff_abs[altIdx][sfIdx][j] is not present, it is inferred to be equal 0. The value of alf_luma_coeff_abs[altIdx][sfIdx][j] shall be in the range of 0 to 128, inclusive.

alf_luma_coeff_sign[altIdx][sfIdx][j] specifies the sign of the j-th luma coefficient of the filter indicated by sfIdx of the alternative luma filter set with index altIdx as shown in FIG. 32*s:*

If alf_luma_coeff_sign[altIdx][sfIdx][j] is equal to 0, the corresponding luma filter coefficient has a positive value.

Otherwise (alf_luma_coeff_sign[altIdx][sfIdx][j] is equal to 1), the corresponding luma filter coefficient has a negative value.

When alf_luma_coeff_sign[altIdx][sfIdx][j] is not present, it is inferred to be equal to 0.

alf_luma_clip_idx[altIdx][sfIdx][j] specifies the clipping index of the clipping value to use before multiplying by the j-th coefficient of the signaled luma filter indicated by sfIdx of the alternative luma filter set with index altIdx. When alf_luma_clip_idx[altIdx][sfIdx][j] is not present, it is inferred to be equal to 0.

numCoeff[alf_luma_shape_idx] specifies the number of filter coefficients of a luma filter with shape that associated to alt_luma_shape_idx.

For an ALF-enabled luma CTU, the filtering process proceeds as shown in FIG. 32*s*.

At the picture border, where samples are unavailable, the ALF uses extension (sample padding) to fill in the unavailable samples. The padding length is based on the max filter length of the filter shape candidates.

The classification for current luma CTU is performed first. Based on the CTU level APS index and CTU level alternative luma filter index, the information for filtering current CTU such as: selected filter shape, number of coefficients of a filter, class merging result, corresponding filter coefficients and clip indices could be reconstructed from the selected APS.

For a sample inside current luma CTU, based on the classification result, the filter coefficients and clip indices could be extracted according to the class merging result. Based on the selected filter shape and generated transpose index, the filter coefficients and clip indices are rearranged for current sample.

Finally, the filtering is performed based on the selected filter shape. The filtered sample value R'(i,j) as shown below, $$R'(i, j) = R(i, j) + \left( \left( \sum_{k \neq 0} \sum_{l \neq 0} f(k, l) \times K(R(i+k, j+l) - R(i, j), c(k, l)) + 64 \right) >> 7 \right)$$

where f(k,l) denotes the decoded filter coefficients, K(x,y) is the clipping function and c(k,l) denotes the decoded clipping parameters. The variable k and l varies between −L/2 and L/2 where L denotes the filter length that related to the selected filter shape. The clipping function K(x,y)=min(y, max(−y,x)) which corresponds to the function Clip3 (−y, y,x). The clipping operation introduces non-linearity to make ALF more efficient by reducing the impact of neighbor sample values that are too different with the current sample value.

The embodiments of the present disclosure are related to filter shape selection for adaptive loop filter (ALF) in video coding. As used herein, the term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular. The term "ALF processing unit" may refer to a sequence, a picture, a sub-picture, a slice, a CTU, a block, a region, or a sample. The ALF processing unit may comprise one or more color components.

Figure 62:
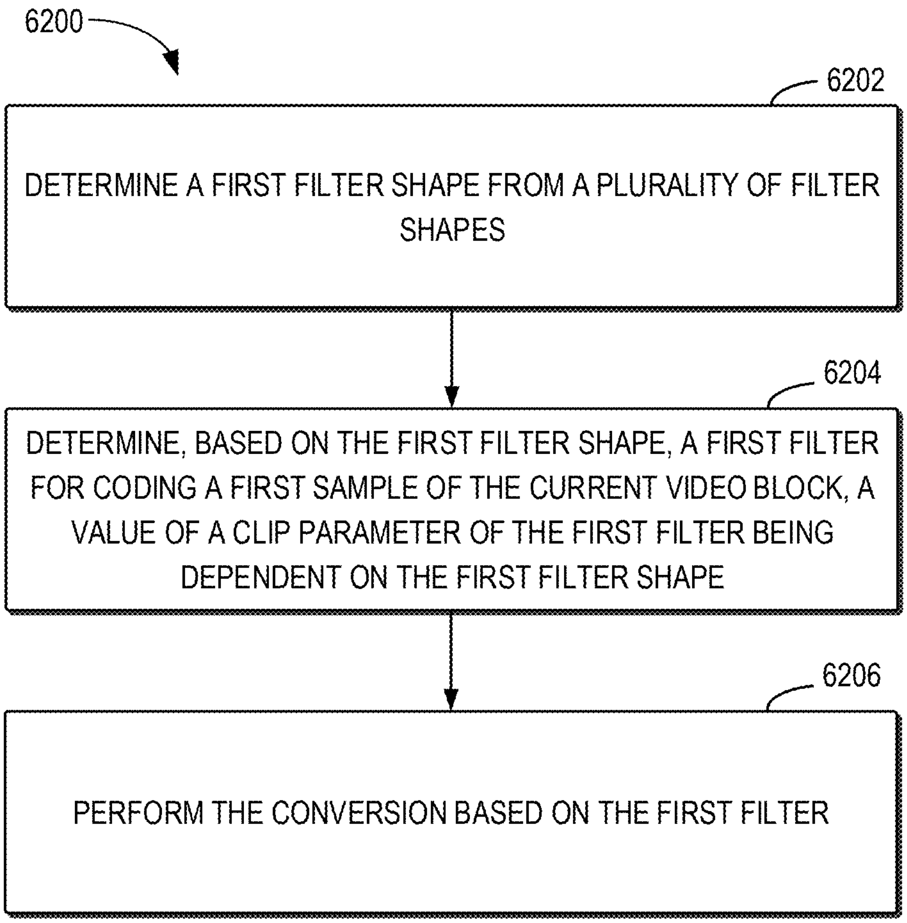
FIG. 62 illustrates a flowchart of a method for video processing in accordance with some embodiments of the present disclosure.

FIG. 62 illustrates a flowchart of a method 6200 for video processing in accordance with some embodiments of the present disclosure. The method 6200 may be implemented during a conversion between a current chroma block of a video and a bitstream of the video. As shown in FIG. 62, the method 6200 starts at 6202 where a first filter shape is determined from a plurality of filter shapes. By way of example, the plurality of filter shapes may comprise five diamond shapes with different sizes, as shown in FIGS. 7-11. For coding the first sample, the diamond shape 700 with a size of 5×5 shown in FIG. 7 may be selected and used.

At 6204, a first filter for coding a first sample of the current video block is determined based on the first filter shape. A value of a clip parameter of the first filter may be dependent on the first filter shape. In one example, the value of the clip parameter may be pre-determined based on the first filter shape.

At 6206, the conversion is performed based on the first filter. In the above-mentioned example, a filter with the diamond shape 700 may be used to perform the ALF. In some embodiments, the conversion may include encoding the current chroma block into the bitstream. Alternatively or additionally, the conversion may include decoding the current chroma block from the bitstream. It should be understood that the above examples are described merely for purpose of description. The scope of the present disclosure is not limited in this respect.

According to the method 6200, a sample of a video block is coded with a filter determined based on a filter shape selected from a plurality of filter shapes, and a value of a clip parameter of the first filter is dependent on the first filter shape. Compared with the conventional solution where a fixed filter shape is used, the method 6200 can advantageously improve the performance of the filtering tool, and thus the coding performance can be improved.

In some embodiments, the first filter may be online-trained, and the first sample may be a luma sample. That is, the clip parameters for online-trained filters for luma component may depend on the filter shape. In some alternative embodiments, the first filter may be online-trained, and the first sample may be a chroma sample. That is, the clip parameters for online-trained filters for chroma components may depend on the filter shape. In some further embodiments, the first filter may be offline-trained, and the first sample may be a luma sample. That is, the clip parameters for offline-trained filters for luma component may depend on the filter shape. In some further embodiments, the first filter may be offline-trained, and the first sample may be a chroma sample. That is, the clip parameters for offline-trained filters for chroma components may depend on the filter shape. In some alternative embodiments, the first sample may be a sample of a color component different from luma and chroma. It should be understood that the above illustrations are described merely for purpose of description. The scope of the present disclosure is not limited in this respect.

In some embodiments, the first sample may be a luma sample, and the clip parameter may be indicated in a syntax element structure. In some alternative embodiments, the first sample may be a chroma sample, and the clip parameter may be indicated in a syntax element structure. In some further embodiments, the first filter may be associated with a set of filters with the first filter shape, and a clip parameter of the set of filters may be indicated in a syntax element structure.

In some embodiments, the number of coefficients of the first filter may be dependent on the first filter shape. The coefficients are indicated in a syntax element structure. In some alternative or additional embodiments, the number of clip parameters of the first filter may be dependent on the first filter shape. The coefficients are indicated in a syntax element structure. In one example, the syntax element structure is an APS. It should be understood that the above examples are described merely for purpose of description. The scope of the present disclosure is not limited in this respect.

In some embodiments, a bitstream of a video may be stored in a non-transitory computer-readable recording medium. The bitstream of the video can be generated by a method performed by a video processing apparatus. According to the method, a first filter shape is determined from a plurality of filter shapes. Moreover, a first filter for coding a first sample of the current video block is determined based on the first filter shape. A value of a clip parameter of the first filter may be dependent on the first filter shape. The bitstream may be generated based on the first filter.

In some embodiments, a first filter shape is determined from a plurality of filter shapes. Moreover, a first filter for coding a first sample of the current video block is determined based on the first filter shape. A value of a clip parameter of the first filter may be dependent on the first filter shape. The bitstream may be generated based on the first filter. The bitstream may be stored in a non-transitory computer-readable recording medium.

Figure 63:
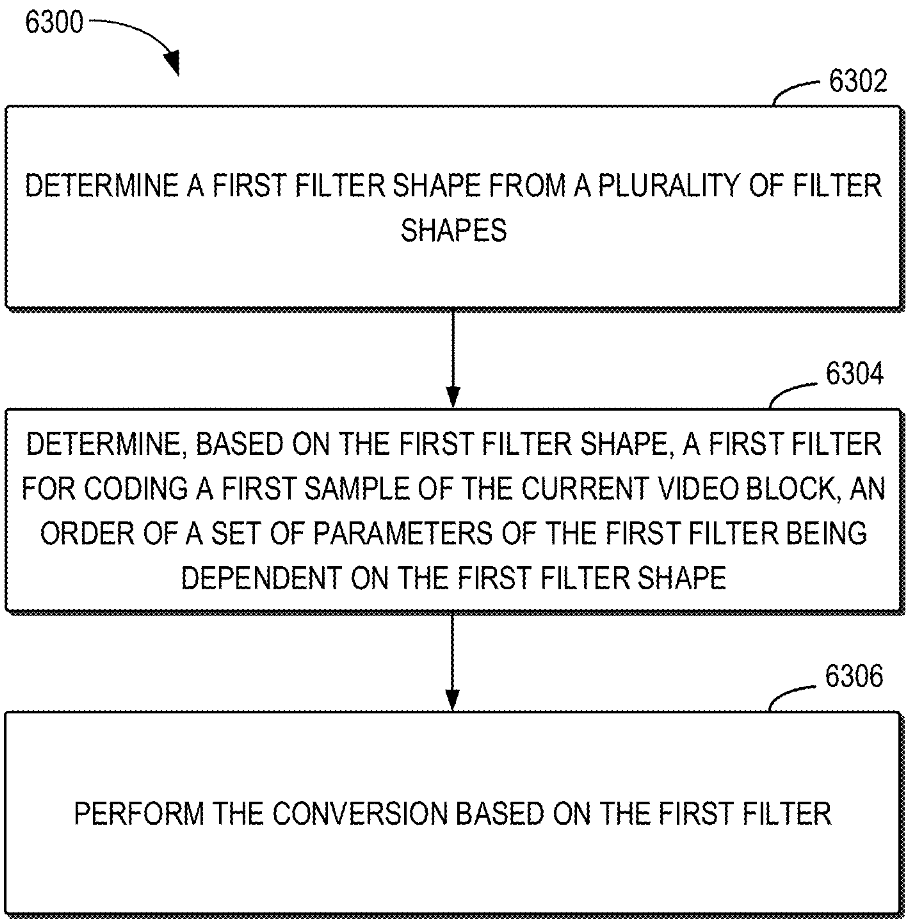
FIG. 63 illustrates a flowchart of a method for video processing in accordance with some embodiments of the present disclosure.

FIG. 63 illustrates a flowchart of a method 6300 for video processing in accordance with some embodiments of the present disclosure. The method 6300 may be implemented during a conversion between a current chroma block of a video and a bitstream of the video. As shown in FIG. 63, the method 6300 starts at 6302 where a first filter shape is determined from a plurality of filter shapes. By way of example, the plurality of filter shapes may comprise five diamond shapes with different sizes, as shown in FIGS. 7-11. For coding the first sample, the diamond shape 700 with a size of 5×5 shown in FIG. 7 may be selected and used.

At 6304, a first filter for coding a first sample of the current video block is determined based on the first filter shape. An order of a set of parameters of the first filter may be dependent on the first filter shape. In one example, the set of parameters may comprise a set of coefficients of the first filter, and an order of the set of parameters may be predetermined based on the first filter shape.

At 6206, the conversion is performed based on the first filter. In the above-mentioned example, a filter with the diamond shape 700 may be used to perform the ALF. In some embodiments, the conversion may include encoding the current chroma block into the bitstream. Alternatively or additionally, the conversion may include decoding the current chroma block from the bitstream. It should be understood that the above examples are described merely for purpose of description. The scope of the present disclosure is not limited in this respect.

According to the method 6300, a sample of a video block is coded with a filter determined based on a filter shape selected from a plurality of filter shapes, and an order of a set of parameters of the first filter is dependent on the first filter shape. Compared with the conventional solution where a fixed filter shape is used, the method 6300 can advantageously improve the performance of the filtering tool, and thus the coding performance can be improved.

In some embodiments, the set of parameters may comprise a set of coefficients of the first filter. In some alternative or additional embodiments, the set of parameters may comprise a set of clip parameters of the first filter. It should be understood that the above examples are described merely for purpose of description. The scope of the present disclosure is not limited in this respect.

In some embodiments, the first filter shape may be a symmetrical filter shape. In some alternative embodiments, the first filter shape may be a diamond filer shape. In some further embodiments, the first filter shape may be a cross filter shape. In some further embodiments, the first filter shape may be an asymmetrical filter shape. In some alternative embodiments, the first filter shape may be a square filter shape. It should be understood that the first filter shape may be any other suitable shape. The scope of the present disclosure is not limited in this respect.

In some embodiments, the order may be determined based on a zig-zag scan pattern. By way of example, with reference to FIG. 30, numbers within the circles indicate the order of the corresponding parameters. It is seen that, the order of parameters of the symmetrical filter shape 3000 is determined based on a zig-zag scan pattern.

In some embodiments, a bitstream of a video may be stored in a non-transitory computer-readable recording medium. The bitstream of the video can be generated by a method performed by a video processing apparatus. According to the method, a first filter shape is determined from a plurality of filter shapes. Moreover, a first filter for coding a first sample of the current video block is determined based on the first filter shape. An order of a set of parameters of the first filter may be dependent on the first filter shape. The bitstream may be generated based on the first filter.

In some embodiments, a first filter shape is determined from a plurality of filter shapes. Moreover, a first filter for coding a first sample of the current video block is determined based on the first filter shape. An order of a set of parameters of the first filter may be dependent on the first filter shape. The bitstream may be generated based on the first filter. The bitstream may be stored in a non-transitory computer-readable recording medium.

Implementations of the present disclosure can be described in view of the following clauses, the features of which can be combined in any reasonable manner.

Clause 1. A method for video processing, comprising: determining, during a conversion between a current video block of a video and a bitstream of the video, a first filter shape from a plurality of filter shapes; determining, based on the first filter shape, a first filter for coding a first sample of the current video block, a value of a clip parameter of the first filter being dependent on the first filter shape; and performing the conversion based on the first filter.

Clause 2. The method of clause 1, wherein the first filter is online-trained, and the first sample is a luma sample.

Clause 3. The method of clause 1, wherein the first filter is online-trained, and the first sample is a chroma sample.

Clause 4. The method of clause 1, wherein the first filter is offline-trained, and the first sample is a luma sample.

Clause 5. The method of clause 1, wherein the first filter is offline-trained, and the first sample is a chroma sample.

Clause 6. The method of clause 1, wherein the first sample is a sample of a color component different from luma and chroma.

Clause 7. The method of clause 1, wherein the first sample is a luma sample, and the clip parameter is indicated in a syntax element structure.

Clause 8. The method of clause 1, wherein the first sample is a chroma sample, and the clip parameter is indicated in a syntax element structure.

Clause 9. The method of clause 1, wherein the first filter is associated with a set of filters with the first filter shape, and a clip parameter of the set of filters is indicated in a syntax element structure.

Clause 10. The method of any of clauses 1-9, wherein the number of coefficients of the first filter is dependent on the first filter shape, the coefficients being indicated in a syntax element structure.

Clause 11. The method of any of clauses 1-10, wherein the number of clip parameters of the first filter is dependent on the first filter shape, the coefficients being indicated in a syntax element structure.

Clause 12. A method for video processing, comprising: determining, during a conversion between a current video block of a video and a bitstream of the video, a first filter shape from a plurality of filter shapes; determining, based on the first filter shape, a first filter for coding a first sample of the current video block, an order of a set of parameters of the first filter being dependent on the first filter shape; and performing the conversion based on the first filter.

Clause 13. The method of clause 12, wherein the set of parameters comprise: a set of coefficients of the first filter, or a set of clip parameters of the first filter.

Clause 14. The method of any of clauses 12-13, wherein the first filter shape is one of: a symmetrical filter shape, a diamond filer shape, a cross filter shape, an asymmetrical filter shape, or a square filter shape.

Clause 15. The method of any of clauses 12-14, wherein the order is determined based on a zig-zag scan pattern.

Clause 16. The method of any of clauses 1-15, wherein the conversion includes encoding the current video block into the bitstream.

Clause 17. The method of any of clauses 1-15, wherein the conversion includes decoding the current video block from the bitstream.

Clause 18. An apparatus for processing video data comprising a processor and a non-transitory memory with instructions thereon, wherein the instructions upon execution by the processor, cause the processor to perform a method in accordance with any of Clauses 1-17.

Clause 19. A non-transitory computer-readable storage medium storing instructions that cause a processor to perform a method in accordance with any of Clauses 1-17.

Clause 20. A non-transitory computer-readable recording medium storing a bitstream of a video which is generated by a method performed by a video processing apparatus, wherein the method comprises: determining a first filter shape from a plurality of filter shapes; determining, based on the first filter shape, a first filter for coding a first sample of a current video block of the video, a value of a clip parameter of the first filter being dependent on the first filter shape; and generating the bitstream based on the first filter.

Clause 21. A method for storing a bitstream of a video, comprising: determining a first filter shape from a plurality of filter shapes; determining, based on the first filter shape, a first filter for coding a first sample of a current video block of the video, a value of a clip parameter of the first filter being dependent on the first filter shape; generating the bitstream based on the first filter; and storing the bitstream in a non-transitory computer-readable recording medium.

Clause 22. A non-transitory computer-readable recording medium storing a bitstream of a video which is generated by a method performed by a video processing apparatus, wherein the method comprises: determining a first filter shape from a plurality of filter shapes; determining, based on the first filter shape, a first filter for coding a first sample of a current video block of the video, an order of a set of parameters of the first filter being dependent on the first filter shape; and generating the bitstream based on the first filter.

Clause 23. A method for storing a bitstream of a video, comprising: determining a first filter shape from a plurality of filter shapes; determining, based on the first filter shape, a first filter for coding a first sample of a current video block of the video, an order of a set of parameters of the first filter being de-pendent on the first filter shape; generating the bitstream based on the first filter; and storing the bitstream in a non-transitory computer-readable recording medium.

Example Device

Figure 64:
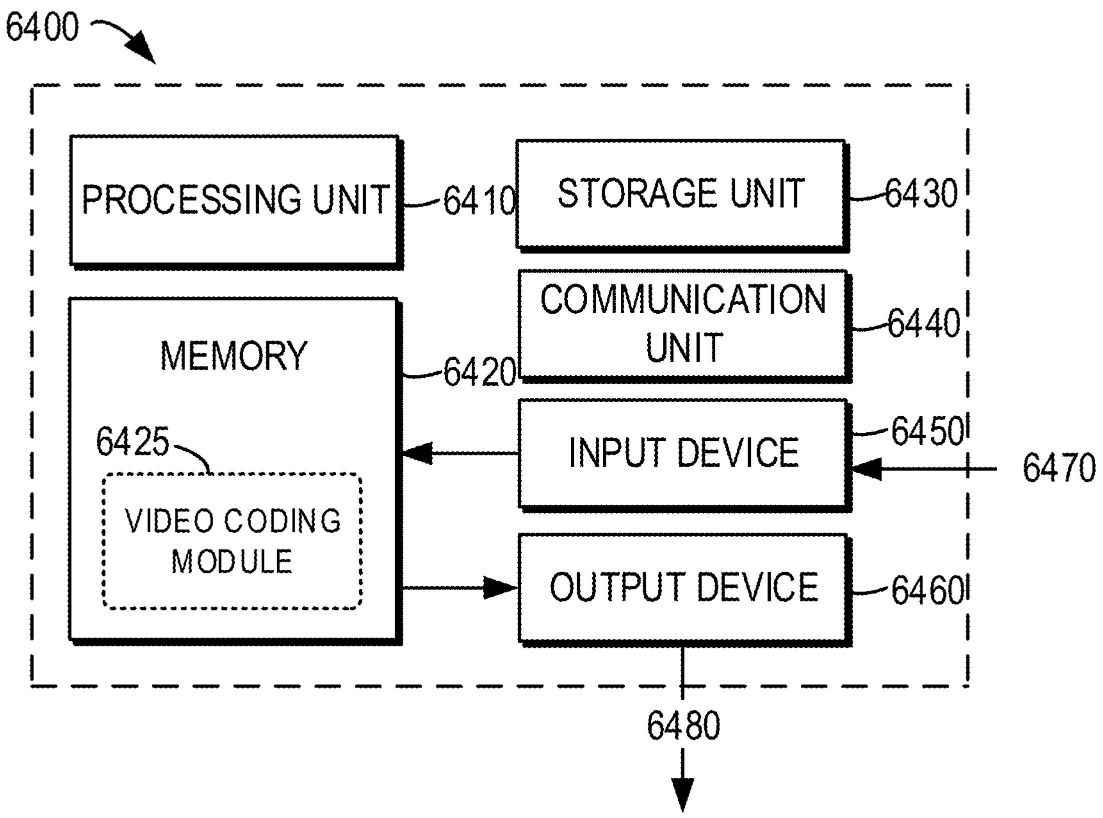
FIG. 64 illustrates a block diagram of a computing device in which various embodiments of the present disclosure can be implemented.

FIG. 64 illustrates a block diagram of a computing device 6400 in which various embodiments of the present disclosure can be implemented. The computing device 6400 may be implemented as or included in the source device 110 (or the video encoder 114 or 200) or the destination device 120 (or the video decoder 124 or 300).

It would be appreciated that the computing device 6400 shown in FIG. 64 is merely for purpose of illustration, without suggesting any limitation to the functions and scopes of the embodiments of the present disclosure in any manner.

As shown in FIG. 64, the computing device 6400 includes a general-purpose computing device 6400. The computing device 6400 may at least comprise one or more processors or processing units 6410, a memory 6420, a storage unit 6430, one or more communication units 6440, one or more input devices 6450, and one or more output devices 6460.

In some embodiments, the computing device 6400 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 6400 can support any type of interface to a user (such as "wearable" circuitry and the like).

The processing unit 6410 may be a physical or virtual processor and can implement various processes based on programs stored in the memory 6420. In a multi-processor system, multiple processing units execute computer executable instructions in parallel so as to improve the parallel processing capability of the computing device 6400. The processing unit 6410 may also be referred to as a central processing unit (CPU), a microprocessor, a controller or a microcontroller.

The computing device 6400 typically includes various computer storage medium. Such medium can be any medium accessible by the computing device 6400, including, but not limited to, volatile and non-volatile medium, or detachable and non-detachable medium. The memory 6420 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 6430 may be any detachable or non-detachable medium and may include a machine-readable medium such as a memory, flash memory drive, magnetic disk or another other media, which can be used for storing information and/or data and can be accessed in the computing device 6400.

The computing device 6400 may further include additional detachable/non-detachable, volatile/non-volatile memory medium. Although not shown in FIG. 64, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 6440 communicates with a further computing device via the communication medium. In addition, the functions of the components in the computing device 6400 can be implemented by a single computing cluster or multiple computing machines that can communicate via communication connections. Therefore, the computing device 6400 can operate in a networked environment using a logical connection with one or more other servers, networked personal computers (PCs) or further general network nodes.

The input device 6450 may be one or more of a variety of input devices, such as a mouse, keyboard, tracking ball, voice-input device, and the like. The output device 6460 may be one or more of a variety of output devices, such as a display, loudspeaker, printer, and the like. By means of the communication unit 6440, the computing device 6400 can further communicate with one or more external devices (not shown) such as the storage devices and display device, with one or more devices enabling the user to interact with the computing device 6400, or any devices (such as a network card, a modem and the like) enabling the computing device 6400 to communicate with one or more other computing devices, if required. Such communication can be performed via input/output (I/O) interfaces (not shown).

In some embodiments, instead of being integrated in a single device, some or all components of the computing device 6400 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 6400 may be used to implement video encoding/decoding in embodiments of the present disclosure. The memory 6420 may include one or more video coding modules 6425 having one or more program instructions. These modules are accessible and executable by the processing unit 6410 to perform the functionalities of the various embodiments described herein.

In the example embodiments of performing video encoding, the input device 6450 may receive video data as an input 6470 to be encoded. The video data may be processed, for example, by the video coding module 6425, to generate an encoded bitstream. The encoded bitstream may be provided via the output device 6460 as an output 6480.

In the example embodiments of performing video decoding, the input device 6450 may receive an encoded bitstream as the input 6470. The encoded bitstream may be processed, for example, by the video coding module 6425, to generate decoded video data. The decoded video data may be provided via the output device 6460 as the output 6480.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a current video block of a video and a bitstream of the video, a first filter shape from a plurality of filter shapes, the first filter shape being indicated in the bitstream;

determining, based on the first filter shape, a first filter for coding a first sample of the current video block, a value of a clip parameter of the first filter being dependent on the first filter shape; and performing the conversion based on the first filter, wherein the first filter is online-trained, and the first sample is a luma sample, or wherein the first filter is online-trained, and the first sample is a chroma sample, or wherein the first filter is offline-trained, and the first sample is a luma sample, or wherein the first filter is offline-trained, and the first sample is a chroma sample.

2. The method of claim 1, wherein the first sample is a luma sample, and the clip parameter is indicated in a syntax element structure.

3. The method of claim 1, wherein the first sample is a chroma sample, and the clip parameter is indicated in a syntax element structure.

4. The method of claim 1, wherein the first filter is associated with a set of filters with the first filter shape, and a clip parameter of the set of filters is indicated in a syntax element structure.

5. The method of claim 1, wherein the number of coefficients of the first filter is dependent on the first filter shape, the coefficients being indicated in a syntax element structure.

6. The method of claim 1, wherein the number of clip parameters of the first filter is dependent on the first filter shape, the clip parameters being indicated in a syntax element structure.

7. The method of claim 1, wherein an order of a set of parameters of the first filter is dependent on the first filter shape.

8. The method of claim 7, wherein the set of parameters comprise:

a set of coefficients of the first filter, or a set of clip parameters of the first filter.

9. The method of claim 7, wherein the first filter shape is one of:

a symmetrical filter shape, a diamond filer shape, a cross filter shape, an asymmetrical filter shape, or a square filter shape.

10. The method of claim 7, wherein the order is determined based on a zig-zag scan pattern.

11. The method of claim 1, wherein the conversion includes encoding the current video block into the bitstream.

12. The method of claim 1, wherein the conversion includes decoding the current video block from the bitstream.

13. An apparatus for processing video data comprising a processor and a non-transitory memory with instructions thereon, wherein the instructions upon execution by the processor, cause the processor to perform acts comprising:

determining, during a conversion between a current video block of a video and a bitstream of the video, a first filter shape from a plurality of filter shapes, the first filter shape being indicated in the bitstream;

determining, based on the first filter shape, a first filter for coding a first sample of the current video block, a value of a clip parameter of the first filter being dependent on the first filter shape; and performing the conversion based on the first filter, wherein the first filter is online-trained, and the first sample is a luma sample, or wherein the first filter is online-trained, and the first sample is a chroma sample, or wherein the first filter is offline-trained, and the first sample is a luma sample, or wherein the first filter is offline-trained, and the first sample is a chroma sample.

14. A non-transitory computer-readable storage medium storing instructions that cause a processor to perform acts comprising:

determining, during a conversion between a current video block of a video and a bitstream of the video, a first filter shape from a plurality of filter shapes, the first filter shape being indicated in the bitstream;

determining, based on the first filter shape, a first filter for coding a first sample of the current video block, a value of a clip parameter of the first filter being dependent on the first filter shape; and performing the conversion based on the first filter, wherein the first filter is online-trained, and the first sample is a luma sample, or wherein the first filter is online-trained, and the first sample is a chroma sample, or wherein the first filter is offline-trained, and the first sample is a luma sample, or wherein the first filter is offline-trained, and the first sample is a chroma sample.

15. A method for storing a bitstream of a video, comprising:

determining a first filter shape from a plurality of filter shapes, the first filter shape being indicated in the bitstream;

determining, based on the first filter shape, a first filter for coding a first sample of a current video block of the video, a value of a clip parameter of the first filter being dependent on the first filter shape;

generating the bitstream based on the first filter; and storing the bitstream in a non-transitory computer-readable recording medium, wherein the first filter is online-trained, and the first sample is a luma sample, or wherein the first filter is online-trained, and the first sample is a chroma sample, or wherein the first filter is offline-trained, and the first sample is a luma sample, or wherein the first filter is offline-trained, and the first sample is a chroma sample.

* * * * *